United States Patent
Crabtree et al.

(10) Patent No.: US 11,089,045 B2
(45) Date of Patent: *Aug. 10, 2021

(54) USER AND ENTITY BEHAVIORAL ANALYSIS WITH NETWORK TOPOLOGY ENHANCEMENTS

(71) Applicant: QOMPLX, Inc., Tysons, VA (US)

(72) Inventors: Jason Crabtree, Vienna, VA (US); Andrew Sellers, Monument, CO (US)

(73) Assignee: QOMPLX, INC., Tysons, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/807,007

(22) Filed: Mar. 2, 2020

(65) Prior Publication Data

US 2020/0358804 A1    Nov. 12, 2020

Related U.S. Application Data

(63) Continuation-in-part of application No. 15/825,350, filed on Nov. 29, 2017, now Pat. No. 10,594,714, which is a continuation-in-part of application No. 15/725,274, filed on Oct. 4, 2017, now Pat. No. 10,609,079, which is a continuation-in-part of application No. 15/655,113, filed on Jul. 20, 2017, now Pat. No. 10,735,456, which is a
(Continued)

(51) Int. Cl.
    *H04L 29/06*    (2006.01)
(52) U.S. Cl.
    CPC ........ *H04L 63/1433* (2013.01); *H04L 63/102* (2013.01); *H04L 63/1416* (2013.01); *H04L 63/1425* (2013.01); *H04L 63/20* (2013.01)

(58) Field of Classification Search
    CPC . H04L 63/20; H04L 63/1433; H04L 63/1425; H04L 63/1416; H04L 63/102
    USPC ......................................................... 726/22
    See application file for complete search history.

(56) References Cited

U.S. PATENT DOCUMENTS

| 5,930,762 | A | * | 7/1999 | Masch | .................... G06F 17/10 |
| | | | | | 705/7.28 |
| 6,256,544 | B1 | | 7/2001 | Weissinger | |
| | | | (Continued) | | |

FOREIGN PATENT DOCUMENTS

| WO | 2014159150 A1 | 10/2014 |
| WO | 2017075543 A1 | 5/2017 |

*Primary Examiner* — Bryan F Wright
(74) *Attorney, Agent, or Firm* — Brian S. Boon; Brian R. Galvin

(57) ABSTRACT

A system and method for network cybersecurity analysis that uses user and entity behavioral analysis combined with network topology information to provide improved cybersecurity. The system and method involve gathering network entity information, establishing baseline behaviors for each entity, and monitoring each entity for behavioral anomalies that might indicate cybersecurity concerns. Further, the system and method involve incorporating network topology information into the analysis by generating a model of the network, annotating the model with risk and criticality information for each entity in the model and with a vulnerability level between entities, and using the model to evaluate cybersecurity risks to the network. Risks and vulnerabilities associated with user entities may be represented, in part or in whole, by the behavioral analyses and monitoring of those user entities.

10 Claims, 37 Drawing Sheets

Related U.S. Application Data continuation-in-part of application No. 15/616,427, filed on Jun. 7, 2017, which is a continuation-in-part of application No. 14/925,974, filed on Oct. 28, 2015, now abandoned, application No. 16/807,007, which is a continuation-in-part of application No. 15/825,350, filed on Nov. 29, 2017, now Pat. No. 10,594,714, which is a continuation-in-part of application No. 15/725,274, filed on Oct. 4, 2017, now Pat. No. 10,609,079, which is a continuation-in-part of application No. 15/655,113, filed on Jul. 20, 2017, now Pat. No. 10,735,456, which is a continuation-in-part of application No. 15/237,625, filed on Aug. 15, 2016, now Pat. No. 10,248,910, which is a continuation-in-part of application No. 15/206,195, filed on Jul. 8, 2016, which is a continuation-in-part of application No. 15/186,453, filed on Jun. 18, 2016, which is a continuation-in-part of application No. 15/166,158, filed on May 26, 2016, which is a continuation-in-part of application No. 15/141,752, filed on Apr. 28, 2016, now Pat. No. 10,860,962, which is a continuation-in-part of application No. 15/091,563, filed on Apr. 5, 2016, now Pat. No. 10,204,147, and a continuation-in-part of application No. 14/986,536, filed on Dec. 31, 2015, now Pat. No. 10,210,255, and a continuation-in-part of application No. 14/925,974, filed on Oct. 28, 2015, now abandoned.

(56) References Cited

U.S. PATENT DOCUMENTS

| | | | |
|---|---|---|---|
| 9,294,497 B1* | 3/2016 | Ben-Or | H04L 63/1433 |
| 2004/0098610 A1* | 5/2004 | Hrastar | H04W 12/0013 |
| | | | 726/1 |
| 2009/0012760 A1 | 1/2009 | Schunemann | |
| 2010/0031156 A1* | 2/2010 | Doyle | H04L 43/022 |
| | | | 715/736 |
| 2014/0310808 A1* | 10/2014 | Yao | H04L 63/145 |
| | | | 726/22 |
| 2015/0033084 A1* | 1/2015 | Sasturkar | G06F 16/24578 |
| | | | 714/46 |
| 2016/0028758 A1 | 1/2016 | Ellis et al. | |
| 2016/0212171 A1 | 7/2016 | Senanayake et al. | |
| 2016/0275123 A1 | 9/2016 | Lin et al. | |
| 2017/0063896 A1 | 3/2017 | Muddu et al. | |
| 2017/0126712 A1 | 5/2017 | Crabtree et al. | |
| 2017/0139763 A1 | 5/2017 | Ellwein | |
| 2017/0149802 A1 | 5/2017 | Huang et al. | |

* cited by examiner

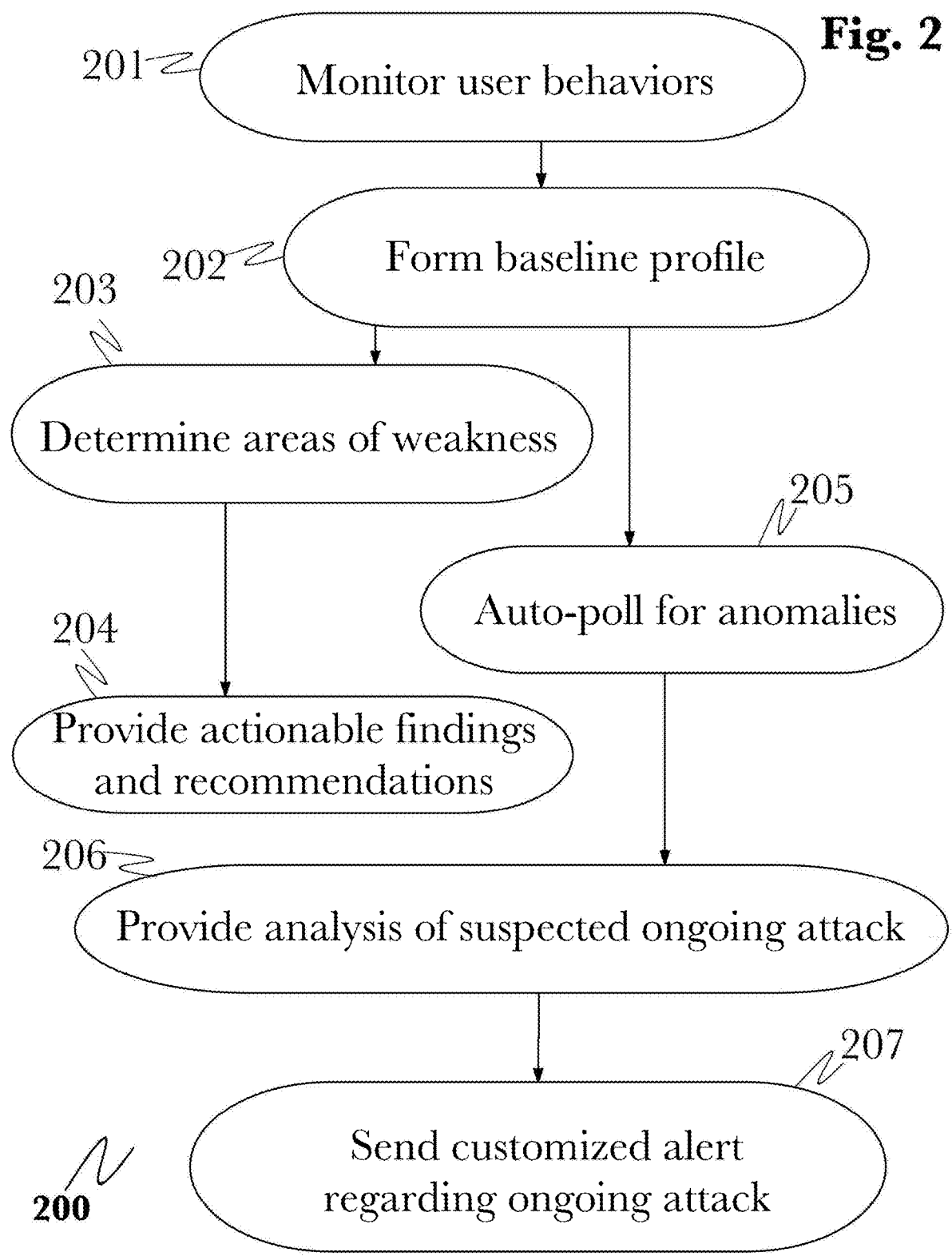

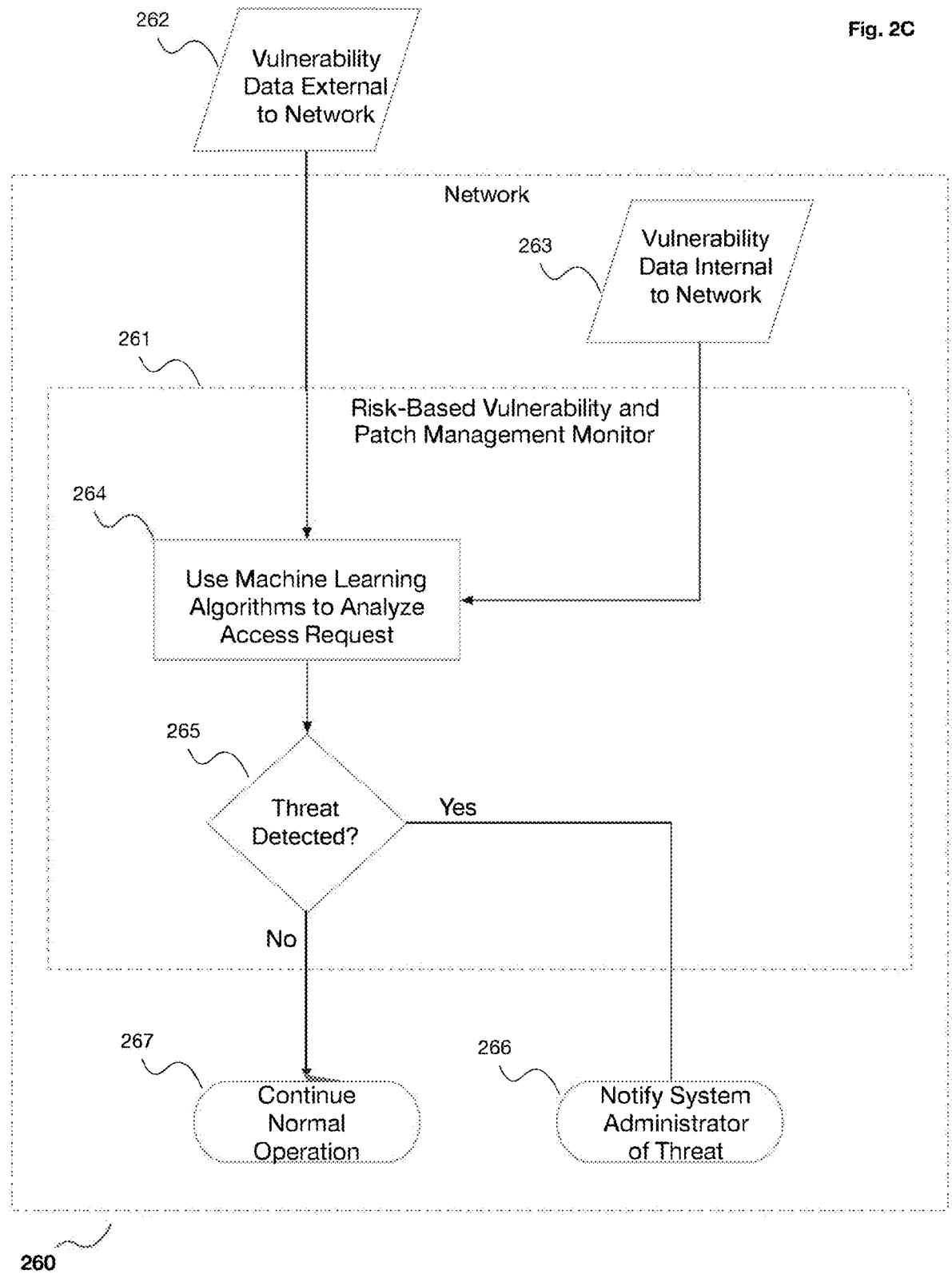

USER AND ENTITY BEHAVIORAL ANALYSIS WITH NETWORK TOPOLOGY ENHANCEMENTS

CROSS-REFERENCE TO RELATED APPLICATIONS

| Application Ser. No. | Date Filed | Title |
|---|---|---|
| Current application | Herewith | USER AND ENTITY BEHAVIORAL ANALYSIS WITH NETWORK TOPOLOGY ENHANCEMENTS |
| | | Is a continuation-in-part of: |
| 15/825,350 | Nov. 29, 2017 | USER AND ENTITY BEHAVIORAL ANALYSIS USING AN ADVANCED CYBER DECISION PLATFORM |
| | | which is a continuation-in-part of |
| 15/725,274 | Oct. 4, 2017 | APPLICATION OF ADVANCED CYBERSECURITY THREAT MITIGATION TO ROGUE DEVICES, PRIVILEGE ESCALATION, AND RISK-BASED VULNERABILITY AND PATCH MANAGEMENT |
| | | which is a continuation-in-part of |
| 15/655,113 | Jul. 20, 2017 | ADVANCED CYBERSECURITY THREAT MITIGATION USING BEHAVIORAL AND DEEP ANALYTICS |
| | | which is a continuation-in-part of |
| 15/616,427 | Jun. 7, 2017 | RAPID PREDICTIVE ANALYSIS OF VERY LARGE DATA SETS USING AN ACTOR-DRIVEN DISTRIBUTED COMPUTATIONAL GRAPH |
| | | which is a continuation-in-part of |
| 14/925,974 | Oct. 28, 2015 | RAPID PREDICTIVE ANALYSIS OF VERY LARGE DATA SETS USING THE DISTRIBUTED COMPUTATIONAL GRAPH |
| Current application | Herewith | USER AND ENTITY BEHAVIORAL ANALYSIS WITH NETWORK TOPOLOGY ENHANCEMENTS |
| | | Is a continuation-in-part of: |
| 15/825,350 | Nov. 29, 2017 | USER AND ENTITY BEHAVIORAL ANALYSIS USING AN ADVANCED CYBER DECISION PLATFORM |
| | | which is a continuation-in-part of |
| 15/725,274 | Oct. 4, 2017 | APPLICATION OF ADVANCED CYBERSECURITY THREAT MITIGATION TO ROGUE DEVICES, PRIVILEGE ESCALATION, AND RISK-BASED VULNERABILITY AND PATCH MANAGEMENT |
| | | which is a continuation-in-part of |
| 15/655,113 | Jul. 20, 2017 | ADVANCED CYBERSECURITY THREAT MITIGATION USING BEHAVIORAL AND DEEP ANALYTICS |
| | | which is also a continuation-in-part of |
| 15/237,625 | Aug. 15, 2016 | DETECTION MITIGATION AND REMEDIATION OF CYBERATTACKS EMPLOYING AN ADVANCED CYBER-DECISION PLATFORM |
| Patent 10,248,910 | Issue Date Apr. 2, 2019 | |
| | | which is a continuation-in-part of |
| 15/206,195 | Jul. 8, 2016 | ACCURATE AND DETAILED MODELING OF SYSTEMS WITH LARGE COMPLEX DATASETS USING A DISTRIBUTED SIMULATION ENGINE |
| | | which is a continuation-in-part of |
| 15/186,453 | Jun. 18, 2016 | SYSTEM FOR AUTOMATED CAPTURE AND ANALYSIS OF BUSINESS INFORMATION FOR RELIABLE BUSINESS VENTURE OUTCOME PREDICTION |
| | | which is a continuation-in-part of |
| 15/166,158 | May 26, 2016 | SYSTEM FOR AUTOMATED CAPTURE AND ANALYSIS OF BUSINESS INFORMATION FOR SECURITY AND CLIENT-FACING INFRASTRUCTURE RELIABILITY |
| | | which is a continuation-in-part of |
| 15/141,752 | Apr. 28, 2016 | SYSTEM FOR FULLY INTEGRATED CAPTURE, AND ANALYSIS OF BUSINESS |

-continued

| Application Ser. No. | Date Filed | Title |
|---|---|---|
| | | INFORMATION RESULTING IN PREDICTIVE DECISION MAKING AND SIMULATION which is a continuation-in-part of |
| 15/091,563 | Apr. 5, 2016 | SYSTEM FOR CAPTURE, ANALYSIS AND STORAGE OF TIME SERIES DATA FROM SENSORS WITH HETEROGENEOUS REPORT INTERVAL PROFILES and is also a continuation-in-part of |
| 14/986,536 | Dec. 31, 2015 | DISTRIBUTED SYSTEM FOR LARGE VOLUME DEEP WEB DATA EXTRACTION and is also a continuation-in-part of |
| 14/925,974 | Oct. 28, 2015 | RAPID PREDICTIVE ANALYSIS OF VERY LARGE DATA SETS USING THE DISTRIBUTED COMPUTATIONAL GRAPH | the entire specification of each of which is incorporated herein by reference.

BACKGROUND OF THE INVENTION

Field of the Invention

The disclosure relates to the field of network security, particularly to the detection and mitigation of threats by monitoring for anomalous user behavior.

Discussion of the State of the Art

Cyberattacks are an ever-evolving threat that many companies today must face and deal with, and ignoring the problem may be costly to not only the companies, but also their customers. With the ever-evolving nature, it may be difficult to predict when and what types of threats that a security expert must anticipate. One method that is being used today is detecting threats by monitoring a network and its connected users and devices to monitor for anomalous behavior. However, traditional methods may be limited in scope in the information analyzed, as well as having a limit to their data processing capabilities. Such limitations may overlook information that is only discernable when multiple sources of information are inspected together.

What is needed is a system and method that can gather information related to user and device behaviors, analyze that information for risks related to cybersecurity purposes, and incorporate network topology to improve cybersecurity recommendations.

SUMMARY OF THE INVENTION

Accordingly, the inventor has conceived, and reduced to practice, a system and method for network cybersecurity analysis that uses user and entity behavioral analysis (UEBA) combined with network topology information to provide improved cybersecurity risk characterizations. The system and method involve gathering network entity information, establishing baseline behaviors for each entity, and monitoring each entity for behavioral anomalies that might indicate cybersecurity concerns. Further, the system and method involve incorporating network topology information into the analysis by generating a model of the network, annotating the model with risk and criticality information for each entity in the model and with a vulnerability level between entities, and using the model to evaluate cybersecurity risks to the network. Risks and vulnerabilities associated with user entities may be represented, in part or in whole, by the behavioral analyses and monitoring of those user entities.

According to a preferred embodiment, a system for cybersecurity analysis using user and entity behavioral analysis combined with network topology information is disclosed, comprising: a computing device comprising a memory and a processor; a directed graph stored in the memory of the computing device, the directed graph comprising a representation of a computer network wherein: nodes of the directed graph represent entities comprising the computer network; and edges of the directed graph represent relationships between the entities of the computer network; and a behavioral analysis engine comprising a plurality of programming instructions stored in the memory of, and operating on the processor of, the computing device, wherein the plurality of programming instructions, when operating on the processor, cause the computing device to: monitor the activity of a plurality of entities comprising the computer network; establish behavioral baseline data for each of the plurality of entities from the monitored activity over a defined period of time; associate the behavioral baseline data for each entity with the directed graph node for that entity; identify anomalous behavior of one of the plurality of entities by comparing monitored activity for that entity to the associated behavioral baseline data for that entity; and calculate a risk of the anomalous behavior using the directed graph by determining a relationship between the entity for which anomalous behavior has been identified and a different entity of the plurality of entities.

According to another preferred embodiment, a method for cybersecurity analysis using user and entity behavioral analysis combined with network topology information is disclosed, comprising the steps of: storing a directed graph in the memory of a computing device, the directed graph comprising a representation of a computer network wherein: nodes of the directed graph represent entities comprising the computer network; and edges of the directed graph represent relationships between the entities of the computer network; and monitoring the activity of a plurality of entities comprising the computer network; establishing behavioral baseline data for each of the plurality of entities from the monitored activity over a defined period of time; associating the behavioral baseline data for each entity with the directed graph node for that entity; identifying anomalous behavior of one of the plurality of entities by comparing monitored activity for that entity to the associated behavioral baseline data for that entity; and calculating a risk of the anomalous behavior using the directed graph by determining a relationship between the entity for which anomalous behavior has been identified and a different entity of the plurality of entities.

According to an aspect of an embodiment, the relationship between entities used to calculate the risk is a vulnerability rating which indicates a difficulty of exploiting a vulnerability between entities.

According to an aspect of an embodiment, the vulnerability rating comprises information regarding the levels and types of authentication required to access an entity.

According to an aspect of an embodiment, each node further comprises a risk of attack rating which indicates a likelihood that the node will be subject to a cyberattack, and the calculation of risk is based in part on the risk rating.

According to an aspect of an embodiment, each node further comprises a criticality rating which indicates the criticality to the computer network, or the organization operating the network, if the node is compromised by a cyberattack, and the calculation of risk is based in part on the criticality rating.

According to an aspect of an embodiment, network segmentation is used to reduce the number of nodes required to represent entities in the directed graph by: assigning computing devices in the computing network to logical segments by changing their configurations or by changing the computer network configurations wherein the computing devices in a logical segment are treated similarly with respect access of the computer network; and representing all computing devices in a logical segment as a single entity in the directed graph.

BRIEF DESCRIPTION OF THE DRAWING FIGURES

The accompanying drawings illustrate several aspects and, together with the description, serve to explain the principles of the invention according to the aspects. It will be appreciated by one skilled in the art that the particular arrangements illustrated in the drawings are merely exemplary, and are not to be considered as limiting of the scope of the invention or the claims herein in any way.

FIG. 2 is a flow diagram of an exemplary function of the business operating system in the detection and mitigation of predetermining factors leading to and steps to mitigate ongoing cyberattacks.

FIG. 2C is a process diagram showing a general flow of the process used to manage vulnerabilities associated with patches to network software.

DETAILED DESCRIPTION

Figure 1:
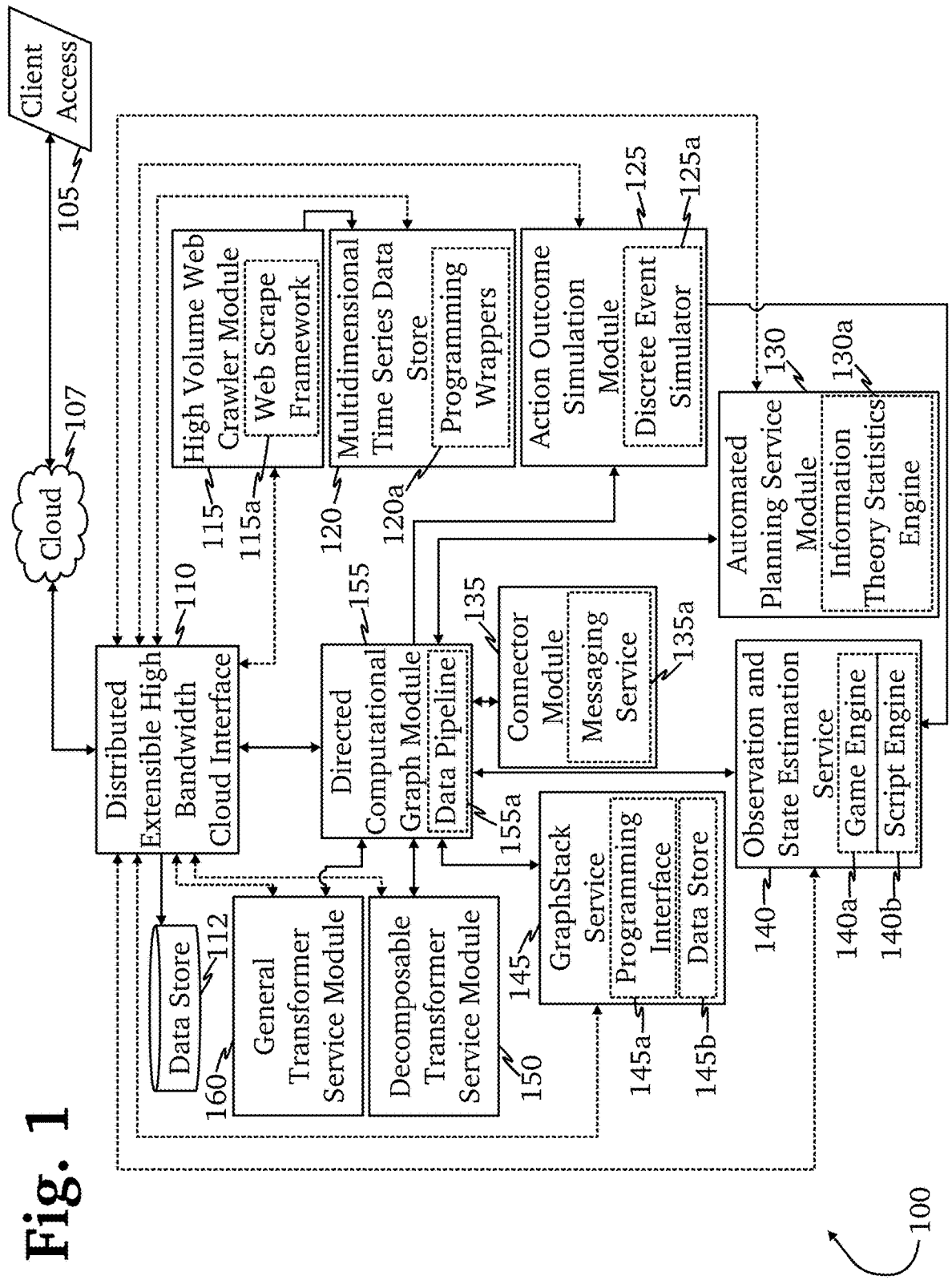
FIG. 1 is a diagram of an exemplary architecture of an advanced cyber decision platform according to one aspect.

The inventor has conceived, and reduced to practice, a system and method for network cybersecurity analysis that uses user and entity behavioral analysis combined with network topology information to provide improved cybersecurity. The system and method involve gathering network entity information, establishing baseline behaviors for each entity, and monitoring each entity for behavioral anomalies that might indicate cybersecurity concerns. Further, the system and method involve incorporating network topology information into the analysis by generating a model of the network, annotating the model with risk and criticality information for each entity in the model and with a vulnerability level between entities, and using the model to evaluate cybersecurity risks to the network. Risks and vulnerabilities associated with user entities may be represented, in part or in whole, by the behavioral analyses and monitoring of those user entities.

One or more different aspects may be described in the present application. Further, for one or more of the aspects described herein, numerous alternative arrangements may be described; it should be appreciated that these are presented for illustrative purposes only and are not limiting of the aspects contained herein or the claims presented herein in any way. One or more of the arrangements may be widely applicable to numerous aspects, as may be readily apparent from the disclosure. In general, arrangements are described in sufficient detail to enable those skilled in the art to practice one or more of the aspects, and it should be appreciated that other arrangements may be utilized and that structural, logical, software, electrical and other changes may be made without departing from the scope of the particular aspects. Particular features of one or more of the aspects described herein may be described with reference to one or more particular aspects or figures that form a part of the present disclosure, and in which are shown, by way of illustration, specific arrangements of one or more of the aspects. It should be appreciated, however, that such features are not limited to usage in the one or more particular aspects or figures with reference to which they are described. The present disclosure is neither a literal description of all arrangements of one or more of the aspects nor a listing of features of one or more of the aspects that must be present in all arrangements.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible aspects and in order to more fully illustrate one or more aspects. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the aspects, and does not imply that the illustrated process is preferred. Also, steps are generally described once per aspect, but this does not mean they must occur once, or that they may only occur once each time a process, method, or algorithm is carried out or executed. Some steps may be omitted in some aspects or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other aspects need not include the device itself.

Techniques and mechanisms described or referenced herein will sometimes be described in singular form for clarity. However, it should be appreciated that particular aspects may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various aspects in which, for example, functions may be executed out of order from that shown or discussed, including substantially concurrently or in reverse order, depending on the functionality involved, as would be understood by those having ordinary skill in the art.

Definitions

As used herein, "graph" is a representation of information and relationships, where each primary unit of information makes up a "node" or "vertex" of the graph and the relationship between two nodes makes up an edge of the graph. Nodes can be further qualified by the connection of one or more descriptors or "properties" to that node. For example, given the node "James R," name information for a person, qualifying properties might be "183 cm tall", "DOB Aug. 13, 1965" and "speaks English". Similar to the use of properties to further describe the information in a node, a relationship between two nodes that forms an edge can be qualified using a "label". Thus, given a second node "Thomas G," an edge between "James R" and "Thomas G" that indicates that the two people know each other might be labeled "knows." When graph theory notation (Graph= (Vertices, Edges)) is applied this situation, the set of nodes are used as one parameter of the ordered pair, V and the set of 2 element edge endpoints are used as the second parameter of the ordered pair, E. When the order of the edge endpoints within the pairs of E is not significant, for example, the edge James R, Thomas G is equivalent to Thomas G, James R, the graph is designated as "undirected." Under circumstances when a relationship flows from one node to another in one direction, for example James R is "taller" than Thomas G, the order of the endpoints is significant. Graphs with such edges are designated as "directed." In the distributed computational graph system, transformations within transformation pipeline are represented as directed graph with each transformation comprising a node and the output messages between transformations comprising edges. Distributed computational graph stipulates the potential use of non-linear transformation pipelines which are programmatically linearized. Such linearization can result in exponential growth of resource consumption. The most sensible approach to overcome possibility is to introduce new transformation pipelines just as they are needed, creating only those that are ready to compute. Such method results in transformation graphs which are highly variable in size and node, edge composition as the system processes data streams. Those familiar with the art will realize that transformation graph may assume many shapes and sizes with a vast topography of edge relationships. The examples given were chosen for illustrative purposes only and represent a small number of the simplest of possibilities. These examples should not be taken to define the possible graphs expected as part of operation of the invention As used herein, "transformation" is a function performed on zero or more streams of input data which results in a single stream of output which may or may not then be used as input for another transformation. Transformations may comprise any combination of machine, human or machine-human interactions Transformations need not change data that enters them, one example of this type of transformation would be a storage transformation which would receive input and then act as a queue for that data for subsequent transformations. As implied above, a specific transformation may generate output data in the absence of input data. A time stamp serves as a example. In the invention, transformations are placed into pipelines such that the output of one transformation may serve as an input for another. These pipelines can consist of two or more transformations with the number of transformations limited only by the resources of the system. Historically, transformation pipelines have been linear with each transformation in the pipeline receiving input from one antecedent and providing output to one subsequent with no branching or iteration. Other pipeline configurations are possible. The invention is designed to permit several of these configurations including, but not limited to: linear, afferent branch, efferent branch and cyclical.

A "database" or "data storage subsystem" (these terms may be considered substantially synonymous), as used herein, is a system adapted for the long-term storage, indexing, and retrieval of data, the retrieval typically being via some sort of querying interface or language. "Database" may be used to refer to relational database management systems known in the art, but should not be considered to be limited to such systems. Many alternative database or data storage system technologies have been, and indeed are being, introduced in the art, including but not limited to distributed non-relational data storage systems such as Hadoop, column-oriented databases, in-memory databases, and the like. While various aspects may preferentially employ one or another of the various data storage subsystems available in the art (or available in the future), the invention should not be construed to be so limited, as any data storage architecture may be used according to the aspects. Similarly, while in some cases one or more particular data storage needs are described as being satisfied by separate components (for example, an expanded private capital markets database and a configuration database), these descriptions refer to functional uses of data storage systems and do not refer to their physical architecture. For instance, any group of data storage systems of databases referred to herein may be included together in a single database management system operating on a single machine, or they may be included in a single database management system operating on a cluster of machines as is known in the art. Similarly, any single database (such as an expanded private capital markets database) may be implemented on a single machine, on a set of machines using clustering technology, on several machines connected by one or more messaging systems known in the art, or in a master/slave arrangement common in the art. These examples should make clear that no particular architectural approaches to database management is preferred according to the invention, and choice of data storage technology is at the discretion of each implementer, without departing from the scope of the invention as claimed.

A "data context", as used herein, refers to a set of arguments identifying the location of data. This could be a Rabbit queue, a .csv file in cloud-based storage, or any other such location reference except a single event or record. Activities may pass either events or data contexts to each other for processing. The nature of a pipeline allows for direct information passing between activities, and data locations or files do not need to be predetermined at pipeline start.

A "pipeline", as used herein and interchangeably referred to as a "data pipeline" or a "processing pipeline", refers to a set of data streaming activities and batch activities. Streaming and batch activities can be connected indiscriminately within a pipeline. Events will flow through the streaming activity actors in a reactive way. At the junction of a streaming activity to batch activity, there will exist a StreamBatchProtocol data object. This object is responsible for determining when and if the batch process is run. One or more of three possibilities can be used for processing triggers: regular timing interval, every N events, or optionally an external trigger. The events are held in a queue or similar until processing. Each batch activity may contain a "source" data context (this may be a streaming context if the upstream activities are streaming), and a "destination" data context (which is passed to the next activity). Streaming activities may have an optional "destination" streaming data context (optional meaning: caching/persistence of events vs. ephemeral), though this should not be part of the initial implementation.

Conceptual Architecture

FIG. 1 is a diagram of an exemplary architecture of an advanced cyber decision platform (ACDP) 100 according to one aspect. Client access to the system 105 for specific data entry, system control and for interaction with system output such as automated predictive decision making and planning and alternate pathway simulations, occurs through the system's distributed, extensible high bandwidth cloud interface 110 which uses a versatile, robust web application driven interface for both input and display of client-facing information via network 107 and operates a data store 112 such as, but not limited to MONGODB™, COUCHDB™, CASSANDRA™ or REDIS™ according to various arrangements. Much of the business data analyzed by the system both from sources within the confines of the client business, and from cloud based sources, also enter the system through the cloud interface 110, data being passed to the connector module 135 which may possess the API routines 135a needed to accept and convert the external data and then pass the normalized information to other analysis and transformation components of the system, the directed computational graph module 155, high volume web crawler module 115, multidimensional time series database 120 and the graph stack service 145. The directed computational graph module 155 retrieves one or more streams of data from a plurality of sources, which includes, but is in no way not limited to, a plurality of physical sensors, network service providers, web based questionnaires and surveys, monitoring of electronic infrastructure, crowd sourcing campaigns, and human input device information. Within the directed computational graph module 155, data may be split into two identical streams in a specialized pre-programmed data pipeline 155a, wherein one sub-stream may be sent for batch processing and storage while the other sub-stream may be reformatted for transformation pipeline analysis. The data is then transferred to the general transformer service module 160 for linear data transformation as part of analysis or the decomposable transformer service module 150 for branching or iterative transformations that are part of analysis. The directed computational graph module 155 represents all data as directed graphs where the transformations are nodes and the result messages between transformations edges of the graph. The high volume web crawling module 115 uses multiple server hosted preprogrammed web spiders, which while autonomously configured are deployed within a web scraping framework 115a of which SCRAPY™ is an example, to identify and retrieve data of interest from web based sources that are not well tagged by conventional web crawling technology. The multiple dimension time series data store module 120 may receive streaming data from a large plurality of sensors that may be of several different types. The multiple dimension time series data store module may also store any time series data encountered by the system such as but not limited to enterprise network usage data, component and system logs, performance data, network service information captures such as, but not limited to news and financial feeds, and sales and service related customer data. The module is designed to accommodate irregular and high volume surges by dynamically allotting network bandwidth and server processing channels to process the incoming data. Inclusion of programming wrappers for languages examples of which are, but not limited to C++, PERL, PYTHON, and ERLANG™ allows sophisticated programming logic to be added to the default function of the multidimensional time series database 120 without intimate knowledge of the core programming, greatly extending breadth of function. Data retrieved by the multidimensional time series database 120 and the high volume web crawling module 115 may be further analyzed and transformed into task optimized results by the directed computational graph 155 and associated general transformer service 150 and decomposable transformer service 160 modules. Alternately, data from the multidimensional time series database and high volume web crawling modules may be sent, often with scripted cuing information determining important vertexes 145a, to the graph stack service module 145 which, employing standardized protocols for converting streams of information into graph representations of that data, for example, open graph internet technology although the invention is not reliant on any one standard. Through the steps, the graph stack service module 145 represents data in graphical form influenced by any pre-determined scripted modifications 145a and stores it in a graph-based data store 145b such as GIRAPH™ or a key value pair type data store REDIS™, or RIAK™, among others, all of which are suitable for storing graph-based information.

Results of the transformative analysis process may then be combined with further client directives, additional business rules and practices relevant to the analysis and situational information external to the already available data in the automated planning service module 130 which also runs powerful information theory 130a based predictive statistics functions and machine learning algorithms to allow future trends and outcomes to be rapidly forecast based upon the current system derived results and choosing each a plurality of possible business decisions. The using all available data, the automated planning service module 130 may propose business decisions most likely to result is the most favorable business outcome with a usably high level of certainty. Closely related to the automated planning service module in the use of system derived results in conjunction with possible externally supplied additional information in the assistance of end user business decision making, the action outcome simulation module 125 with its discrete event simulator programming module 125a coupled with the end user facing observation and state estimation service 140 which is highly scriptable 140b as circumstances require and has a game engine 140a to more realistically stage possible outcomes of business decisions under consideration, allows business decision makers to investigate the probable outcomes of choosing one pending course of action over another based upon analysis of the current available data.

For example, the Information Assurance department is notified by the system 100 that principal X is using credentials K (Kerberos Principal Key) never passed to it to access service Y. Service Y utilizes these same credentials to access secure data on data store Z. This correctly generates an alert as suspicious lateral movement through the network and will recommend isolation of X and Y and suspension of K based on continuous baseline network traffic monitoring by the multidimensional time series data store 120 programmed to process such data 120a, rigorous analysis of the network baseline by the directed computational graph 155 with its underlying general transformer service module 160 and decomposable transformer service module 150 in conjunction with the AI and primed machine learning capabilities 130a of the automated planning service module 130 which had also received and assimilated publicly available from a plurality of sources through the multi-source connection APIs of the connector module 135. Ad hoc simulations of these traffic patterns are run against the baseline by the action outcome simulation module 125 and its discrete event simulator 125a which is used here to determine probability space for likelihood of legitimacy. The system 100, based on this data and analysis, was able to detect and recommend mitigation of a cyberattack that represented an existential threat to all business operations, presenting, at the time of the attack, information most needed for an actionable plan to human analysts at multiple levels in the mitigation and remediation effort through use of the observation and state estimation service 140 which had also been specifically preprogrammed to handle cybersecurity events 140*b*.

According to one aspect, the advanced cyber decision platform, a specifically programmed usage of the business operating system, continuously monitors a client enterprise's normal network activity for behaviors such as but not limited to normal users on the network, resources accessed by each user, access permissions of each user, machine to machine traffic on the network, sanctioned external access to the core network and administrative access to the network's identity and access management servers in conjunction with real-time analytics informing knowledge of cyberattack methodology. The system then uses this information for two purposes: First, the advanced computational analytics and simulation capabilities of the system are used to provide immediate disclosure of probable digital access points both at the network periphery and within the enterprise's information transfer and trust structure and recommendations are given on network changes that should be made to harden it prior to or during an attack. Second, the advanced cyber decision platform continuously monitors the network in real-time both for types of traffic and through techniques such as deep packet inspection for pre-decided analytically significant deviation in user traffic for indications of known cyberattack vectors such as, but not limited to, ACTIVE DIRECTORY™/Kerberos pass-the-ticket attack, ACTIVE DIRECTORY™/Kerberos pass-the-hash attack and the related ACTIVE DIRECTORY™/Kerberos overpass-the-hash attack, ACTIVE DIRECTORY™/Kerberos Skeleton Key, ACTIVE DIRECTORY™/Kerberos golden and silver ticket attack, privilege escalation attack, compromised user credentials, and ransomware disk attacks. When suspicious activity at a level signifying an attack (for example, including but not limited to skeleton key attacks, pass-the-hash attacks, or attacks via compromised user credentials) is determined, the system issues action-focused alert information to all predesignated parties specifically tailored to their roles in attack mitigation or remediation and formatted to provide predictive attack modeling based upon historic, current, and contextual attack progression analysis such that human decision makers can rapidly formulate the most effective courses of action at their levels of responsibility in command of the most actionable information with as little distractive data as possible. The system then issues defensive measures in the most actionable form to end the attack with the least possible damage and exposure. All attack data are persistently stored for later forensic analysis.

Figure 1A:
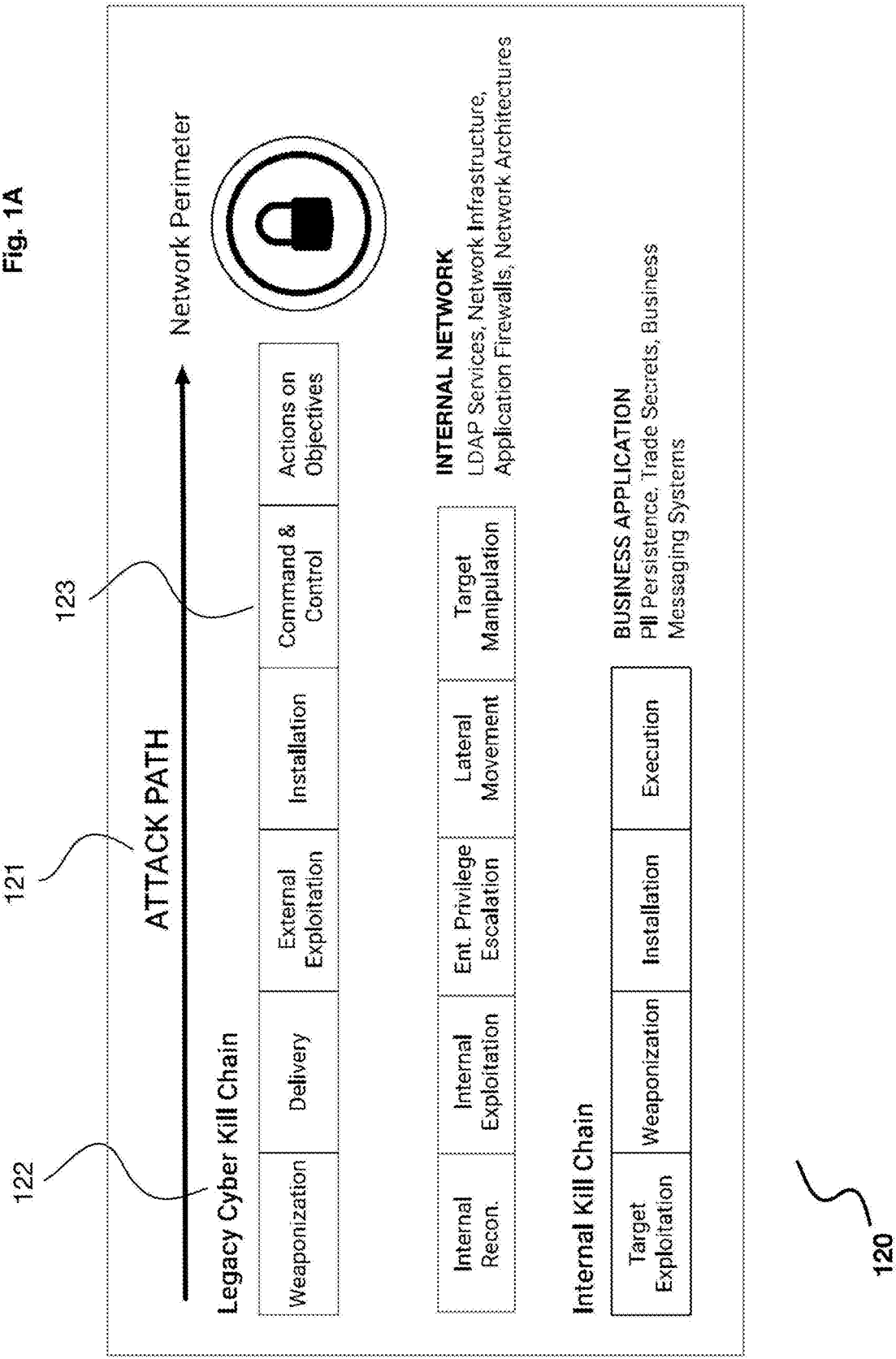
FIG. 1A is a diagram showing a typical method of cyberattack on a networked system.

FIG. 1A is a diagram showing the typical method of cyberattack on a networked system 120. The general attack path 121 flows from left to right. A kill chain 122 shows the general steps 123 required to complete a cyberattack from furthest away from completion of the attack (toward the left) to closest to completion of the attack (toward the right). The further to the left of the diagram that a cyber attack is stopped, the fewer components of the system are compromised.

Figure 1B:
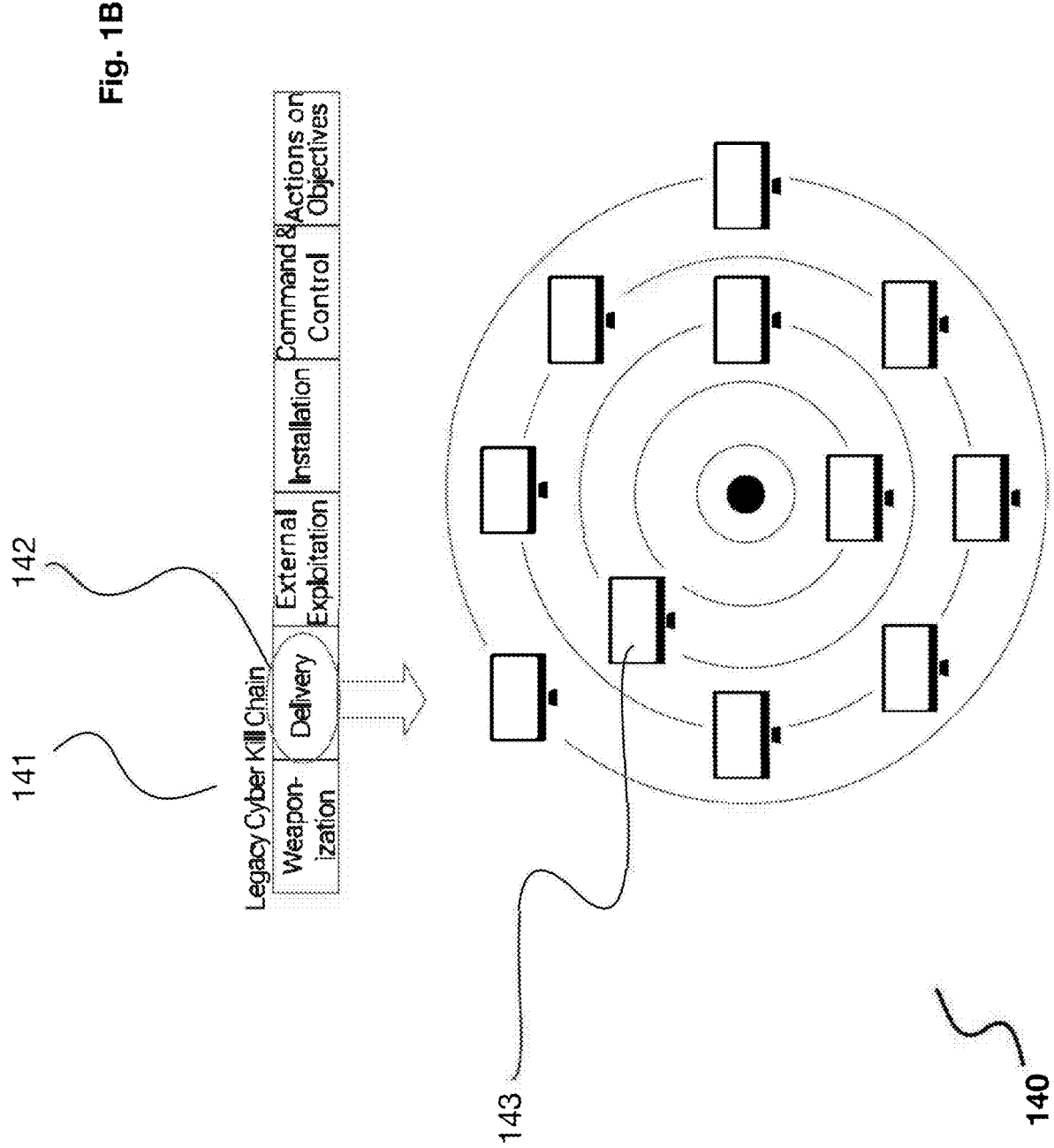
FIG. 1B is a diagram showing a method of cyberattack used when "rogue" devices are attached to a network.

FIG. 1B is a diagram showing a method of cyberattack used when "rogue" devices are attached to the network 140. Rogue devices are devices attached to the network, usually without the network administrator's knowledge, that create vulnerabilities in the network. Examples of rogue devices are: wireless credit card skimmers or keyloggers, un-configured or mis-configured wireless printers, "hot spots" enabled by non-malicious employees for their convenience, a WiFi USB card used by attackers to lure unsuspecting users to log onto a fake wireless network. The often transient nature of these exploits makes them particularly difficult to detect and mitigate using state of the art technology. In one example of this method of cyberattack, called the "legacy cyber kill chain" 141, the attacker attempts to access the system by finding and exploiting legacy devices whose hardware and/or software are no longer capable of preventing modern, sophisticated cyberattacks. In this particular use, the advanced cyber decision platform identifies such legacy devices 143, and blocks access to the network from those devices, thus terminating the cyberattack at the delivery stage 142 of the kill chain.

Figure 1C:
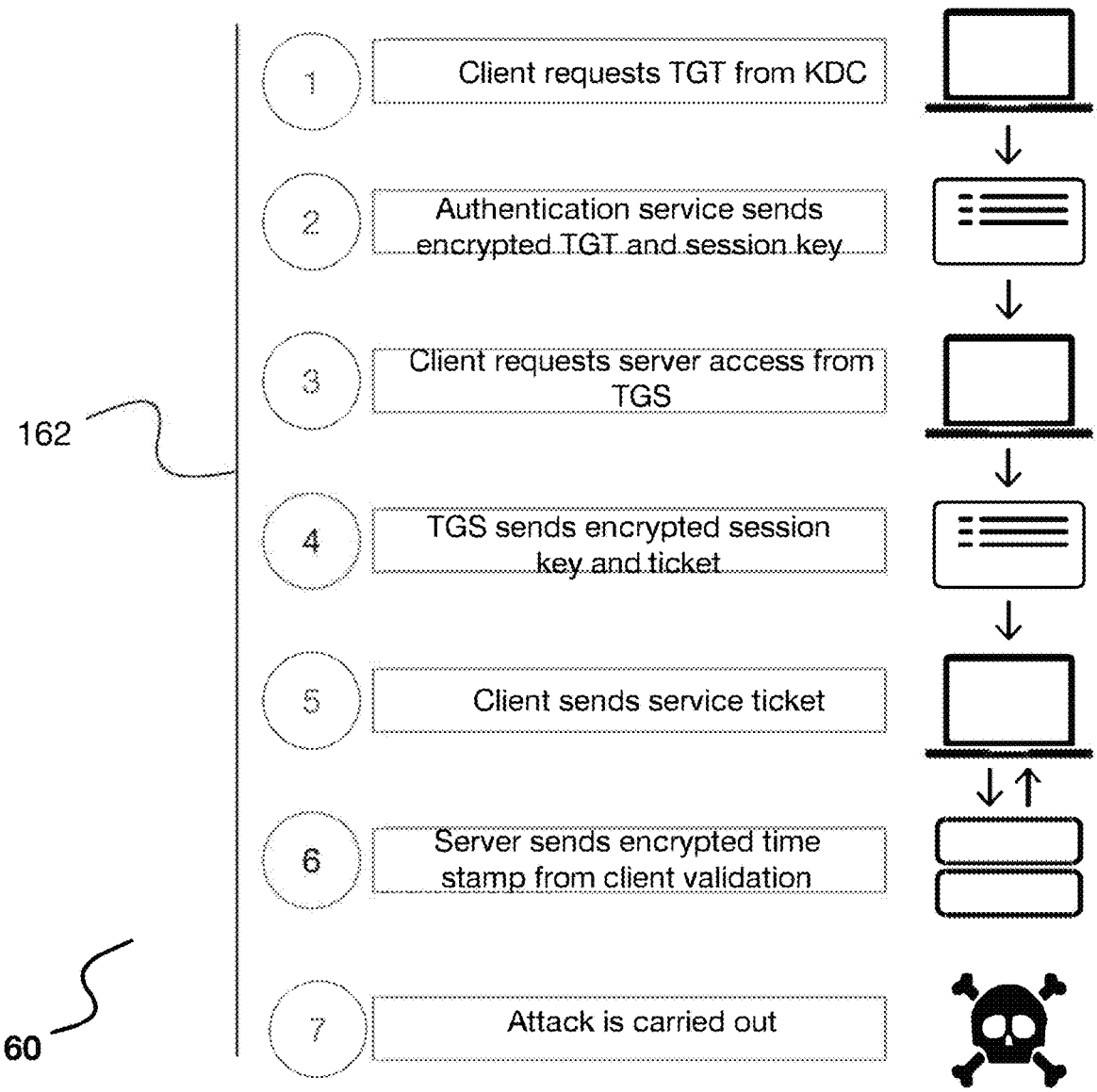
FIG. 1C is a diagram showing a method of cyberattack used when the network perimeter has been breached.

FIG. 1C is a diagram showing a method of cyberattack used when the network perimeter has been breached 160. This kill chain 161 for this method, also called a "golden ticket" attack, involves escalating the administrative privileges of the attacker, giving the attacker full control over files, servers, and services 162. The current state of the art for preventing privilege escalation attacks is to use a network authentication protocol called "Kerberos" to generate and verify encrypted digital signatures. However, if an attacker is able to compromise the Kerberos system, the attacker can use Kerberos to forge surreptitious but protocol-valid digital signatures giving the attacker full administrative control over the network (the "Golden Ticket") without detection. Such attacks represent a high level of threat, and the advanced cyber decision platform can identify and prevent them by analyzing a broad range of data and sensors beyond just the digital signature. In this particular use, the advanced cyber decision platform continuously monitors the entire network to identify erroneously issued tickets, stops the issuance of the ticket, and notifies the network administrators of an attempted attack, thus terminating the cyberattack at the privilege escalation stage 163 of the kill chain.

Figure 1D:
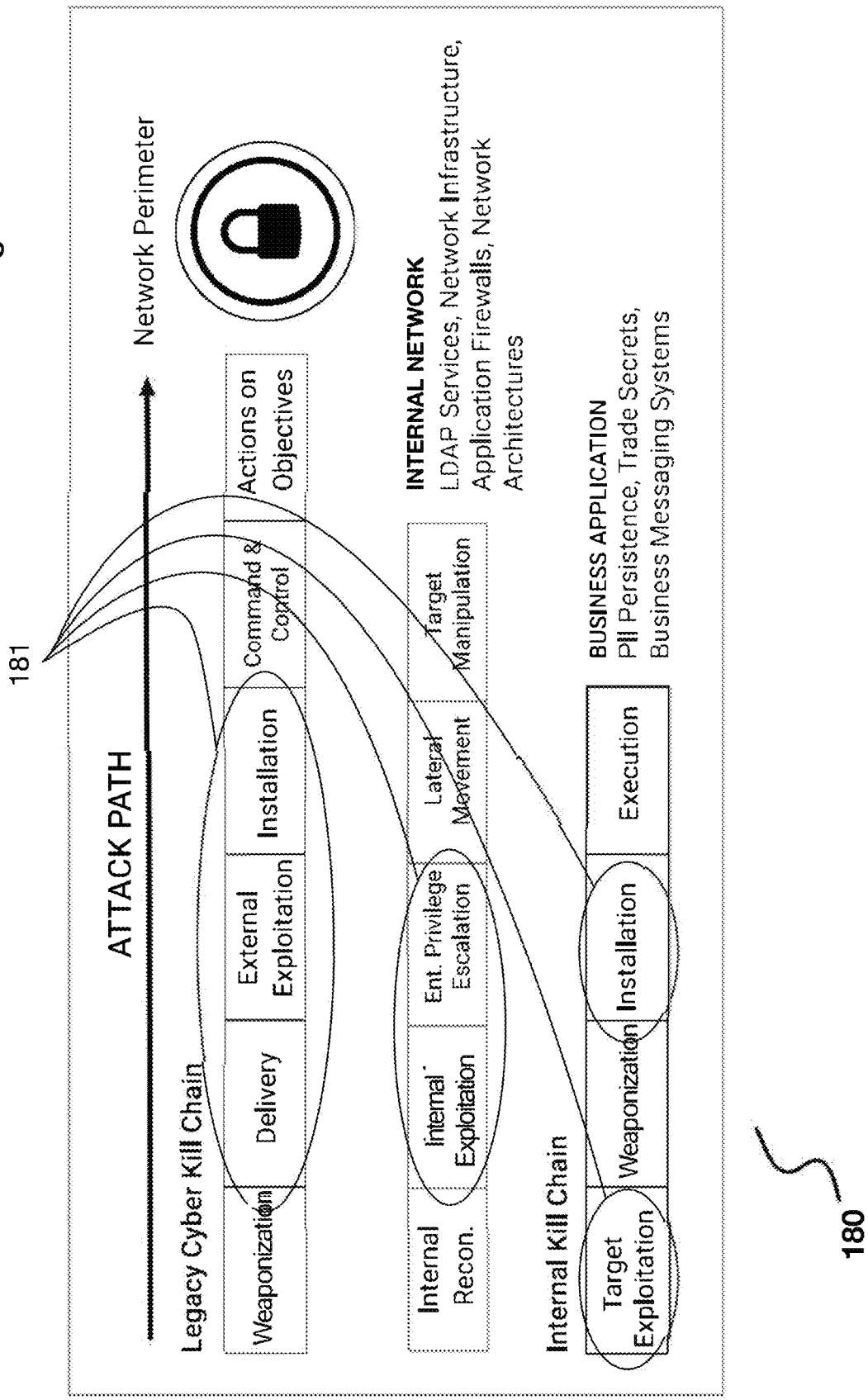
FIG. 1D is a diagram showing the typical method of cyberattack used when software has not been patched in a timely manner.

FIG. 1D is a diagram showing the typical method of cyberattack used when software has not been patched in a timely manner 180. In this method, there can be vulnerabilities at many points in the network, depending on the nature of the patches that have not yet been applied. The state of the art in this area is to apply patches on a compliance basis, which means that vulnerabilities are given a high, moderate, or low criticality rating, and patches are required to be installed in a pre-determined amount of time depending on the rating. This leads to inefficiencies, vulnerabilities, and increased cost, as compliance-based patching does not account for factors such as: resources allocated to patching vulnerabilities that are not present on a particular network, high-criticality patches may be deployed on systems with no valuable business data before low-criticality patches are deployed on systems with highly valuable data, interconnectivity of systems with the rest of the network, and the like. Further, vulnerabilities can be exploited before patches are distributed to the National Vulnerability Database and/or to third party scanning software. In this particular use, the advanced cyber decision platform leverages superior data extraction capabilities to collect information about new vulnerabilities and exploits before they make it to NVD and third party scanners, increasing network protection above the current state of the art. Further, the advanced cyber decision platform continuously monitors the entire network to identify and prioritize available patches, thus protecting the network from attack at multiple stages 181 of the kill chain.

FIG. 2 is a flow diagram of an exemplary function of the business operating system in the detection and mitigation of predetermining factors leading to and steps to mitigate ongoing cyberattacks 200. The system continuously retrieves network traffic data 201 which may be stored and preprocessed by the multidimensional time series data store 120 and its programming wrappers 120a. All captured data are then analyzed to predict the normal usage patterns of network nodes such as internal users, network connected systems and equipment and sanctioned users external to the enterprise boundaries for example off-site employees, contractors and vendors, just to name a few likely participants. Of course, normal other network traffic may also be known to those skilled in the field, the list given is not meant to be exclusive and other possibilities would not fall outside the design of the invention. Analysis of network traffic may include graphical analysis of parameters such as network item to network usage using specifically developed programming in the graphstack service 145, 145a, analysis of usage by each network item may be accomplished by specifically pre-developed algorithms associated with the directed computational graph module 155, general transformer service module 160 and decomposable service module 150, depending on the complexity of the individual usage profile 201. These usage pattern analyses, in conjunction with additional data concerning an enterprise's network topology; gateway firewall programming; internal firewall configuration; directory services protocols and configuration; and permissions profiles for both users and for access to sensitive information, just to list a few non-exclusive examples may then be analyzed further within the automated planning service module 130, where machine learning techniques which include but are not limited to information theory statistics 130a may be employed and the action outcome simulation module 125, specialized for predictive simulation of outcome based on current data 125a may be applied to formulate a current, up-to-date and continuously evolving baseline network usage profile 202. This same data would be combined with up-to-date known cyberattack methodology reports, possibly retrieved from several divergent and exogenous sources through the use of the multi-application programming interface aware connector module 135 to present preventative recommendations to the enterprise decision makers for network infrastructure changes, physical and configuration-based to cost effectively reduce the probability of a cyberattack and to significantly and most cost effectively mitigate data exposure and loss in the event of attack 203, 204.

While some of these options may have been partially available as piecemeal solutions in the past, we believe the ability to intelligently integrate the large volume of data from a plurality of sources on an ongoing basis followed by predictive simulation and analysis of outcome based upon that current data such that actionable, business practice efficient recommendations can be presented is both novel and necessary in this field.

Once a comprehensive baseline profile of network usage using all available network traffic data has been formulated, the specifically tasked business operating system continuously polls the incoming traffic data for activities anomalous to that baseline as determined by pre-designated boundaries 205. Examples of anomalous activities may include a user attempting to gain access several workstations or servers in rapid succession, or a user attempting to gain access to a domain server of server with sensitive information using random userIDs or another user's userID and password, or attempts by any user to brute force crack a privileged user's password, or replay of recently issued ACTIVE DIRECTORY™/Kerberos ticket granting tickets, or the presence on any known, ongoing exploit on the network or the introduction of known malware to the network, just to name a very small sample of the cyberattack profiles known to those skilled in the field. The invention, being predictive as well as aware of known exploits is designed to analyze any anomalous network behavior, formulate probable outcomes of the behavior, and to then issue any needed alerts regardless of whether the attack follows a published exploit specification or exhibits novel characteristics deviant to normal network practice. Once a probable cyberattack is detected, the system then is designed to get needed information to responding parties 206 tailored, where possible, to each role in mitigating the attack and damage arising from it 207. This may include the exact subset of information included in alerts and updates and the format in which the information is presented which may be through the enterprise's existing security information and event management system. Network administrators, then, might receive information such as but not limited to where on the network the attack is believed to have originated, what systems are believed currently affected, predictive information on where the attack may progress, what enterprise information is at risk and actionable recommendations on repelling the intrusion and mitigating the damage, whereas a chief information security officer may receive alert including but not limited to a timeline of the cyberattack, the services and information believed compromised, what action, if any has been taken to mitigate the attack, a prediction of how the attack may unfold and the recommendations given to control and repel the attack 207, although all parties may access any network and cyberattack information for which they have granted access at any time, unless compromise is suspected. Other specifically tailored updates may be issued by the system 206, 207.

Figure 2A:
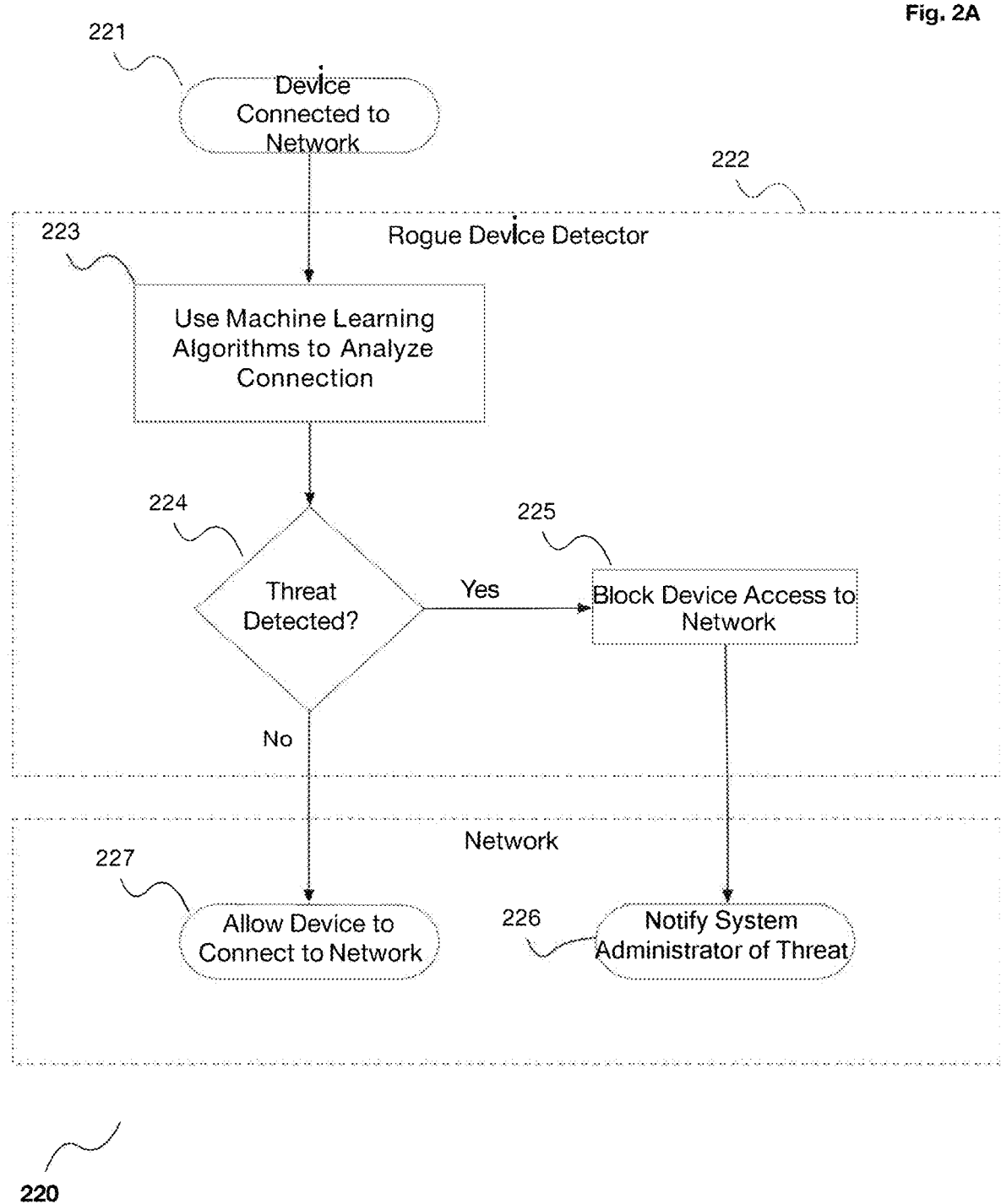
FIG. 2A is a process diagram showing a general flow of the process used to detect rogue devices and analyze them for threats.

FIG. 2A is a process diagram showing a general flow of the process used to detect rogue devices and analyze them for threats 220. Whenever a device is connected to the network 221, the connection is immediately sent to the rogue device detector 222 for analysis. As disclosed below at 300, the advanced cyber decision platform uses machine learning algorithms to analyze system-wide data to detect threats. The connected device is analyzed 223 to assess its device type, settings, and capabilities, the sensitivity of the data stored on the server to which the device wishes to connect, network activity, server logs, remote queries, and a multitude of other data to determine the level of threat associated with the device. If the threat reaches a certain level 224, the device is automatically prevented from accessing the network 225, and the system administrator is notified of the potential threat, along with contextually-based, tactical recommendations for optimal response based on potential impact 226. Otherwise, the device is allowed to connect to the network 227.

Figure 2B:
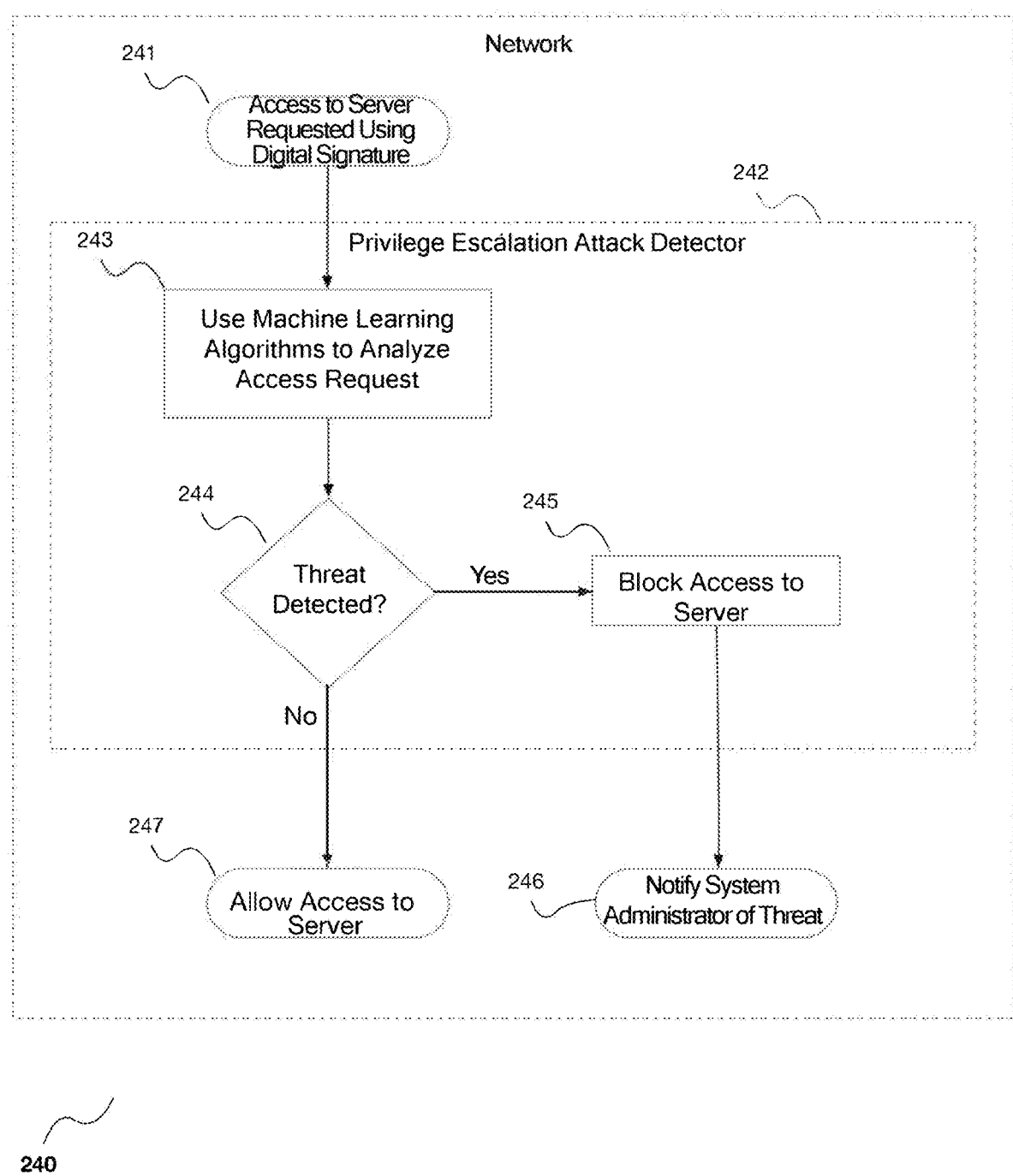
FIG. 2B is a process diagram showing a general flow of the process used to detect and prevent privilege escalation attacks on a network.

FIG. 2B is a process diagram showing a general flow of the process used to detect and prevent privilege escalation attacks on a network (otherwise known as "Golden Ticket" attacks) 240. When access to a server within the network is requested using a digital signature 241, the connection is immediately sent to the privilege escalation attack detector 242 for analysis. As disclosed below at 300, the advanced cyber decision platform uses machine learning algorithms to analyze system-wide data to detect threats. The access request is analyzed 243 to assess the validity of the access request using the digital signature validation, plus other system-wide information such as the sensitivity of the server being accessed, the newness of the digital signature, the digital signature's prior usage, and other measures of the digital signature's validity. If the assessment determines that the access request represents a significant threat 244, even despite the Kerberos validation of the digital signature, the access request is automatically denied 245, and the system administrator is notified of the potential threat, along with contextually-based, tactical recommendations for optimal response based on potential impact 246. Otherwise, the access request is granted 247.

FIG. 2C is a process diagram showing a general flow of the process used to manage vulnerabilities associated with patches to network software 260. As part of a continuously-operating risk-based vulnerability and patch management monitor 261, data is gathered from both sources external to the network 262 and internal to the network 263. As disclosed below at 300, the advanced cyber decision platform uses machine learning algorithms to analyze system-wide data to detect threats. The data is analyzed 264 to determine whether network vulnerabilities exist for which a patch has not yet been created and/or applied. If the assessment determines that such a vulnerability exists 265, whether or not all software has been patched according to manufacturer recommendations, the system administrator is notified of the potential vulnerability, along with contextually-based, tactical recommendations for optimal response based on potential impact 266. Otherwise, network activity is allowed to continue normally 267.

Figure 3:
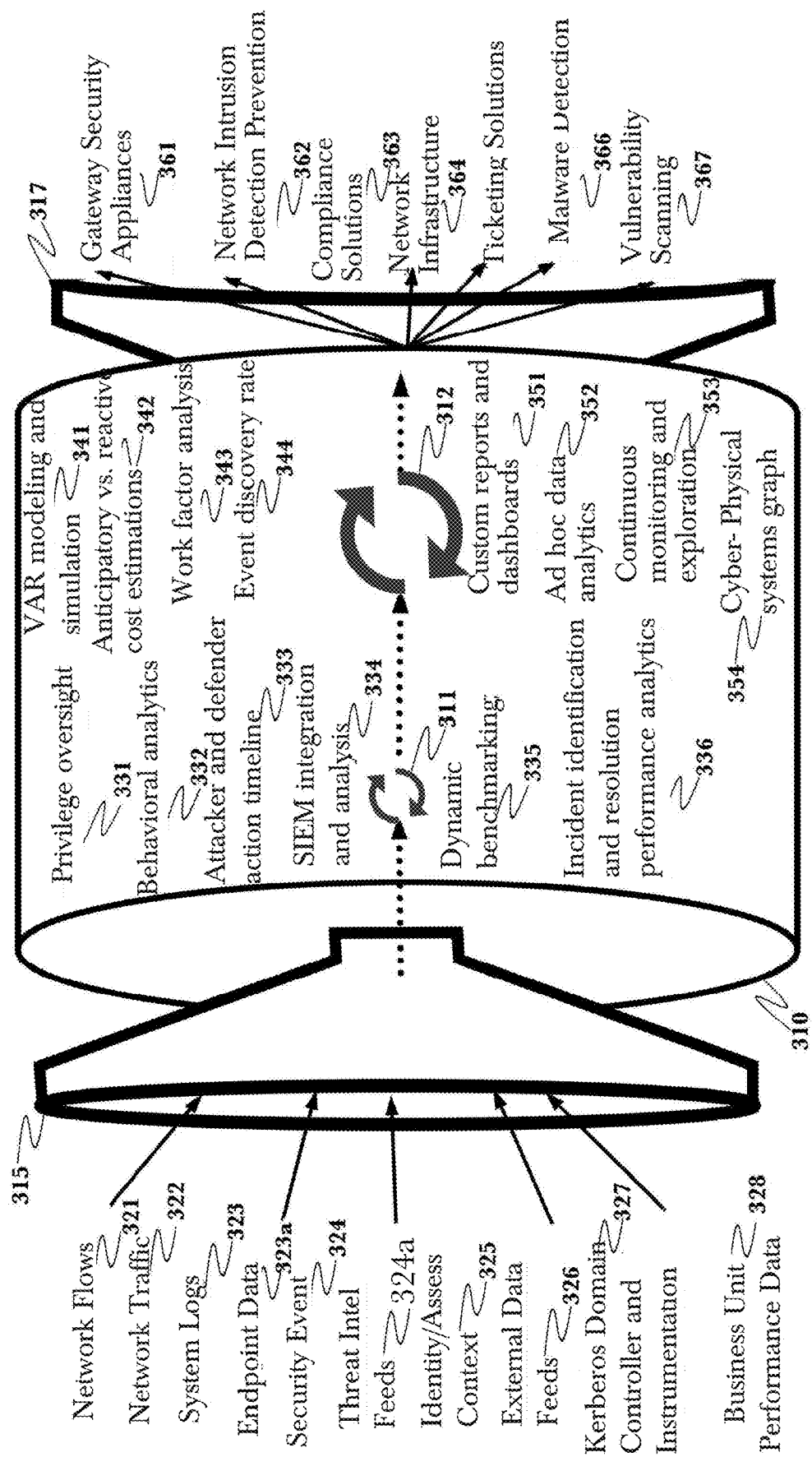
FIG. 3 is a process diagram showing business operating system functions in use to mitigate cyberattacks.

FIG. 3 is a process diagram showing a general flow 300 of business operating system functions in use to mitigate cyberattacks. Input network data which may include network flow patterns 321, the origin and destination of each piece of measurable network traffic 322, system logs from servers and workstations on the network 323, endpoint data 323a, any security event log data from servers or available security information and event (SIEM) systems 324, external threat intelligence feeds 324a, identity or assessment context 325, external network health or cybersecurity feeds 326, Kerberos domain controller or ACTIVE DIRECTORY™ server logs or instrumentation 327 and business unit performance related data 328, among many other possible data types for which the invention was designed to analyze and integrate, may pass into 315 the business operating system 310 for analysis as part of its cyber security function. These multiple types of data from a plurality of sources may be transformed for analysis 311, 312 using at least one of the specialized cybersecurity, risk assessment or common functions of the business operating system in the role of cybersecurity system, such as, but not limited to network and system user privilege oversight 331, network and system user behavior analytics 332, attacker and defender action timeline 333, SIEM integration and analysis 334, dynamic benchmarking 335, and incident identification and resolution performance analytics 336 among other possible cybersecurity functions; value at risk (VAR) modeling and simulation 341, anticipatory vs. reactive cost estimations of different types of data breaches to establish priorities 342, work factor analysis 343 and cyber event discovery rate 344 as part of the system's risk analytics capabilities; and the ability to format and deliver customized reports and dashboards 351, perform generalized, ad hoc data analytics on demand 352, continuously monitor, process and explore incoming data for subtle changes or diffuse informational threads 353 and generate cyber-physical systems graphing 354 as part of the business operating system's common capabilities. Output 317 can be used to configure network gateway security appliances 361, to assist in preventing network intrusion through predictive change to infrastructure recommendations 362, to alert an enterprise of ongoing cyberattack early in the attack cycle, possibly thwarting it but at least mitigating the damage 362, to record compliance to standardized guidelines or SLA requirements 363, to continuously probe existing network infrastructure and issue alerts to any changes which may make a breach more likely 364, suggest solutions to any domain controller ticketing weaknesses detected 365, detect presence of malware 366, and perform one time or continuous vulnerability scanning depending on client directives 367. These examples are, of course, only a subset of the possible uses of the system, they are exemplary in nature and do not reflect any boundaries in the capabilities of the invention.

Figure 4:
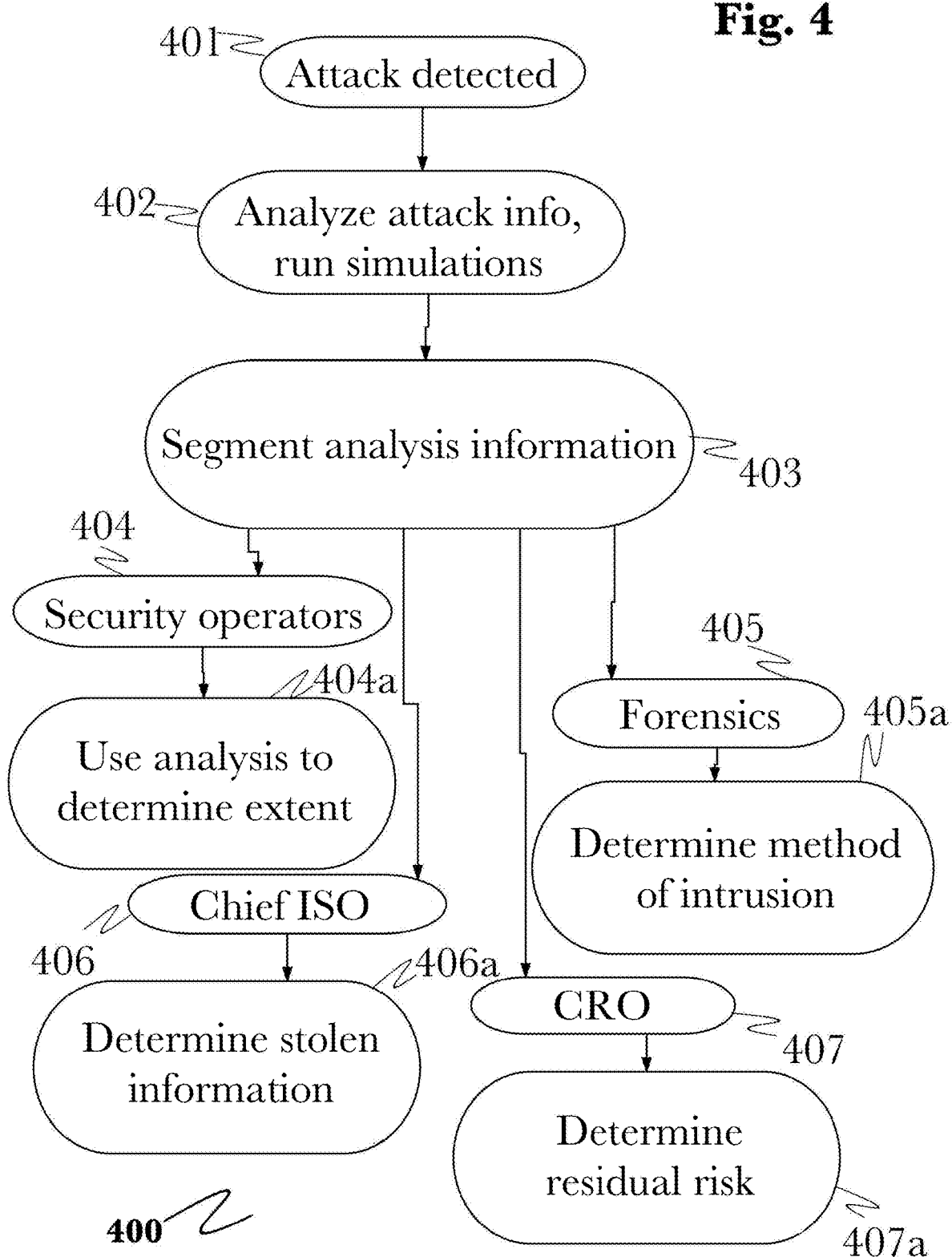
FIG. 4 is a process flow diagram of a method for segmenting cyberattack information to appropriate corporation parties.

FIG. 4 is a process flow diagram of a method for segmenting cyberattack information to appropriate corporation parties 400. As previously disclosed 200, 351, one of the strengths of the advanced cyber-decision platform is the ability to finely customize reports and dashboards to specific audiences, concurrently is appropriate. This customization is possible due to the devotion of a portion of the business operating system's programming specifically to outcome presentation by modules which include the observation and state estimation service 140 with its game engine 140a and script interpreter 140b. In the setting of cybersecurity, issuance of specialized alerts, updates and reports may significantly assist in getting the correct mitigating actions done in the most timely fashion while keeping all participants informed at predesignated, appropriate granularity. Upon the detection of a cyberattack by the system 401 all available information about the ongoing attack and existing cybersecurity knowledge are analyzed, including through predictive simulation in near real time 402 to develop both the most accurate appraisal of current events and actionable recommendations concerning where the attack may progress and how it may be mitigated. The information generated in totality is often more than any one group needs to perform their mitigation tasks. At this point, during a cyberattack, providing a single expansive and all inclusive alert, dashboard image, or report may make identification and action upon the crucial information by each participant more difficult, therefore the cybersecurity focused arrangement may create multiple targeted information streams each concurrently designed to produce most rapid and efficacious action throughout the enterprise during the attack and issue follow-up reports with and recommendations or information that may lead to long term changes afterward 403. Examples of groups that may receive specialized information streams include but may not be limited to front line responders during the attack 404, incident forensics support both during and after the attack 405, chief information security officer 406 and chief risk officer 407 the information sent to the latter two focused to appraise overall damage and to implement both mitigating strategy and preventive changes after the attack. Front line responders may use the cyber-decision platform's analyzed, transformed and correlated information specifically sent to them 404a to probe the extent of the attack, isolate such things as: the predictive attacker's entry point onto the enterprise's network, the systems involved or the predictive ultimate targets of the attack and may use the simulation capabilities of the system to investigate alternate methods of successfully ending the attack and repelling the attackers in the most efficient manner, although many other queries known to those skilled in the art are also answerable by the invention. Simulations run may also include the predictive effects of any attack mitigating actions on normal and critical operation of the enterprise's IT systems and corporate users. Similarly, a chief information security officer may use the cyber-decision platform to predictively analyze 406a what corporate information has already been compromised, predictively simulate the ultimate information targets of the attack that may or may not have been compromised and the total impact of the attack what can be done now and in the near future to safeguard that information. Further, during retrospective forensic inspection of the attack, the forensic responder may use the cyber-decision platform 405a to clearly and completely map the extent of network infrastructure through predictive simulation and large volume data analysis. The forensic analyst may also use the platform's capabilities to perform a time series and infrastructural spatial analysis of the attack's progression with methods used to infiltrate the enterprise's subnets and servers. Again, the chief risk officer would perform analyses of what information 407a was stolen and predictive simulations on what the theft means to the enterprise as time progresses. Additionally, the system's predictive capabilities may be employed to assist in creation of a plan for changes of the IT infrastructural that should be made that are optimal for remediation of cybersecurity risk under possibly limited enterprise budgetary constraints in place at the company so as to maximize financial outcome.

Figure 5:
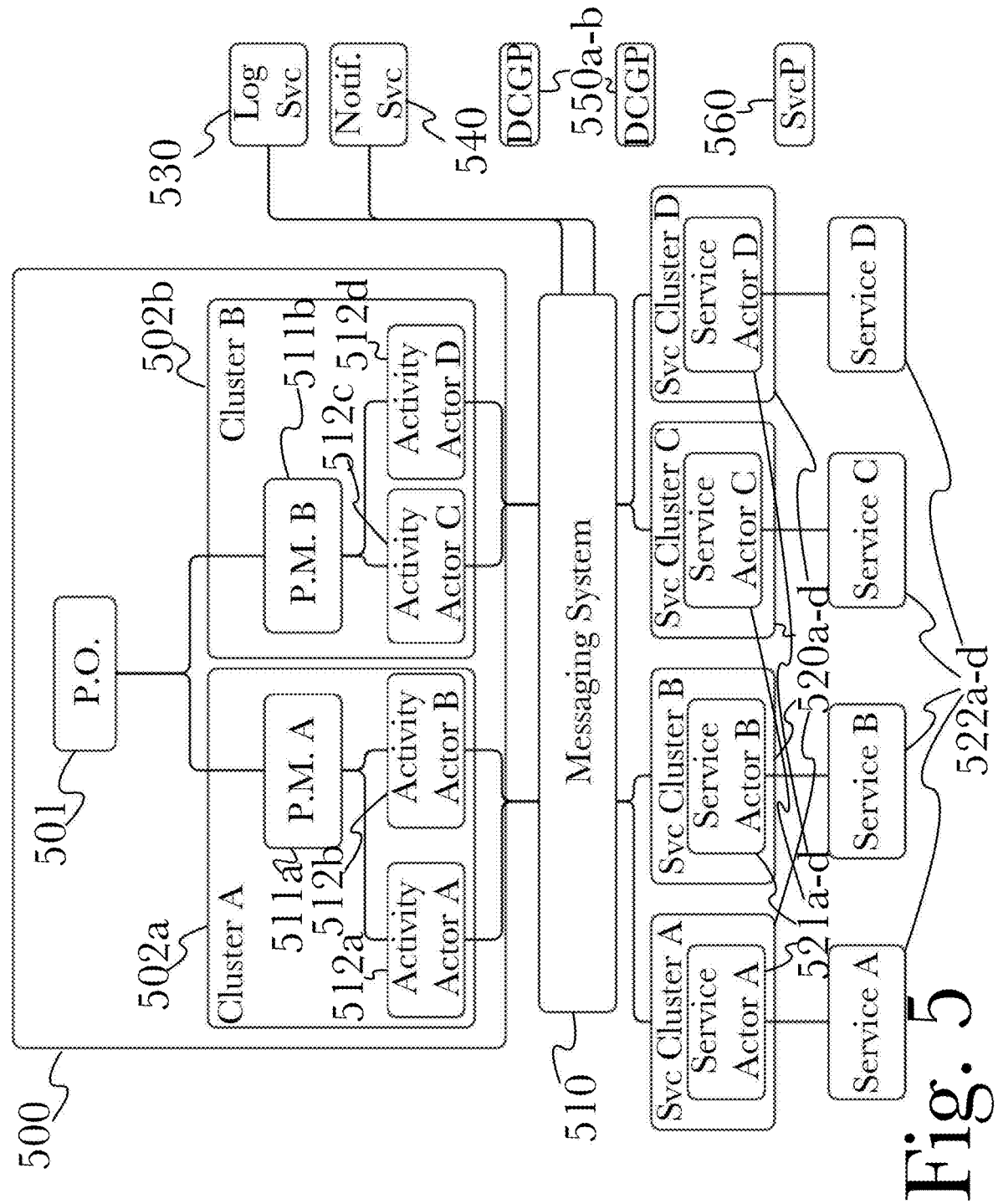
FIG. 5 is a diagram of an exemplary architecture for a system for rapid predictive analysis of very large data sets using an actor-driven distributed computational graph, according to one aspect.

FIG. 5 is a diagram of an exemplary architecture for a system for rapid predictive analysis of very large data sets using an actor-driven distributed computational graph 500, according to one aspect. According to the aspect, a DCG 500 may comprise a pipeline orchestrator 501 that may be used to perform a variety of data transformation functions on data within a processing pipeline, and may be used with a messaging system 510 that enables communication with any number of various services and protocols, relaying messages and translating them as needed into protocol-specific API system calls for interoperability with external systems (rather than requiring a particular protocol or service to be integrated into a DCG 500).

Pipeline orchestrator 501 may spawn a plurality of child pipeline clusters 502a-b, which may be used as dedicated workers for streamlining parallel processing. In some arrangements, an entire data processing pipeline may be passed to a child cluster 502a for handling, rather than individual processing tasks, enabling each child cluster 502a-b to handle an entire data pipeline in a dedicated fashion to maintain isolated processing of different pipelines using different cluster nodes 502a-b. Pipeline orchestrator 501 may provide a software API for starting, stopping, submitting, or saving pipelines. When a pipeline is started, pipeline orchestrator 501 may send the pipeline information to an available worker node 502a-b, for example using AKKA™ clustering. For each pipeline initialized by pipeline orchestrator 501, a reporting object with status information may be maintained. Streaming activities may report the last time an event was processed, and the number of events processed. Batch activities may report status messages as they occur. Pipeline orchestrator 501 may perform batch caching using, for example, an IGFS™ caching filesystem. This allows activities 512a-d within a pipeline 502a-b to pass data contexts to one another, with any necessary parameter configurations.

A pipeline manager 511a-b may be spawned for every new running pipeline, and may be used to send activity, status, lifecycle, and event count information to the pipeline orchestrator 501. Within a particular pipeline, a plurality of activity actors 512a-d may be created by a pipeline manager 511a-b to handle individual tasks, and provide output to data services 522a-d. Data models used in a given pipeline may be determined by the specific pipeline and activities, as directed by a pipeline manager 511a-b. Each pipeline manager 511a-b controls and directs the operation of any activity actors 512a-d spawned by it. A pipeline process may need to coordinate streaming data between tasks. For this, a pipeline manager 511a-b may spawn service connectors to dynamically create TCP connections between activity instances 512a-d. Data contexts may be maintained for each individual activity 512a-d, and may be cached for provision to other activities 512a-d as needed. A data context defines how an activity accesses information, and an activity 512a-d may process data or simply forward it to a next step. Forwarding data between pipeline steps may route data through a streaming context or batch context.

A client service cluster 530 may operate a plurality of service actors 521a-d to serve the requests of activity actors 512a-d, ideally maintaining enough service actors 521a-d to support each activity per the service type. These may also be arranged within service clusters 520a-d, in a manner similar to the logical organization of activity actors 512a-d within clusters 502a-b in a data pipeline. A logging service 530 may be used to log and sample DCG requests and messages during operation while notification service 540 may be used to receive alerts and other notifications during operation (for example to alert on errors, which may then be diagnosed by reviewing records from logging service 530), and by being connected externally to messaging system 510, logging and notification services can be added, removed, or modified during operation without impacting DCG 500. A plurality of DCG protocols 550a-b may be used to provide structured messaging between a DCG 500 and messaging system 510, or to enable messaging system 510 to distribute DCG messages across service clusters 520a-d as shown. A service protocol 560 may be used to define service interactions so that a DCG 500 may be modified without impacting service implementations. In this manner it can be appreciated that the overall structure of a system using an actor-driven DCG 500 operates in a modular fashion, enabling modification and substitution of various components without impacting other operations or requiring additional reconfiguration.

Figure 6:
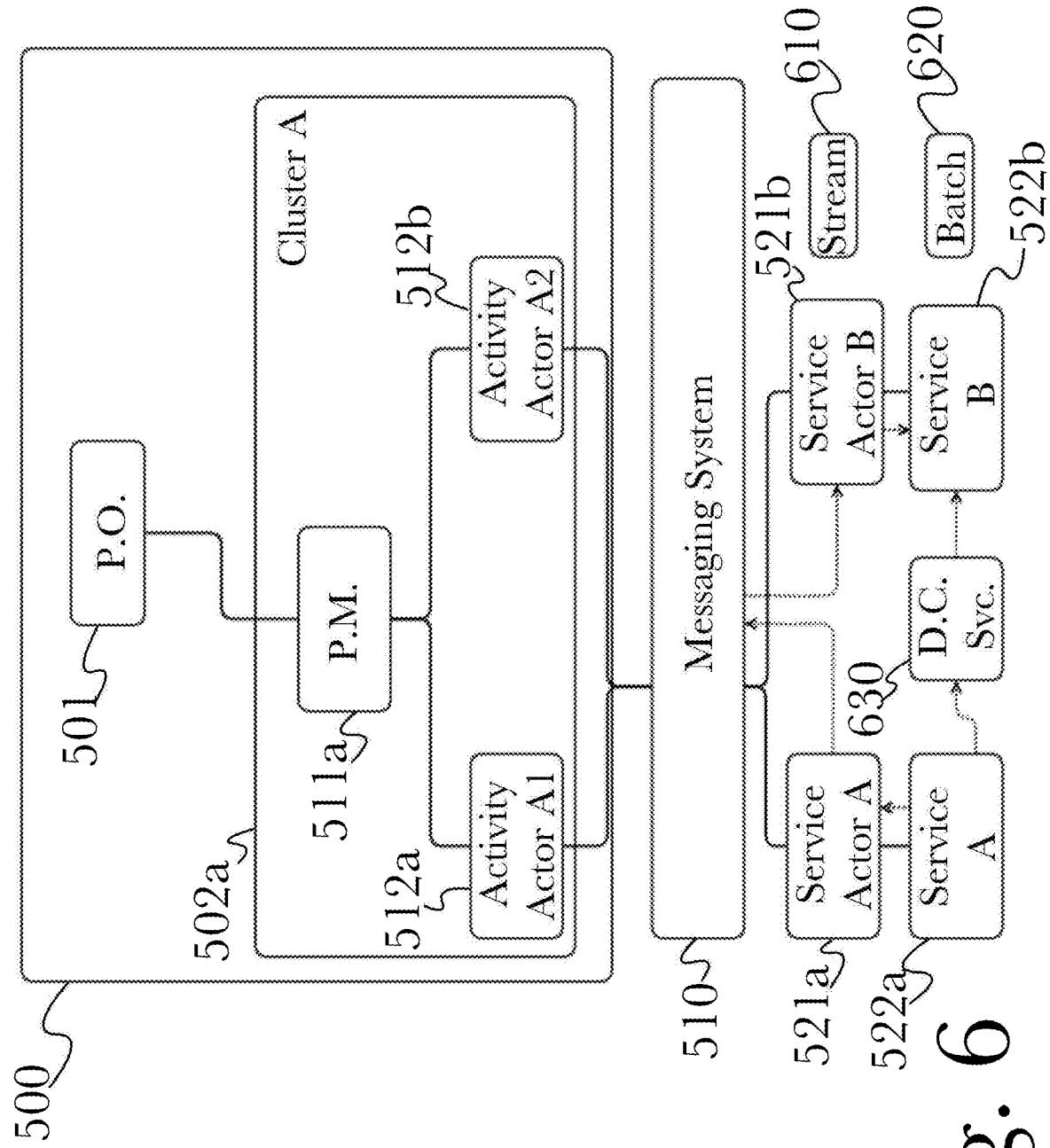
FIG. 6 is a diagram of an exemplary architecture for a system for rapid predictive analysis of very large data sets using an actor-driven distributed computational graph, according to one aspect.

FIG. 6 is a diagram of an exemplary architecture for a system for rapid predictive analysis of very large data sets using an actor-driven distributed computational graph 500, according to one aspect. According to the aspect, a variant messaging arrangement may utilize messaging system 510 as a messaging broker using a streaming protocol 610, transmitting and receiving messages immediately using messaging system 510 as a message broker to bridge communication between service actors 521a-b as needed. Alternately, individual services 522a-b may communicate directly in a batch context 620, using a data context service 630 as a broker to batch-process and relay messages between services 522a-b.

Figure 7:
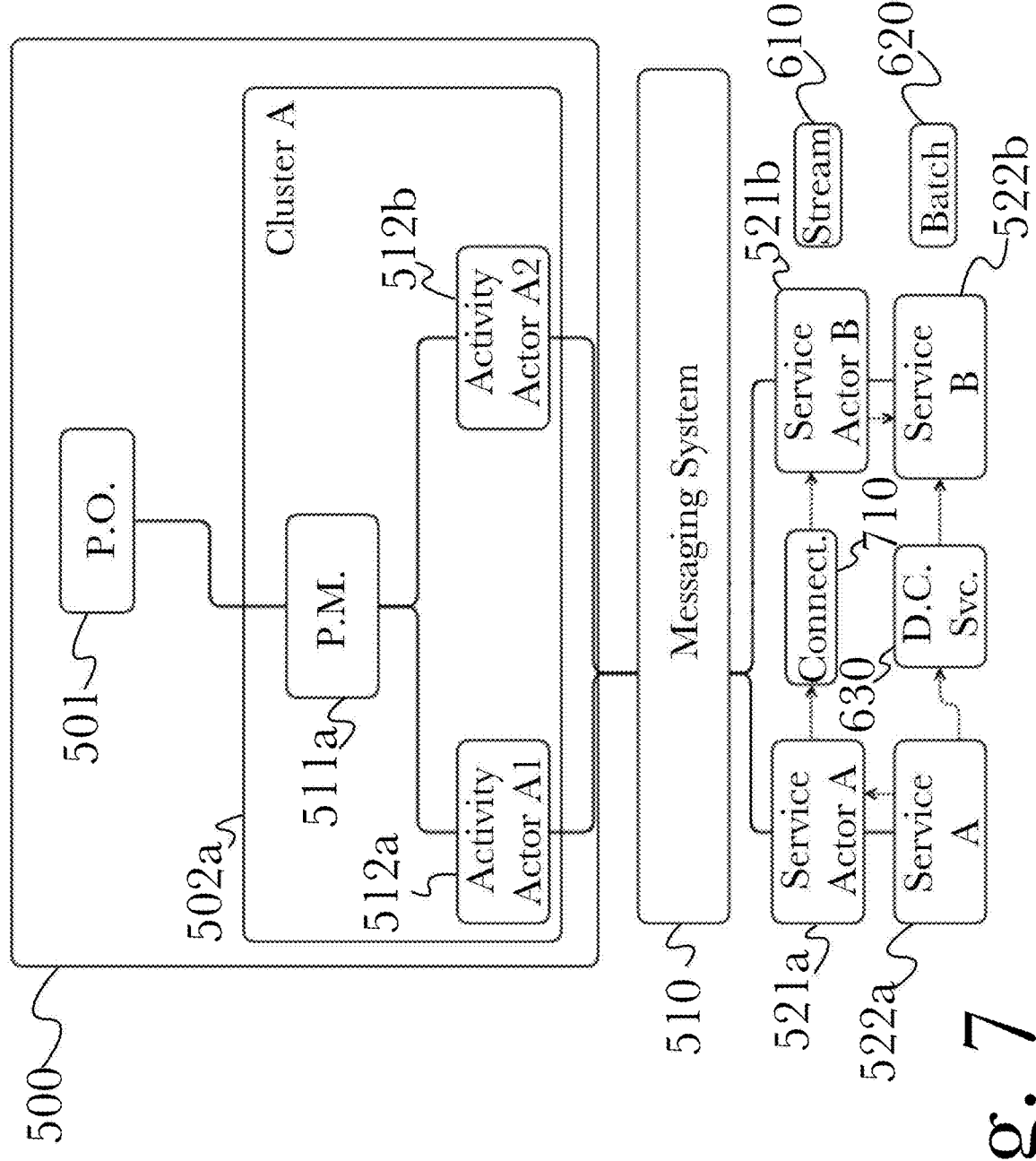
FIG. 7 is a diagram of an exemplary architecture for a system for rapid predictive analysis of very large data sets using an actor-driven distributed computational graph, according to one aspect.

FIG. 7 is a diagram of an exemplary architecture for a system for rapid predictive analysis of very large data sets using an actor-driven distributed computational graph 500, according to one aspect. According to the aspect, a variant messaging arrangement may utilize a service connector 710 as a central message broker between a plurality of service actors 521a-b, bridging messages in a streaming context 610 while a data context service 630 continues to provide direct peer-to-peer messaging between individual services 522a-b in a batch context 620.

It should be appreciated that various combinations and arrangements of the system variants described above (referring to FIGS. 1-7) may be possible, for example using one particular messaging arrangement for one data pipeline directed by a pipeline manager 511*a-b*, while another pipeline may utilize a different messaging arrangement (or may not utilize messaging at all). In this manner, a single DCG 500 and pipeline orchestrator 501 may operate individual pipelines in the manner that is most suited to their particular needs, with dynamic arrangements being made possible through design modularity as described above in FIG. 5.

Figure 8:
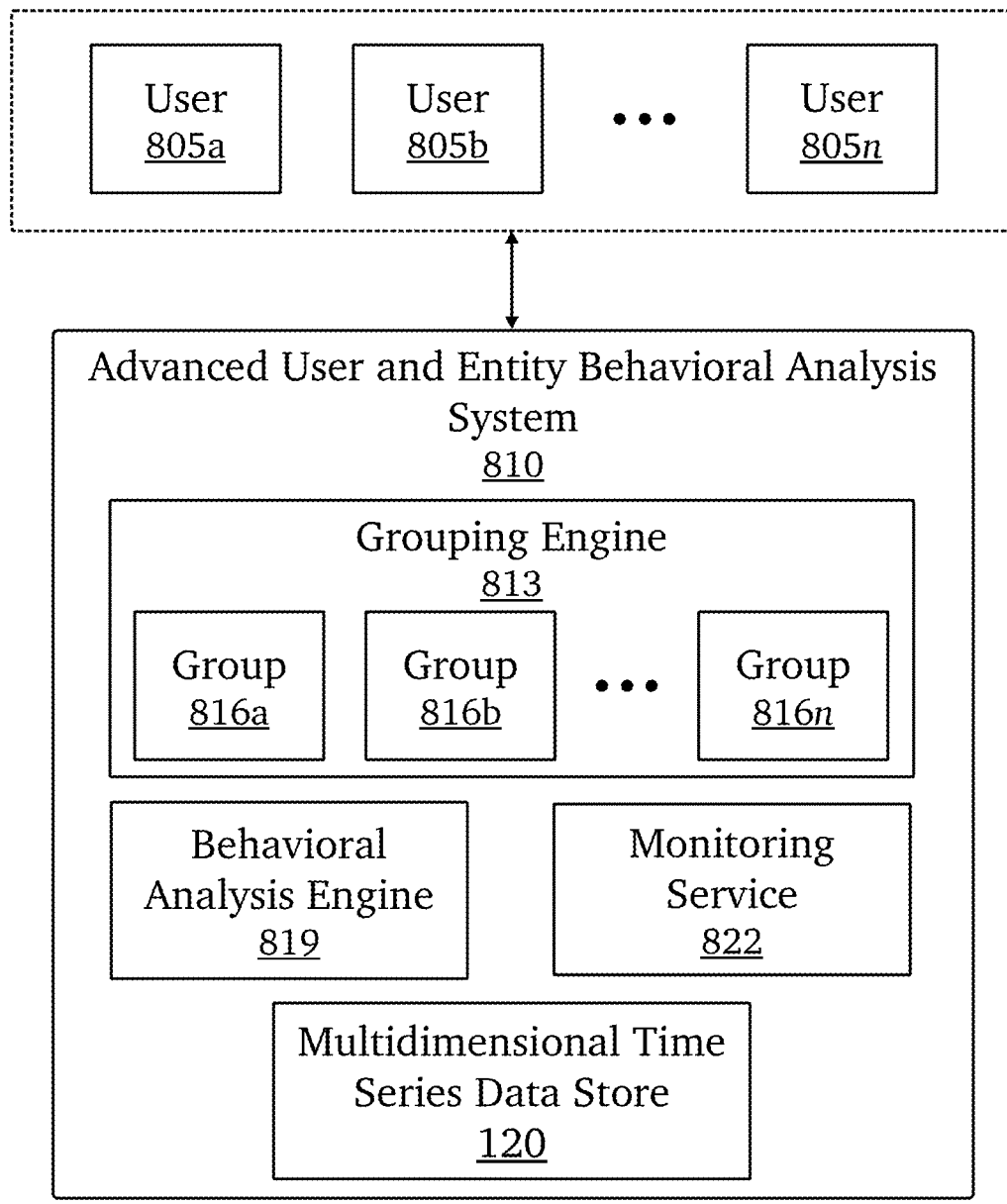
FIG. 8 is a diagram of an exemplary architecture for a user and entity behavioral analysis system, according to one aspect.

Another way to detect cyberthreats may be through the continuous monitoring and analysis of user and device behavioral patterns. This method may be particularly useful when there is little info available on an exploit, for example, a newly developed malware. FIG. 8 is a diagram of an exemplary architecture 800 for a user and entity behavioral analysis (UEBA) system, according to one aspect. Architecture 800 may comprise a plurality of users 805*a-n*, which may be individuals or connected devices, connecting to a user and entity behavioral analysis system 810. System 810 may comprise a grouping engine 813, a behavioral analysis engine 819, a monitoring service 822, and a multidimensional time series data store 120 for storing gathered and processed data. Grouping engine 813 may be configured to gather and identify user interactions and related metrics, which may include volume of interaction, frequency of interaction, and the like. Grouping engine 813 may use graph stack service 145 and DCG module 155 to convert and analyze the data in graph format. The interaction data may then be used to split users 805*a-n* into a plurality of groups 816*a-n*. Groupings may be based on department, project teams, interaction frequency, and other metrics which may be user-defined. Groupings may not be permanent, and may be adjusted and changed in real-time as group dynamics change. This may be automated by system 810, or an administrative user may manually change the groupings.

Behavioral analysis engine 819 may batch process and aggregate overall usage logs, access logs, KERBEROS session data, or data collected through the use of other network monitoring tools commonly used in the art such as BRO or SURICATA. The aggregated data may then be used to generate a behavioral baseline for each group established by grouping engine 813. Behavioral analysis engine 819 may use graph stack service 145 and DCG module 155 to convert and analyze the data in graph format using various machine learning models, and may also process the data using parallel computing to quickly process large amounts of data. Models may be easily added to the system. Behavioral analysis engine 819 may also be configured to process internal communications, such as email, using natural language processing. This may provide additional insight into current group dynamics so that a more accurate baseline may be established, or may provide an insight into health and mood of users.

Monitoring service 822 may actively monitor groups for anomalous behavior, as based the established baseline. For example, monitoring service 822 may use the data pipelines of ACDP system 100 or multidimensional time series data store 120 to conduct real-time monitoring of various network resource sensors. Aspects that may be monitored may include, but is not limited to, anomalous web browsing, for example, the number of distinct domains visited exceeding a predefined threshold; anomalous data exfiltration, for example, the amount of outgoing data exceeding a predefined threshold; unusual domain access, for example, a subgroup consisting a few members within an established group demonstrating unusual browsing behavior by accessing an unusual domain a predetermined number of times within a certain timeframe; anomalous login times, for example, a user logging into a workstation during off-hours; unlikely login locations, for example, a user logging in using an account from two distinct locations that may be physically impossible within a certain timeframe; anomalous service access, for example, unusual application access or usage pattern; and new machines, for example, a user logging into a machine or server not typically accessed.

Figure 23:
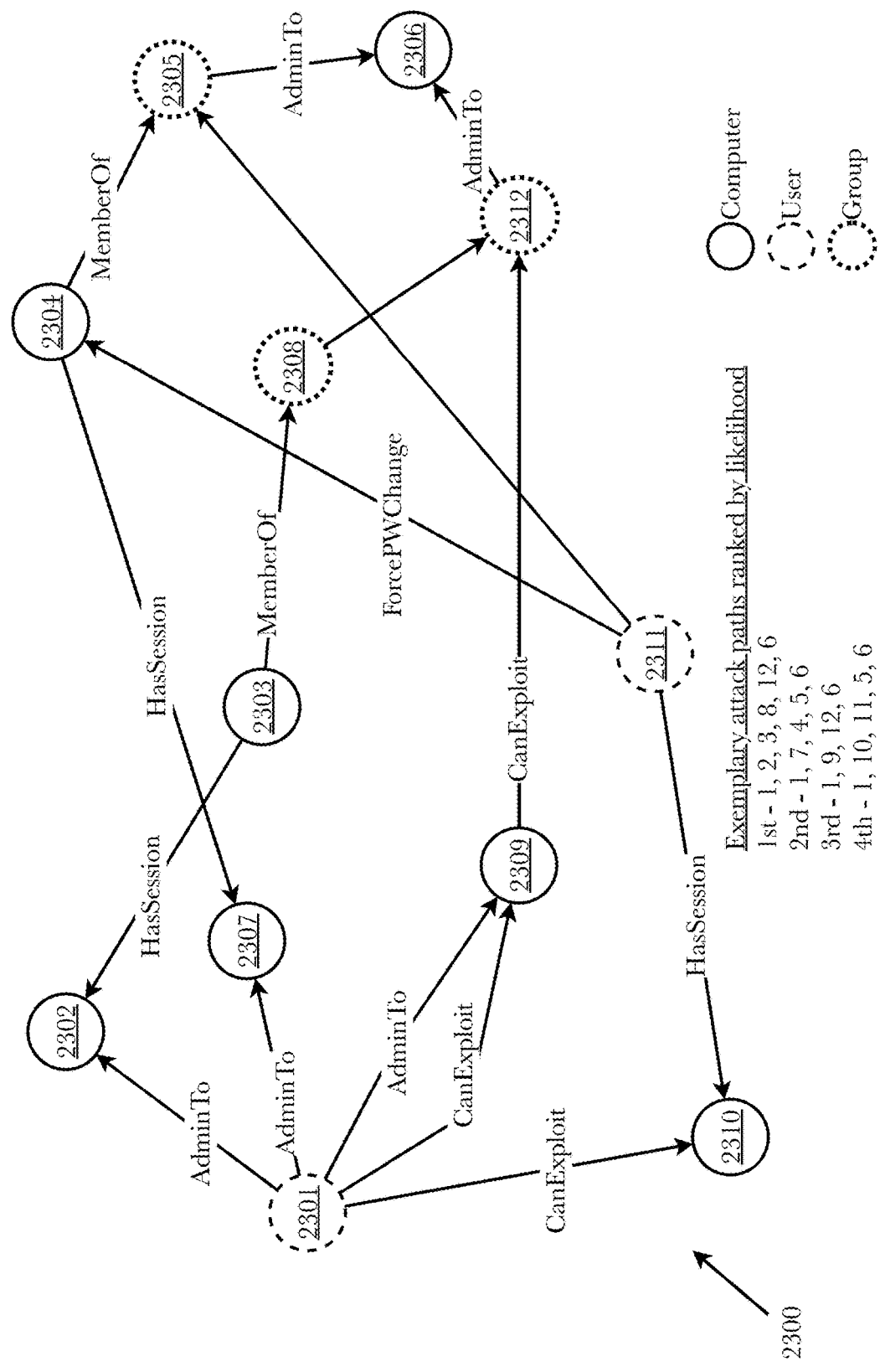
FIG. 23 is a directed graph diagram showing an exemplary cyber-physical graph and its possible use in creating cybersecurity profiles and ratings.

FIG. 23 is a directed graph diagram showing an exemplary cyber-physical graph 2300 and its possible use in creating cybersecurity profiles and ratings. A cyber-physical graph represents the relationships between entities associated with an organization, for example, devices, users, resources, groups, and computing services, the relationships between the entities defining relationships and processes in an organization's infrastructure, thereby contextualizing security information with physical and logical relationships that represent the flow of data and access to data within the organization including, in particular, network security protocols and procedures. This can be enriched with properties, entities, and relationships that model business processes as well as the criticality of an entity to a business dependency (a representative example being criticality to a particular revenue stream). A cyber-physical graph, in its most basic form, represents the network devices comprising an organization's network infrastructure as nodes (also called vertices) in the graph and the physical or logical connections between them as edges between the nodes. The cyber-physical graph may be expanded to include network information and processes such as data flow, security protocols and procedures, and software versions and patch information. Further, human users and their access privileges to devices and assets may be included. A cyber-security graph may be further expanded to include internal process information such as business processes, loss information, and legal requirements and documents; external information such as domain and IP information, data breach information; and generated information such as open port information from external network scans, and vulnerabilities and avenues of attack. In some embodiments, multiple graphs may be combined into a single cyber-physical graph to enable exploration, modeling, predictive modeling, and simulation of relationships, performance and impacts under a multitude of scenarios. For example, graphs of cash flows, graphs of business processes, graphs of the logical network and graphs of the physical network, facilities, etc., can all be combined for such purposes. Thus, a cyber-physical graph may be used to represent a complete picture of an organization's infrastructure and operations. In some embodiments, instead of combining multiple graphs into a single cyber-physical graph, the graphs may be analyzed separately and the results of the analyses may be combined.

In this example, which is necessarily simplified for clarity, the cyber-physical graph 2300 contains 12 nodes (vertices) comprising: seven computers and devices designated by solid circles 2302, 2303, 2304, 2306, 2307, 2309, 2310, two users designated by dashed-line circles 2301, 2311, and three functional groups designated by dotted-line circles 2305, 2308, and 2312. The edges (lines) between the nodes indicate relationships between the nodes, and have a direction and relationship indicator such as "AdminTo," "MemberOf," etc. While not shown here, the edges may also be assigned numerical weights or probabilities, indicating, for example, the likelihood of a successful attack gaining access from one node to another. Possible attack paths may be analyzed using the cyber-physical graph by running graph analysis algorithms such as shortest path algorithms, minimum cost/maximum flow algorithms, strongly connected node algorithms, etc. In this example, several exemplary attack paths are ranked by likelihood. In the most likely attack path, user 2301 is an administrator to device 2302 to which device 2303 has connected. Device 2303 is a member of functional group 2308, which has a member of group 2312. Functional group 2312 is an administrator to the target 2306. In a second most likely attack path, user 2301 is an administrator to device 2307 to which device 2304 has connected. Device 2304 is a member of functional group 2305, which is an administrator to the target device 2306. In a third most likely attack path, a flaw in the security protocols allow the credentials of user 2301 to be used to gain access to device 2310. User 2311 who is working on device 2310 may be tricked into providing access to functional group 2305, which is an administrator to the target device 2306.

Figure 24:
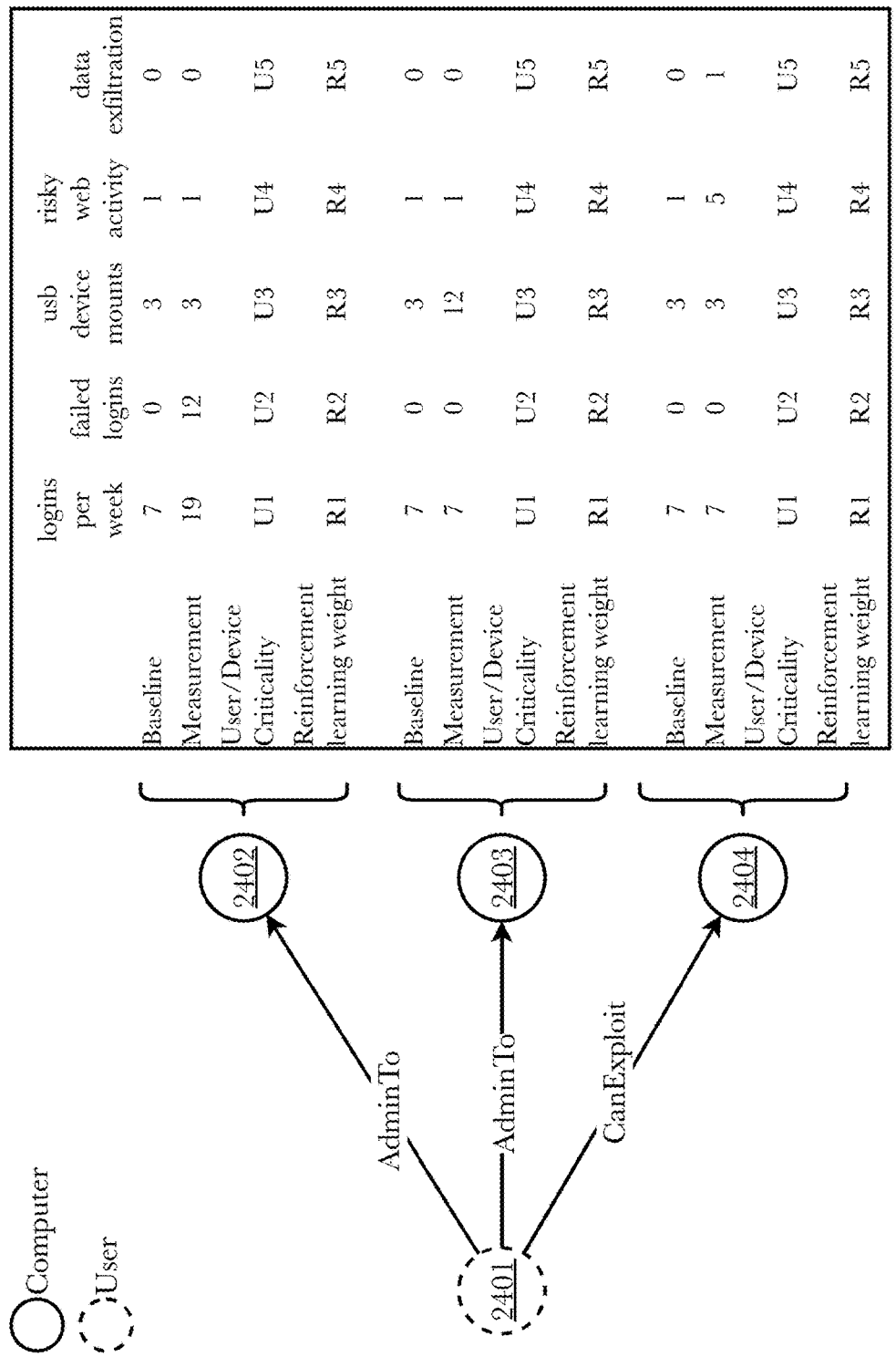
FIG. 24 is a diagram showing how UEBA information may be associated with network topology.

FIG. 24 is a diagram showing how UEBA information may be associated with network topology. As described elsewhere herein, user and entity behavior analysis may be used to improve cybersecurity. This diagram shows an example of how such UEBA information may be associated with, or incorporated into, a representation of the network, so as to combine UEBA information with information about network topology. For each user and device for which UEBA information is collected, such information may be represented in a graph comprising nodes and edges, in a manner similar to the cyber-physical graph previously described. In this example, a user 2401 is represented by a node in the graph. The user is associated with three different devices 2402-2404, each of which is also represented by a node in the graph. The user 2401 is associated with each device in some manner. For example, the user 2401 is an administrator of devices 2402 and 2403, which may be, for example, networked computers. The user 2401 is also associated with device 2404 for which there is some vulnerability (which may be known or unknown), such as vulnerability to phishing attacks wherein the user 2401 is persuaded to inadvertently install malware by opening an email attachment. The baseline behavior of the user's 2401 interaction with each device is established. In this simplified example, in a given week for each device 2402-2404, the user 2401 normally has seven logins, zero failed login attempts, mounts three USB devices, has one instance of risky web activity (e.g., visiting a website with a known risk of malware), and has zero instances of data exfiltration (e.g., moving or copying of data to an unauthorized location). The baseline data for each user/device interaction may be stored in, or associated with, the graph node for that device 2402-2404. Monitoring and measurement of those same user/device interactions can indicate instances of cybersecurity concern.

For example, for device 2402, the measured number of logins (19) and failed logins (12) has increased dramatically over the baseline data for those interactions, suggesting either that the user is engaging in anomalous behavior or that the user's account has been compromised and is being used to attempt to gain network access. In the example for device 2403, the measured number of USB device mounts has increased dramatically over the baseline data for that interaction, suggesting that the user is attempting transfer more data to portable devices than usual, which could indicate a data exfiltration attempt. In the example for device 2404, the measured number of risky web activity incidents has increased dramatically over the baseline data, and a data exfiltration incident has occurred (for example, data uploaded to an unauthorized website), indicating a security breach.

In addition to the baseline and measurements, additional data, weights, and/or variables may be assigned, such as a user/device criticality rating. For example, if the user 2401 is a low-level employee with access only to non-confidential and/or publicly-disclosed information through the devices 2402-2404, anomalous user/device interaction behavior has a low risk of having a negative cybersecurity impact, and the user/device criticality may be very low, reducing the level of effort expended on investigating such anomalous behavior. Conversely, if the user 2401 is an executive-level employee with access to highly-sensitive information through the devices 2402-2404, anomalous user/device interaction behavior has a high risk of having a negative cybersecurity impact, and the user/device criticality may be very high, meaning that investigating even minor anomalous behavior is a high priority. Further, other weights and variables may be assigned, such as reinforcement learning weights, risk ratings indicating the likelihood that the node will be subject to a cyberattack, criticality ratings indicating the criticality to network (or organization) operation if the node is compromised by a cyberattack, and vulnerability ratings, indicating a difficulty of exploiting a vulnerability between nodes.

Figure 25:
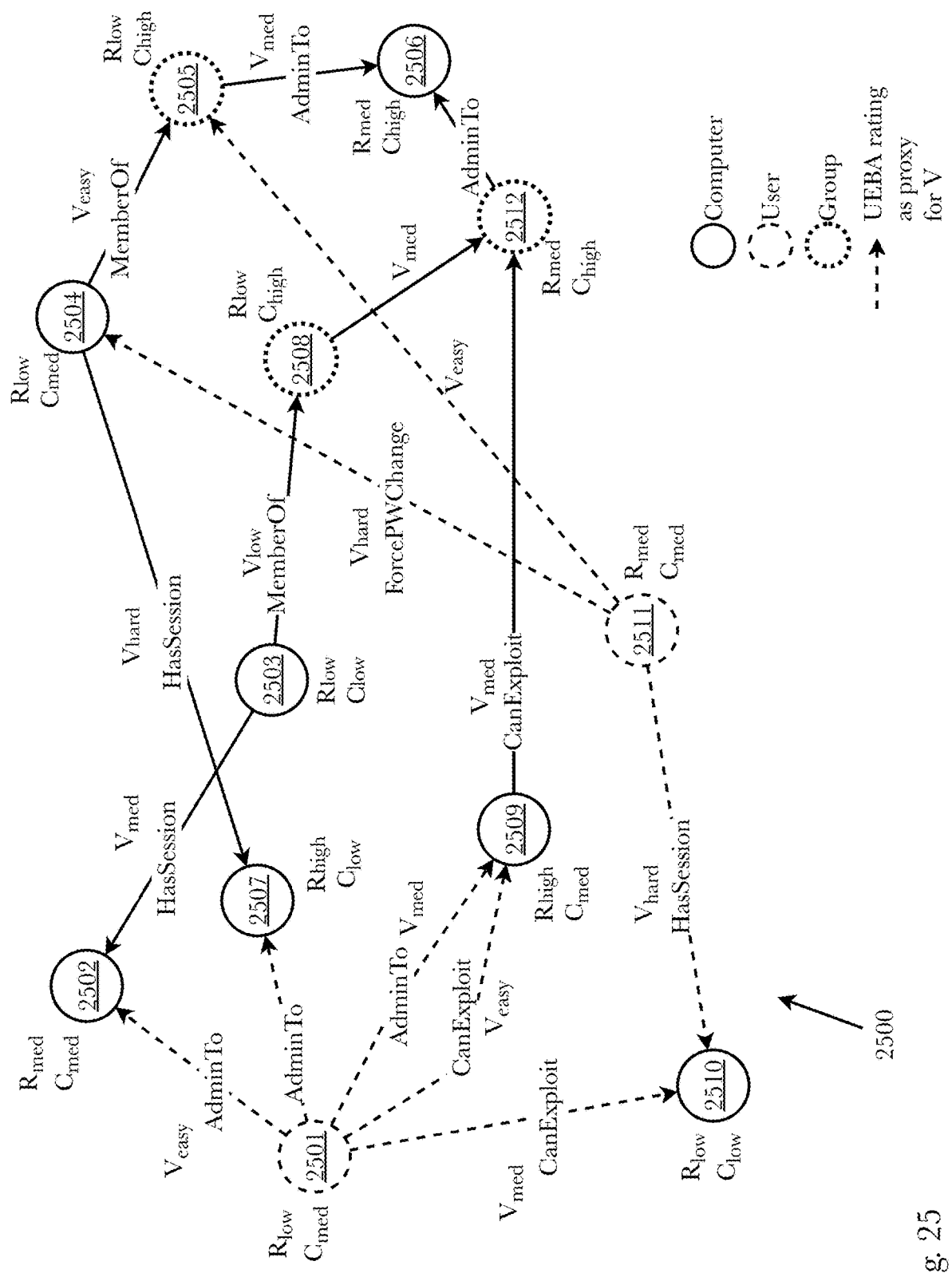
FIG. 25 is a directed graph diagram showing an use of a cyber-physical graph to model both UEBA and network topology information for cybersecurity analyses.

FIG. 25 is a directed graph diagram showing an use of a cyber-physical graph to model both UEBA and network topology information for cybersecurity analyses. In this example, which is necessarily simplified for clarity, a cyber-physical graph 2500 contains 12 nodes (vertices) comprising: seven computers and devices designated by solid circles 2502, 2503, 2504, 2506, 2507, 2509, 2510, two users designated by dashed-line circles 2501, 2511, and three functional groups designated by dotted-line circles 2505, 2508, and 2512. The edges (lines) between the nodes indicate relationships between the nodes, and have a direction and relationship indicator such as "AdminTo," "MemberOf," etc. While not shown here, the edges may also be assigned numerical weights or probabilities, indicating, for example, the likelihood of a successful attack gaining access from one node to another. Possible attack paths may be analyzed using the cyber-physical graph by running graph analysis algorithms such as shortest path algorithms, minimum cost/maximum flow algorithms, strongly connected node algorithms, etc. In this example, several exemplary attack paths are ranked by likelihood. In the most likely attack path, user 2501 is an administrator to device 2502 to which device 2503 has connected. Device 2503 is a member of functional group 2508, which has a member of group 2512. Functional group 2512 is an administrator to the target 2506. In a second most likely attack path, user 2501 is an administrator to device 2507 to which device 2504 has connected. Device 2504 is a member of functional group 2505, which is an administrator to the target device 2506. In a third most likely attack path, a flaw in the security protocols allow the credentials of user 2501 to be used to gain access to device 2510. User 2511 who is working on device 2510 may be tricked into providing access to functional group 2505, which is an administrator to the target device 2506.

Thus, the graph contains information about network topology, specifically the entities comprising the network and the connections between the entities. However, further embedded in this graph is user and event behavior analysis (UEBA) information. In this manner, UEBA information and network topology information may be combined to enhance cybersecurity, with UEBA information providing anomalous behavior indicators, and the network topology establishing the likelihood of accessing other entities. Each node in the graph 2501-2512 is assigned a risk rating ($R_{low}$, $R_{med}$, $R_{high}$), indicating the likelihood that the node will be subject to a cyberattack, and a criticality rating ($C_{low}$, $C_{med}$, $C_{high}$), indicating the criticality to network (or organization) operation if the node is compromised by a cyberattack. Each edge in the graph is assigned a vulnerability rating ($V_{easy}$, $V_{med}$, $V_{hard}$), indicating a difficulty of exploiting a vulnerability between nodes. As shown in the dotted line edges, UEBA information and ratings may be used to establish vulnerability ratings. Unlike with computing devices, for which vulnerabilities are discretely identifiable and quantifiable (vulnerabilities of specific, unpatched applications to certain malware), it is often difficult to quantify likely human user behaviors in response to social engineering exploits (e.g., phishing attacks). Because of this difficulty, UEBA information and ratings can be used to establish vulnerability ratings (e.g., as proxy or substitute for a discretely known vulnerability). The UEBA/network topology combination may further include information about authentication levels, which may inform risk ratings, criticality ratings, and vulnerability ratings. For example, such ratings may change depending on what type of authentications are being used (e.g., New Technology LAN Manager (NTLM), Kerberos, etc.), whether multiple levels of authentication are being used (e.g., Kerberos plus independent golden ticket/silver ticket authentication checks), whether non-digital authentications are used (e.g., biometric validation, peer/supervisor validation, etc.), and other such authentication factors.

As an example of the usage of a combined UEBA information and network topology graph system, assume that a user's 2501 interactions with a device 2510 indicate anomalous UEBA behavior such as a multiplicity of login attempts on a given day. the risk rating of attacks against the user 2501 is low, the difficulty of exploiting a vulnerability of the user 2501/device 2510 combination is medium, and the criticality of information on device 2501 is low. Thus, the anomalous behavior is not likely to be associated with a cyberattack, and investigation of this particular anomalous behavior can be de-prioritized because of the UEBA/network topology analysis. Conversely, similar anomalous UEBA behavior at group 2512 would be prioritized because of the higher levels of risk and criticality both of group 2512 and device 2506 for which group 2512 is an administrator.

Detailed Description of Exemplary Aspects

Figure 9:
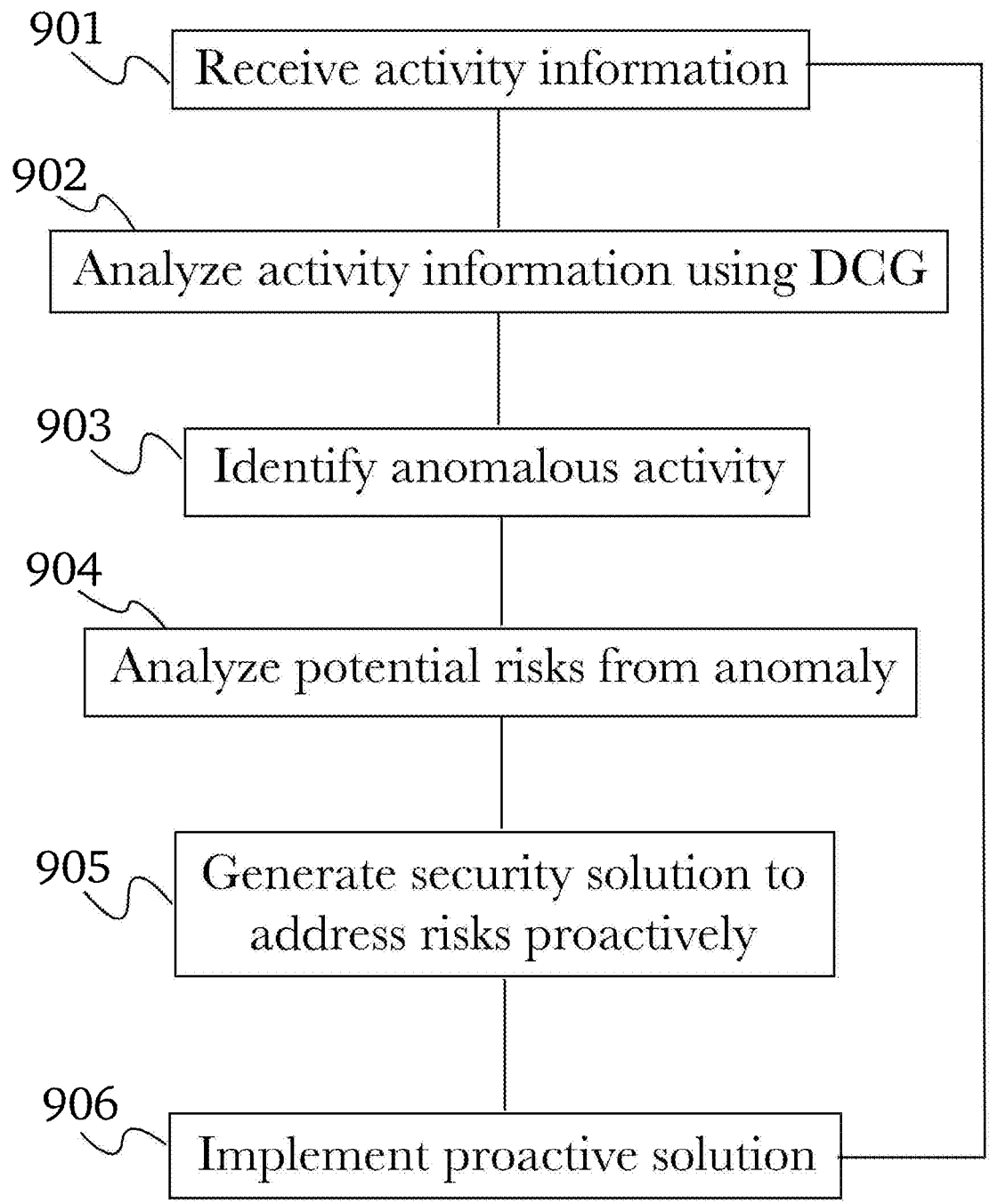
FIG. 9 is a flow diagram of an exemplary method for cybersecurity behavioral analytics, according to one aspect.

FIG. 9 is a flow diagram of an exemplary method 900 for cybersecurity behavioral analytics, according to one aspect. According to the aspect, behavior analytics may utilize passive information feeds from a plurality of existing endpoints (for example, including but not limited to user activity on a network, network performance, or device behavior) to generate security solutions. In an initial step 901, a web crawler 115 may passively collect activity information, which may then be processed 902 using a DCG 155 to analyze behavior patterns. Based on this initial analysis, anomalous behavior may be recognized 903 (for example, based on a threshold of variance from an established pattern or trend) such as high-risk users or malicious software operators such as bots. These anomalous behaviors may then be used 904 to analyze potential angles of attack and then produce 905 security suggestions based on this second-level analysis and predictions generated by an action outcome simulation module 125 to determine the likely effects of the change. The suggested behaviors may then be automatically implemented 906 as needed. Passive monitoring 901 then continues, collecting information after new security solutions are implemented 906, enabling machine learning to improve operation over time as the relationship between security changes and observed behaviors and threats are observed and analyzed.

This method 900 for behavioral analytics enables proactive and high-speed reactive defense capabilities against a variety of cyberattack threats, including anomalous human behaviors as well as nonhuman "bad actors" such as automated software bots that may probe for, and then exploit, existing vulnerabilities. Using automated behavioral learning in this manner provides a much more responsive solution than manual intervention, enabling rapid response to threats to mitigate any potential impact. Utilizing machine learning behavior further enhances this approach, providing additional proactive behavior that is not possible in simple automated approaches that merely react to threats as they occur.

Figure 10:
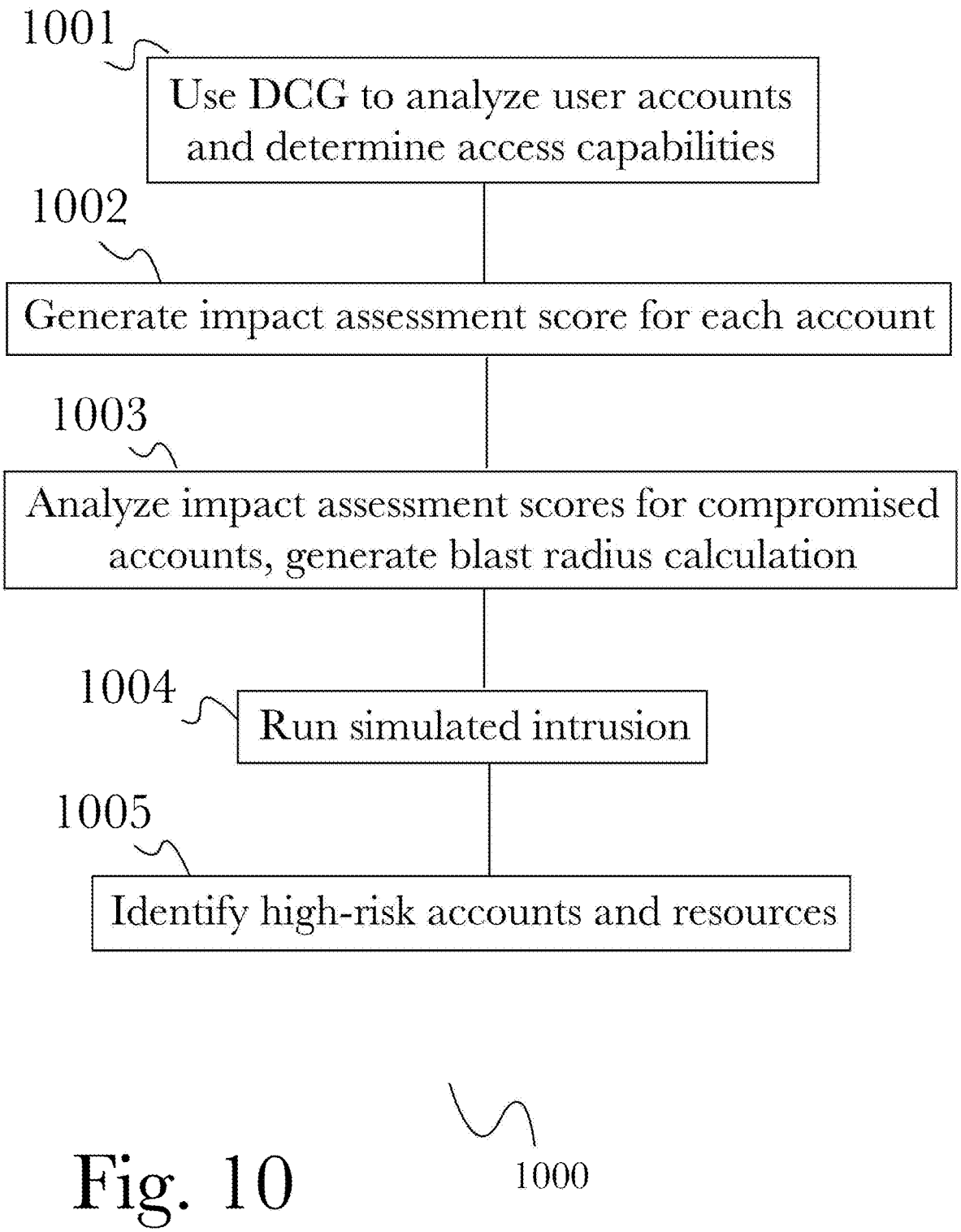
FIG. 10 is a flow diagram of an exemplary method for measuring the effects of cybersecurity attacks, according to one aspect.

FIG. 10 is a flow diagram of an exemplary method 1000 for measuring the effects of cybersecurity attacks, according to one aspect. According to the aspect, impact assessment of an attack may be measured using a DCG 155 to analyze a user account and identify its access capabilities 1001 (for example, what files, directories, devices or domains an account may have access to). This may then be used to generate 1002 an impact assessment score for the account, representing the potential risk should that account be compromised. In the event of an incident, the impact assessment score for any compromised accounts may be used to produce a "blast radius" calculation 1003, identifying exactly what resources are at risk as a result of the intrusion and where security personnel should focus their attention. To provide proactive security recommendations through a simulation module 125, simulated intrusions may be run 1004 to identify potential blast radius calculations for a variety of attacks and to determine 1005 high risk accounts or resources so that security may be improved in those key areas rather than focusing on reactive solutions.

Figure 11:
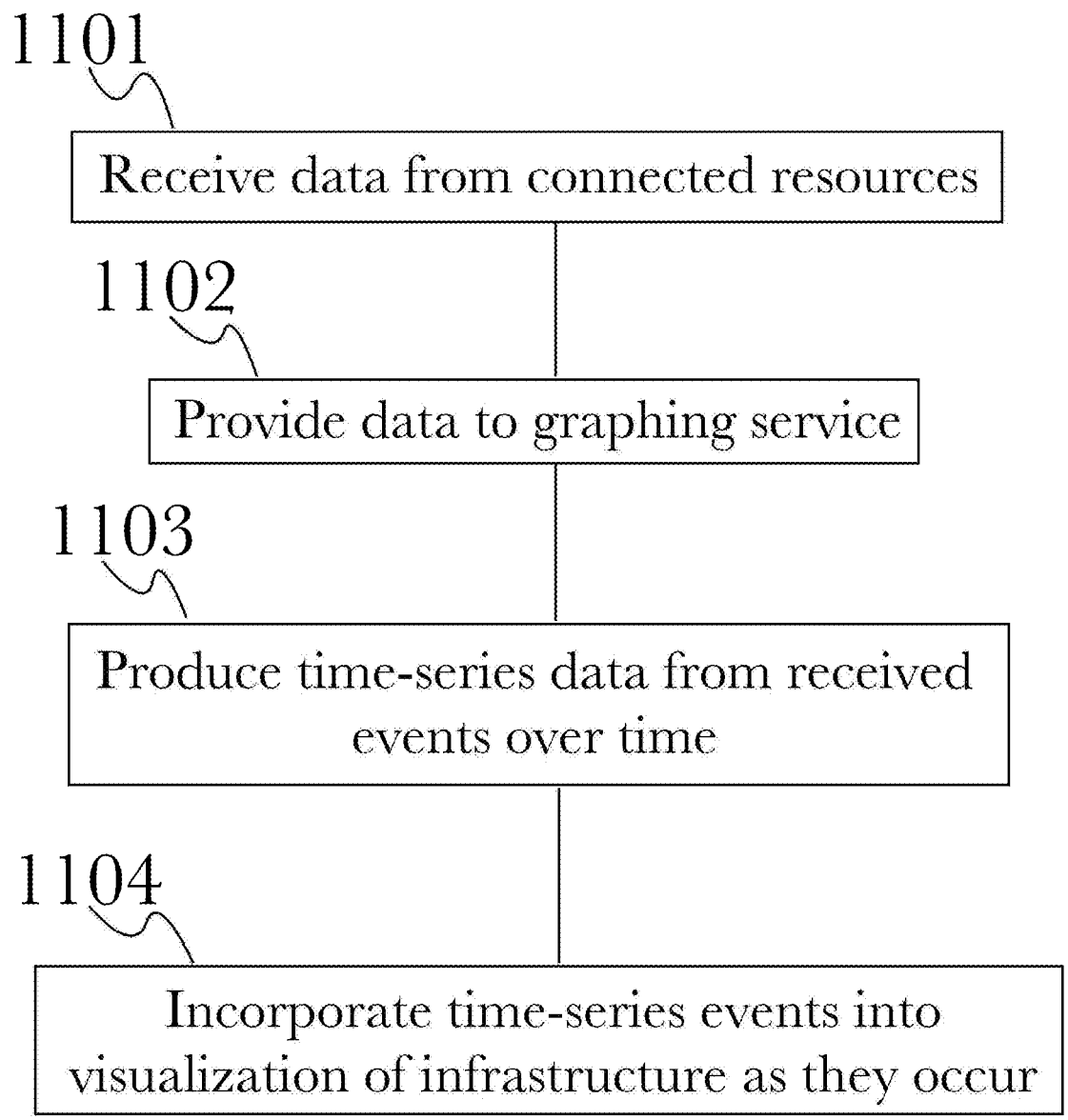
FIG. 11 is a flow diagram of an exemplary method for continuous cybersecurity monitoring and exploration, according to one aspect.

FIG. 11 is a flow diagram of an exemplary method 1100 for continuous cybersecurity monitoring and exploration, according to one aspect. According to the aspect, a state observation service 140 may receive data from a variety of connected systems 1101 such as (for example, including but not limited to) servers, domains, databases, or user directories. This information may be received continuously, passively collecting events and monitoring activity over time while feeding 1102 collected information into a graphing service 145 for use in producing time-series graphs 1103 of states and changes over time. This collated time-series data may then be used to produce a visualization 1104 of changes over time, quantifying collected data into a meaningful and understandable format. As new events are recorded, such as changing user roles or permissions, modifying servers or data structures, or other changes within a security infrastructure, these events are automatically incorporated into the time-series data and visualizations are updated accordingly, providing live monitoring of a wealth of information in a way that highlights meaningful data without losing detail due to the quantity of data points under examination.

Figure 12:
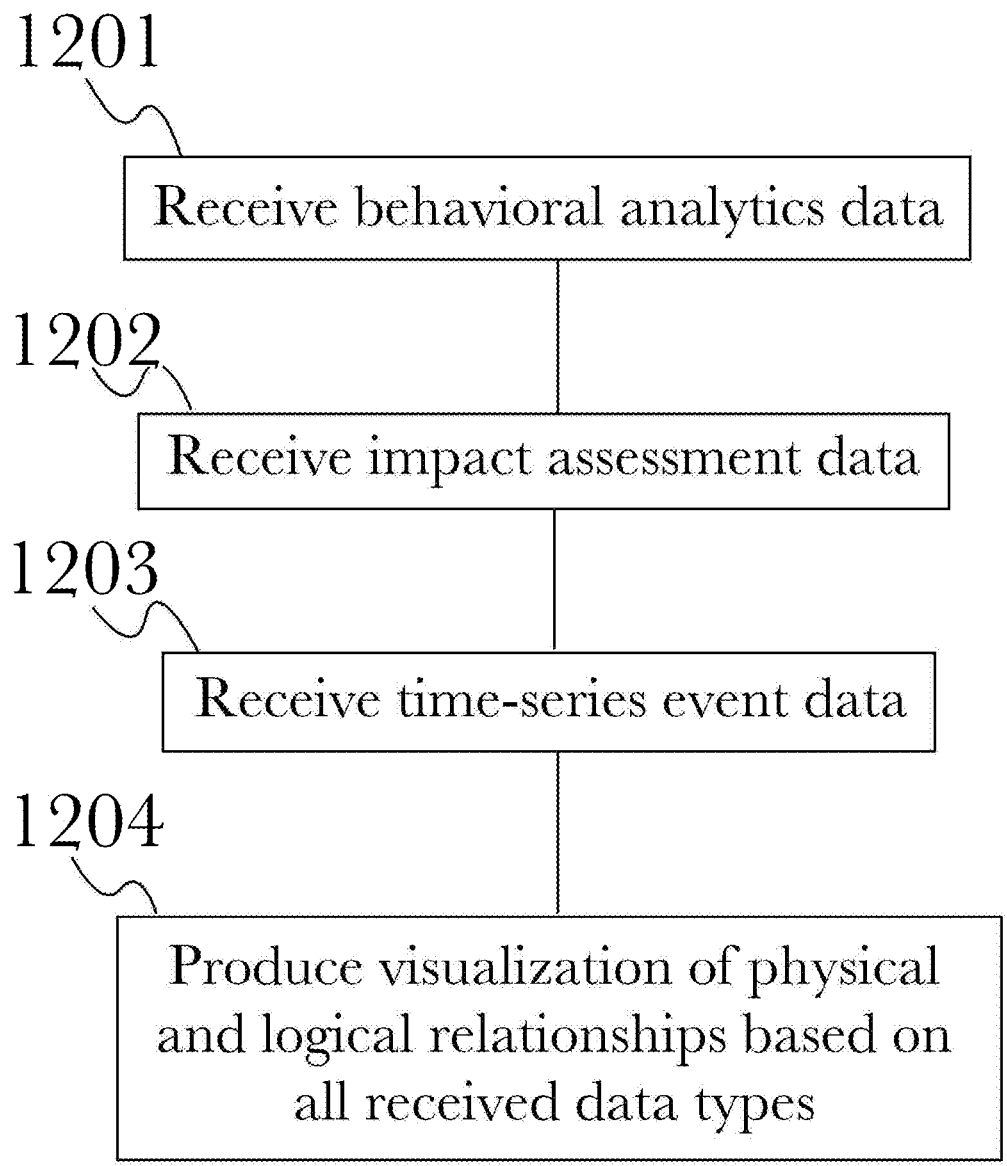
FIG. 12 is a flow diagram of an exemplary method for mapping a cyber-physical system graph (CPG), according to one aspect.

FIG. 12 is a flow diagram of an exemplary method 1200 for mapping a cyber-physical system graph (CPG), according to one aspect. According to the aspect, a cyber-physical system graph may comprise a visualization of hierarchies and relationships between devices and resources in a security infrastructure, contextualizing security information with physical device relationships that are easily understandable for security personnel and users. In an initial step 1201, behavior analytics information (as described previously, referring to FIG. 9) may be received at a graphing service 145 for inclusion in a CPG. In a next step 1202, impact assessment scores (as described previously, referring to FIG. 10) may be received and incorporated in the CPG information, adding risk assessment context to the behavior information. In a next step 1203, time-series information (as described previously, referring to FIG. 11) may be received and incorporated, updating CPG information as changes occur and events are logged. This information may then be used to produce 1204 a graph visualization of users, servers, devices, and other resources correlating physical relationships (such as a user's personal computer or smartphone, or physical connections between servers) with logical relationships (such as access privileges or database connections), to produce a meaningful and contextualized visualization of a security infrastructure that reflects the current state of the internal relationships present in the infrastructure.

Figure 13:
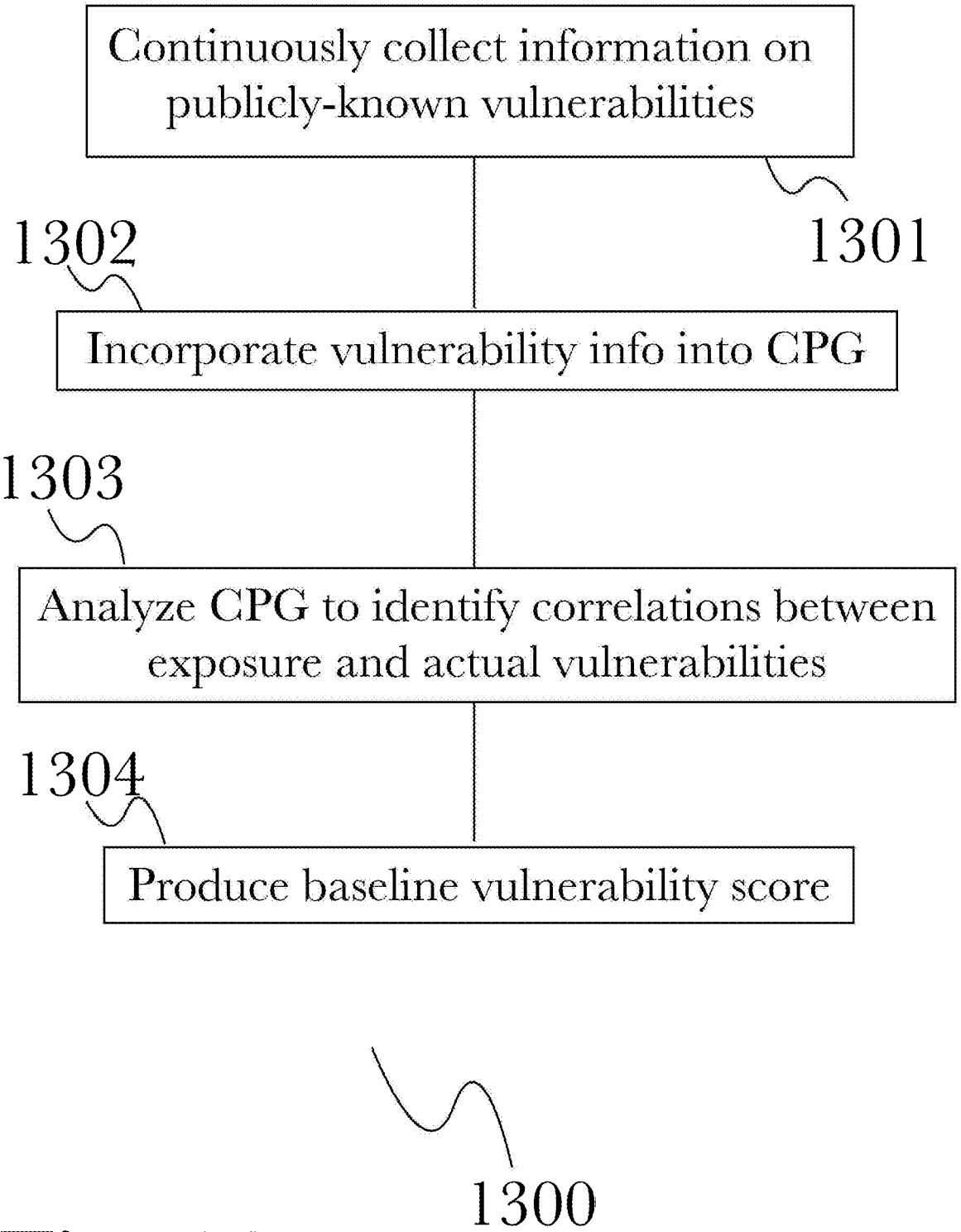
FIG. 13 is a flow diagram of an exemplary method for continuous network resilience scoring, according to one aspect.

FIG. 13 is a flow diagram of an exemplary method 1300 for continuous network resilience scoring, according to one aspect. According to the aspect, a baseline score can be used to measure an overall level of risk for a network infrastructure, and may be compiled by first collecting 1301 information on publicly-disclosed vulnerabilities, such as (for example) using the Internet or common vulnerabilities and exploits (CVE) process. This information may then 1302 be incorporated into a CPG as described previously in FIG. 12, and the combined data of the CPG and the known vulnerabilities may then be analyzed 1303 to identify the relationships between known vulnerabilities and risks exposed by components of the infrastructure. This produces a combined CPG 1304 that incorporates both the internal risk level of network resources, user accounts, and devices as well as the actual risk level based on the analysis of known vulnerabilities and security risks.

Figure 14:
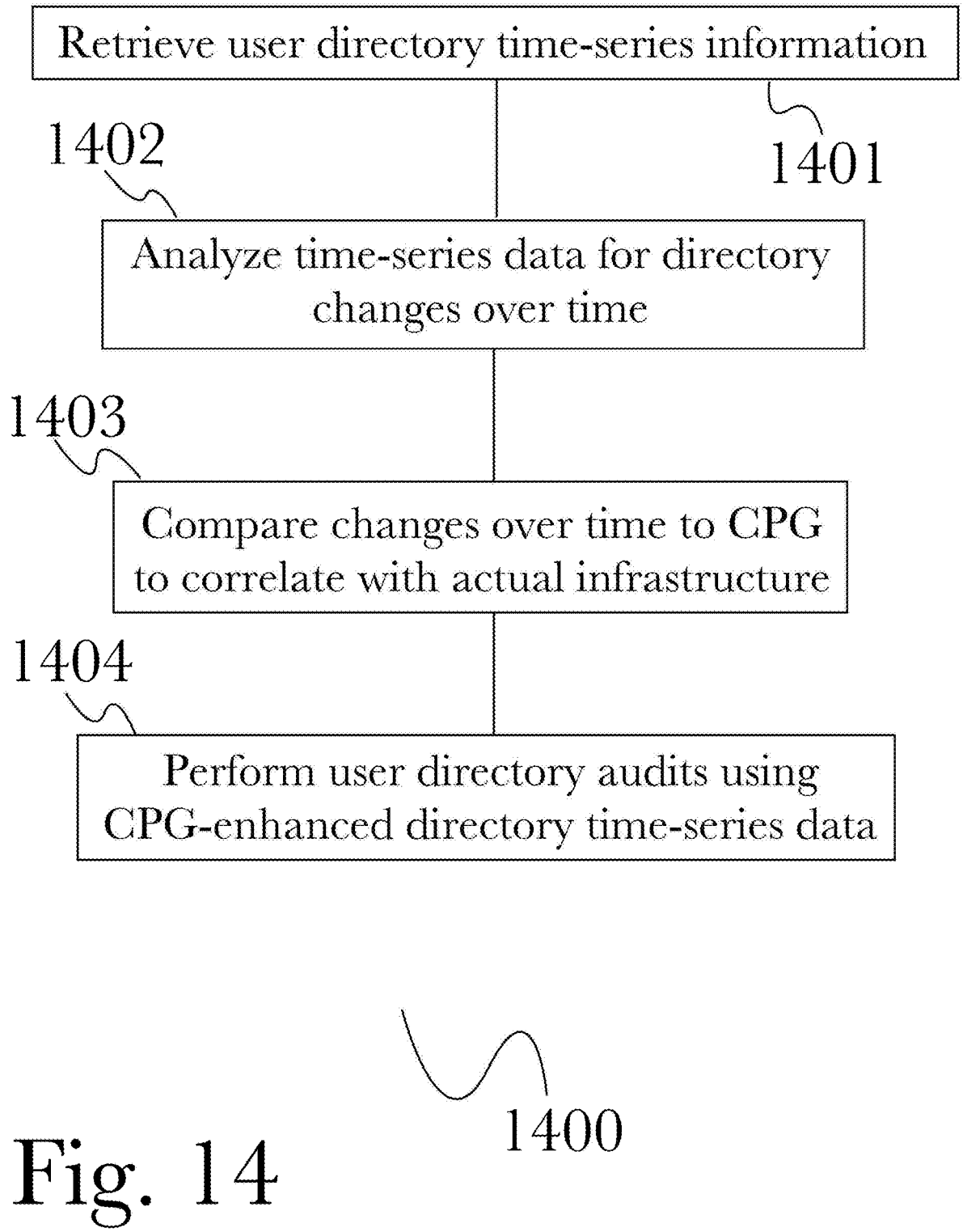
FIG. 14 is a flow diagram of an exemplary method for cybersecurity privilege oversight, according to one aspect.

FIG. 14 is a flow diagram of an exemplary method 1400 for cybersecurity privilege oversight, according to one aspect. According to the aspect, time-series data (as described above, referring to FIG. 11) may be collected 1401 for user accounts, credentials, directories, and other user-based privilege and access information. This data may then 1402 be analyzed to identify changes over time that may affect security, such as modifying user access privileges or adding new users. The results of analysis may be checked 1403 against a CPG (as described previously in FIG. 12), to compare and correlate user directory changes with the actual infrastructure state. This comparison may be used to perform accurate and context-enhanced user directory audits 1404 that identify not only current user credentials and other user-specific information, but changes to this information over time and how the user information relates to the actual infrastructure (for example, credentials that grant access to devices and may therefore implicitly grant additional access due to device relationships that were not immediately apparent from the user directory alone).

Figure 15:
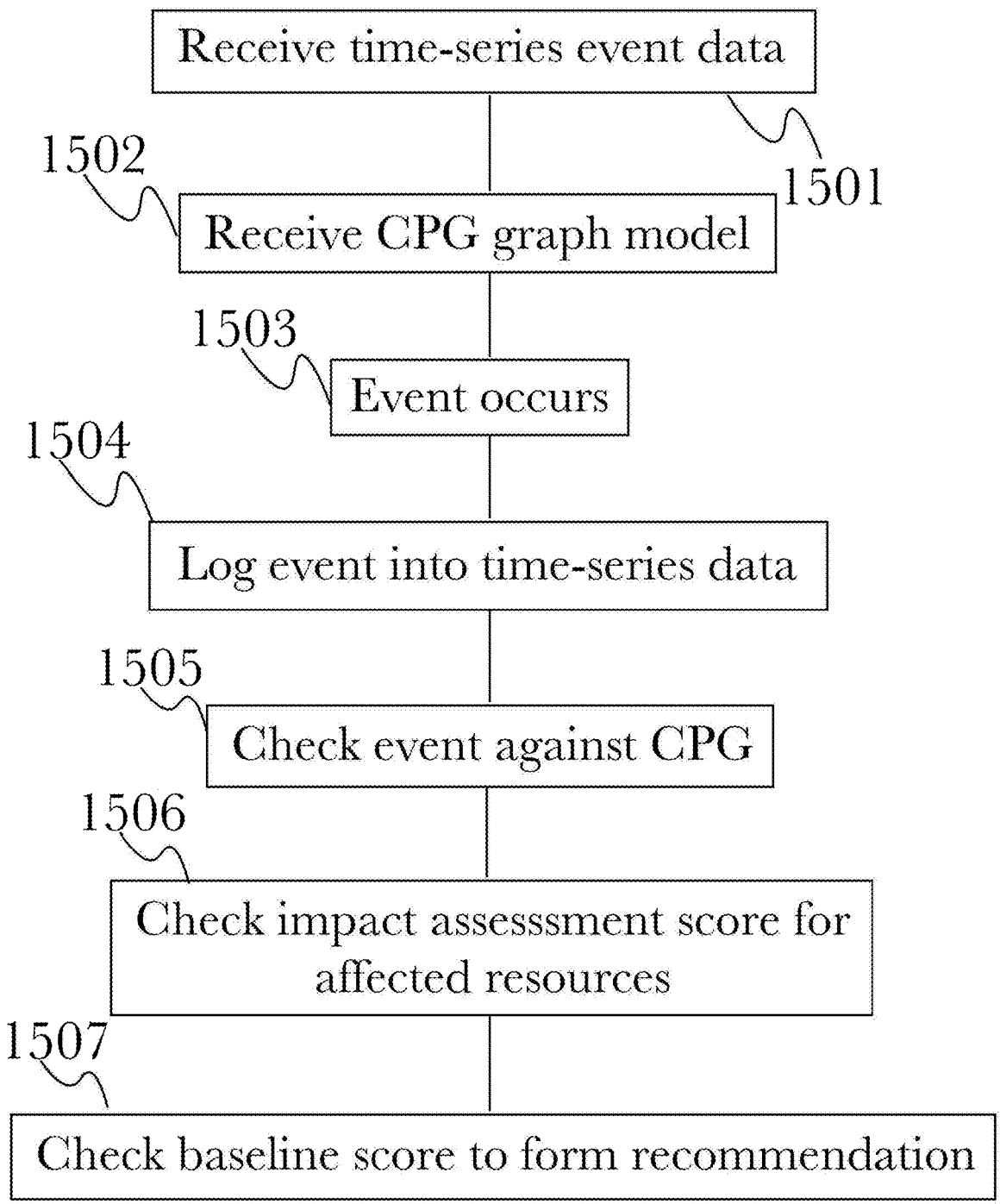
FIG. 15 is a flow diagram of an exemplary method for cybersecurity risk management, according to one aspect.

FIG. 15 is a flow diagram of an exemplary method 1500 for cybersecurity risk management, according to one aspect. According to the aspect, multiple methods described previously may be combined to provide live assessment of attacks as they occur, by first receiving 1501 time-series data for an infrastructure (as described previously, in FIG. 11) to provide live monitoring of network events. This data is then enhanced 1502 with a CPG (as described above in FIG. 12) to correlate events with actual infrastructure elements, such as servers or accounts. When an event (for example, an attempted attack against a vulnerable system or resource) occurs 1503, the event is logged in the time-series data 1504, and compared against the CPG 1505 to determine the impact. This is enhanced with the inclusion of impact assessment information 1506 for any affected resources, and the attack is then checked against a baseline score 1507 to determine the full extent of the impact of the attack and any necessary modifications to the infrastructure or policies.

Figure 16:
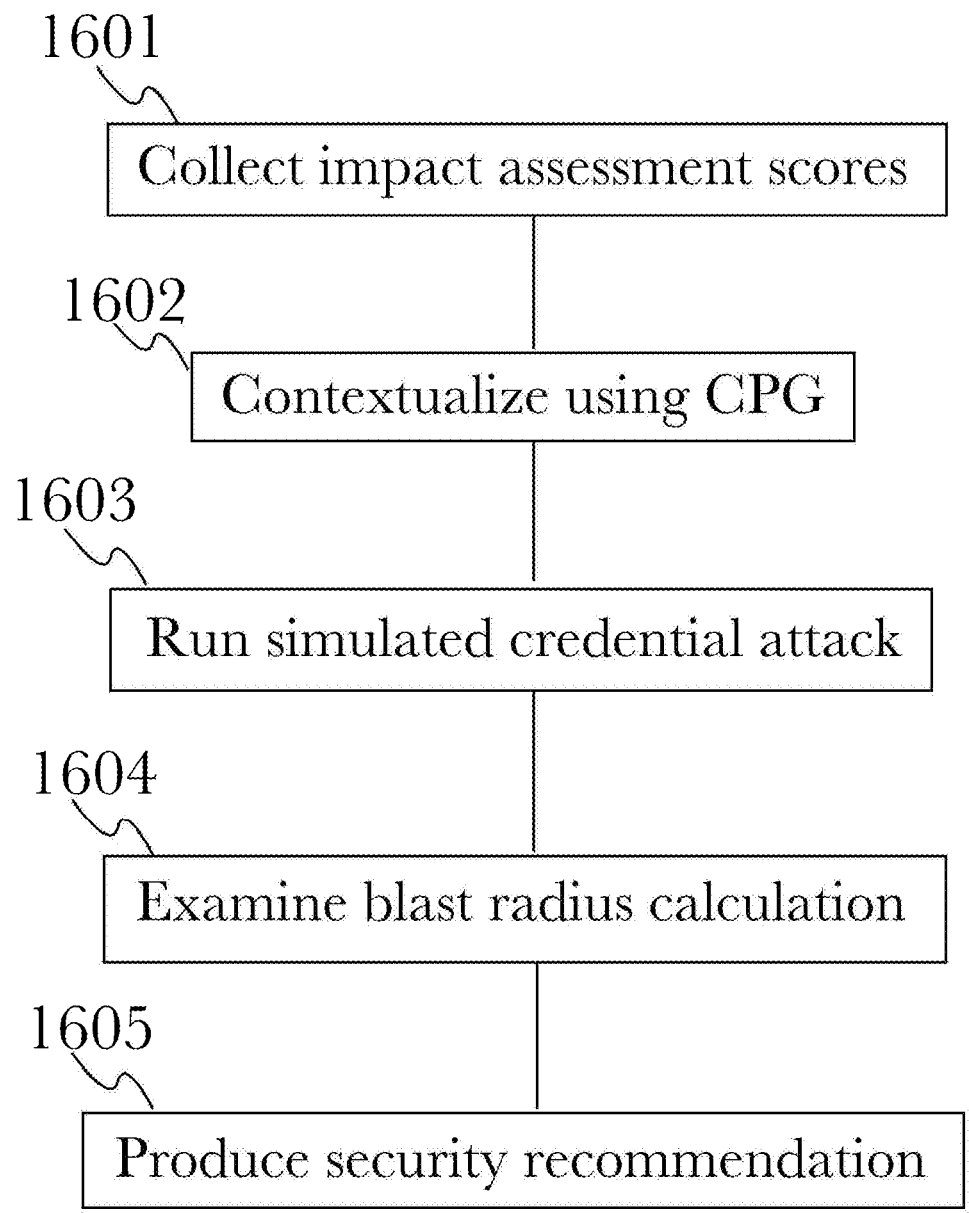
FIG. 16 is a flow diagram of an exemplary method for mitigating compromised credential threats, according to one aspect.

FIG. 16 is a flow diagram of an exemplary method 1600 for mitigating compromised credential threats, according to one aspect. According to the aspect, impact assessment scores (as described previously, referring to FIG. 10) may be collected 1601 for user accounts in a directory, so that the potential impact of any given credential attack is known in advance of an actual attack event. This information may be combined with a CPG 1602 as described previously in FIG. 12, to contextualize impact assessment scores within the infrastructure (for example, so that it may be predicted what systems or resources might be at risk for any given credential attack). A simulated attack may then be performed 1603 to use machine learning to improve security without waiting for actual attacks to trigger a reactive response. A blast radius assessment (as described above in FIG. 10) may be used in response 1604 to determine the effects of the simulated attack and identify points of weakness, and produce a recommendation report 1605 for improving and hardening the infrastructure against future attacks.

Figure 17:
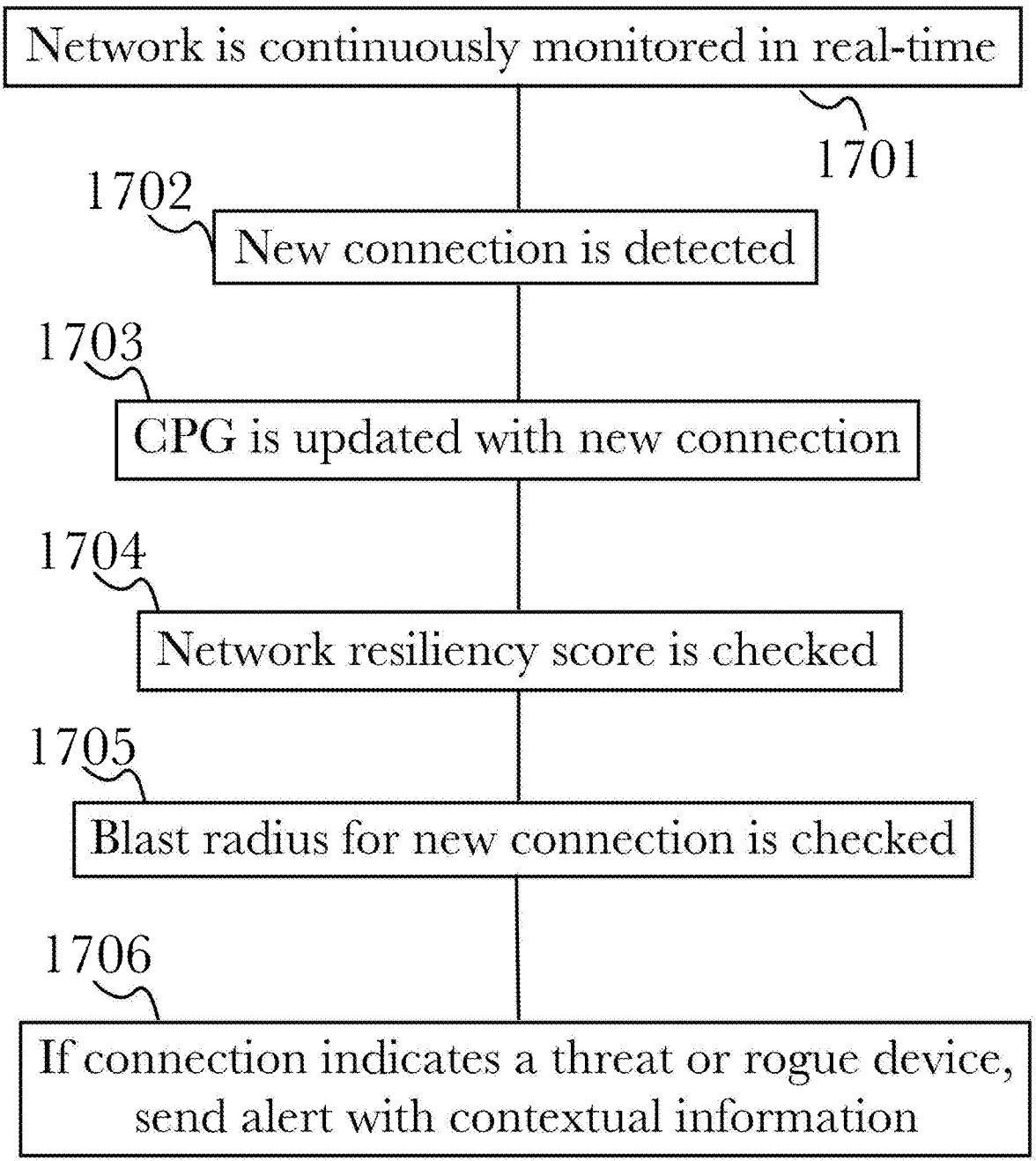
FIG. 17 is a flow diagram of an exemplary method for dynamic network and rogue device discovery, according to one aspect.

FIG. 17 is a flow diagram of an exemplary method 1700 for dynamic network and rogue device discovery, according to one aspect. According to the aspect, an advanced cyber decision platform may continuously monitor a network in real-time 1701, detecting any changes as they occur. When a new connection is detected 1702, a CPG may be updated 1703 with the new connection information, which may then be compared against the network's resiliency score 1704 to examine for potential risk. The blast radius metric for any other devices involved in the connection may also be checked 1705, to examine the context of the connection for risk potential (for example, an unknown connection to an internal data server with sensitive information may be considered a much higher risk than an unknown connection to an externally-facing web server). If the connection is a risk, an alert may be sent to an administrator 1706 with the contextual information for the connection to provide a concise notification of relevant details for quick handling.

Figure 18:
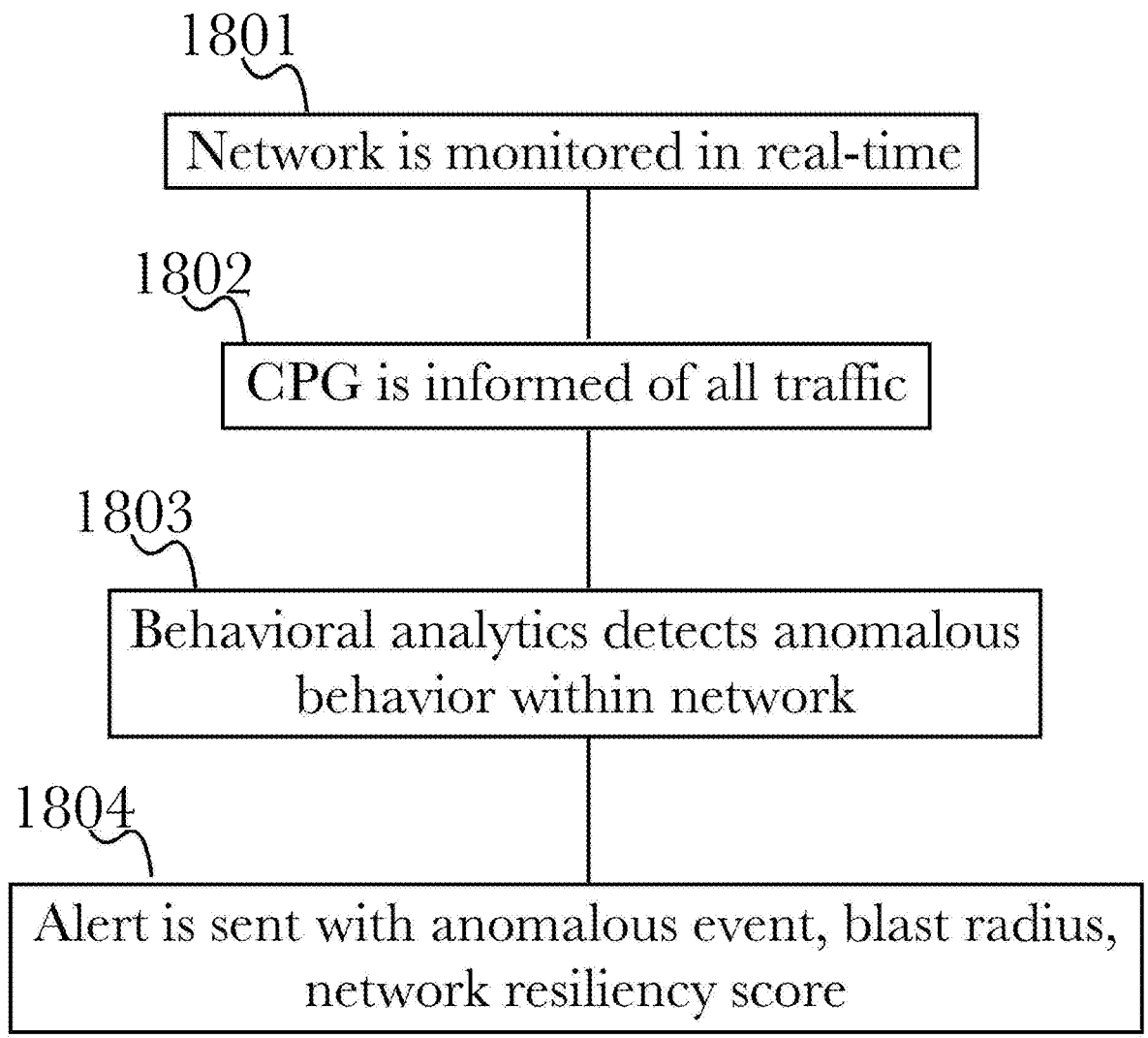
FIG. 18 is a flow diagram of an exemplary method for Kerberos "golden ticket" attack detection, according to one aspect.

FIG. 18 is a flow diagram of an exemplary method 1800 for Kerberos "golden ticket" attack detection, according to one aspect. Kerberos is a network authentication protocol employed across many enterprise networks to enable single sign-on and authentication for enterprise services. This makes it an attractive target for attacks, which can result in persistent, undetected access to services within a network in what is known as a "golden ticket" attack. To detect this form of attack, behavioral analytics may be employed to detect forged authentication tickets. According to the aspect, an advanced cyber decision platform may continuously monitor a network 1801, informing a CPG in real-time of all traffic associated with people, places, devices, or services 1802. Machine learning algorithms detect behavioral anomalies as they occur in real-time 1803, notifying administrators with an assessment of the anomalous event 1804 as well as a blast radius score for the particular event and a network resiliency score to advise of the overall health of the network. By automatically detecting unusual behavior and informing an administrator of the anomaly along with contextual information for the event and network, a compromised ticket is immediately detected when a new authentication connection is made.

Figure 19:
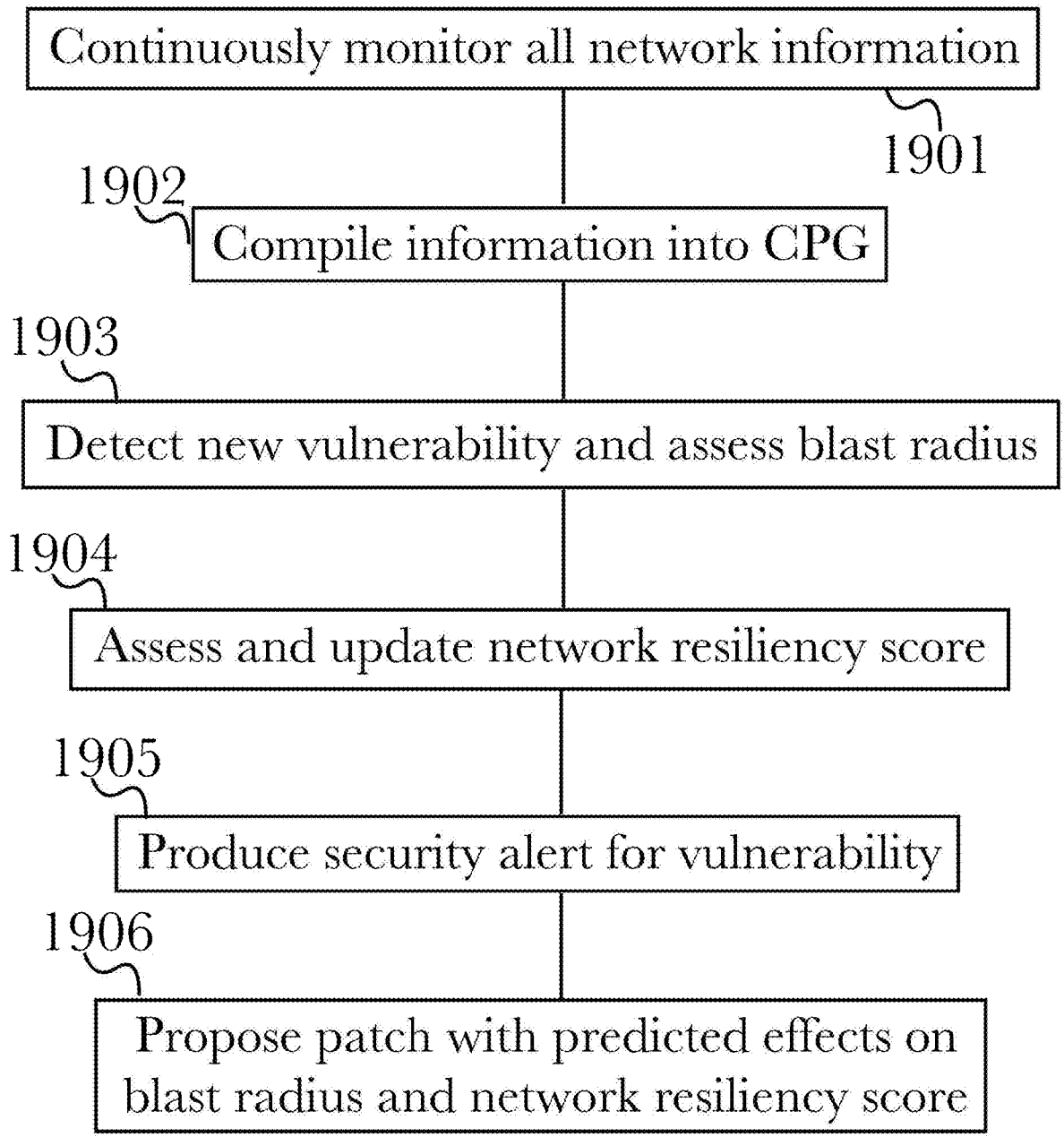
FIG. 19 is a flow diagram of an exemplary method for risk-based vulnerability and patch management, according to one aspect.

FIG. 19 is a flow diagram of an exemplary method 1900 for risk-based vulnerability and patch management, according to one aspect. According to the aspect, an advanced cyber decision platform may monitor all information about a network 1901, including (but not limited to) device telemetry data, log files, connections and network events, deployed software versions, or contextual user activity information. This information is incorporated into a CPG 1902 to maintain an up-to-date model of the network in real-time. When a new vulnerability is discovered, a blast radius score may be assessed 1903 and the network's resiliency score may be updated 1904 as needed. A security alert may then be produced 1905 to notify an administrator of the vulnerability and its impact, and a proposed patch may be presented 1906 along with the predicted effects of the patch on the vulnerability's blast radius and the overall network resiliency score. This determines both the total impact risk of any particular vulnerability, as well as the overall effect of each vulnerability on the network as a whole. This continuous network assessment may be used to collect information about new vulnerabilities and exploits to provide proactive solutions with clear result predictions, before attacks occur.

Figure 20:
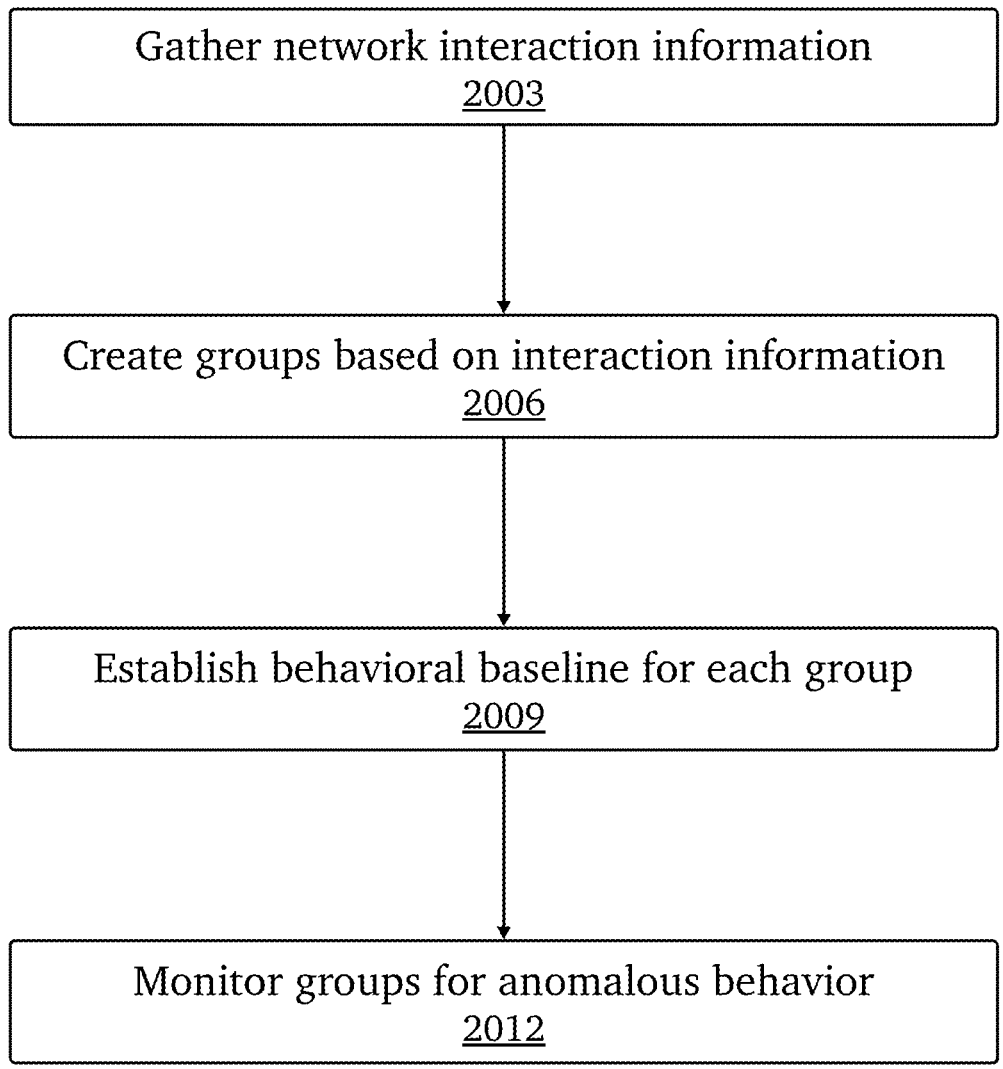
FIG. 20 is a flow diagram of an exemplary method for establishing groups of users according to one aspect.

FIG. 20 is a flow diagram of an exemplary method 2000 for establishing groups of users according to one aspect. At an initial step 2003, data pertaining to network interaction between users and devices are gathered by a grouping engine. At step 2006, the grouping engine may then process the gathered information by converting it to a graph format and using DCG module to establish groupings for users. A system administrator may provide additional input, and fine-tune the groupings if required. At step 2009, a behavioral baseline is established for each group that may be based on the interaction information, network logs, connected devices, and the like. At step 2012, groups are continuous monitored for anomalous behavior.

Figure 21:
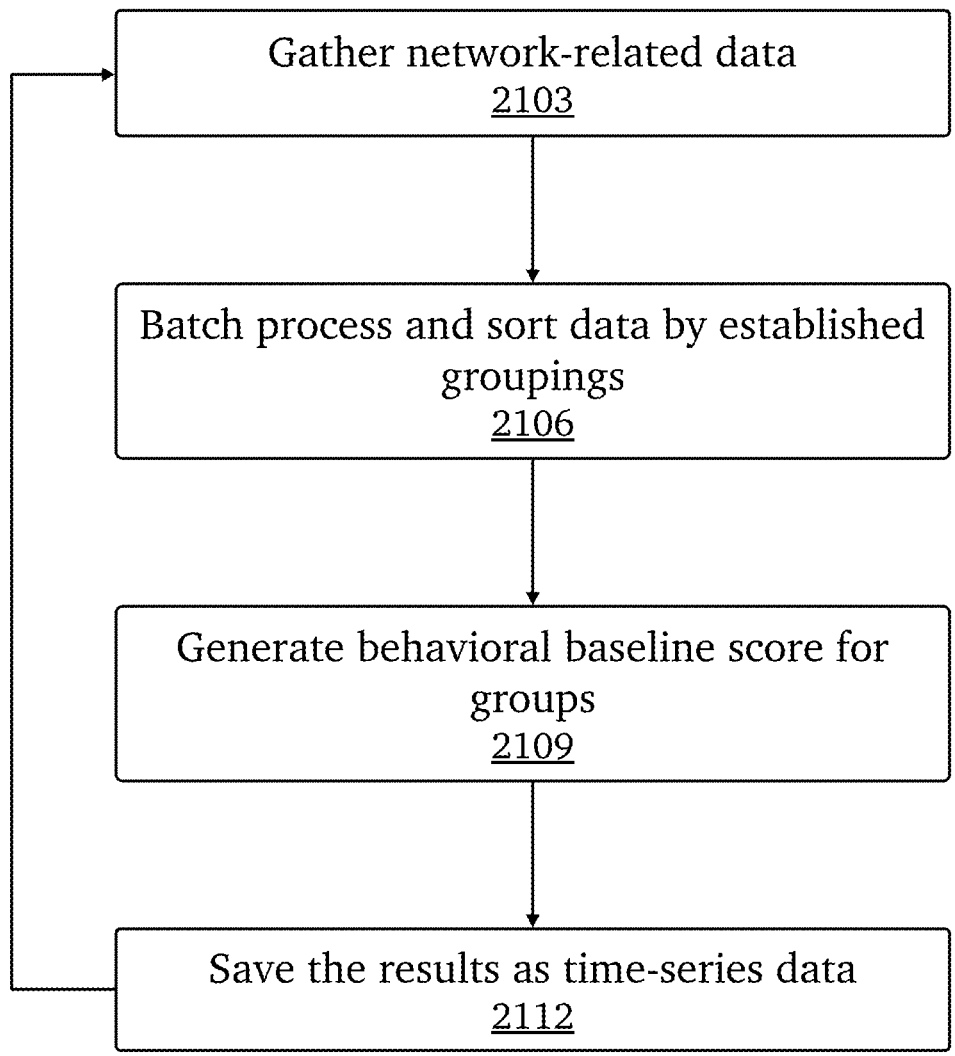
FIG. 21 is a flow diagram of an exemplary method for monitoring groups for anomalous behavior, according to one aspect.

FIG. 21 is a flow diagram of an exemplary method 2100 for monitoring groups for anomalous behavior, according to one aspect. At an initial step 2103, a system, as described above in FIG. 8, gathers network-related data. This data may comprise usage logs, Kerberos sessions data, computers and other devices connected to the network, active users, software installed, and the like. At step 2106, a behavioral analysis engine may process the data. Parallel computing may be used to speed up the processing of the data. The data may then be sorted by, and associated to, previously established groupings. At step 2109, a behavioral baseline score is generated for each group based on the results of the data processing. At step 2112, the data is stored into a time-series graph database. The process repeats periodically to create snapshots of various moments in time, and stored into the database. This may allow the system to retrain the baseline to take into considering non-anomalous baseline variances that may occur over time, as well as forecast changes in group dynamics using predictive analysis functions of ACDP system 100.

Figure 22:
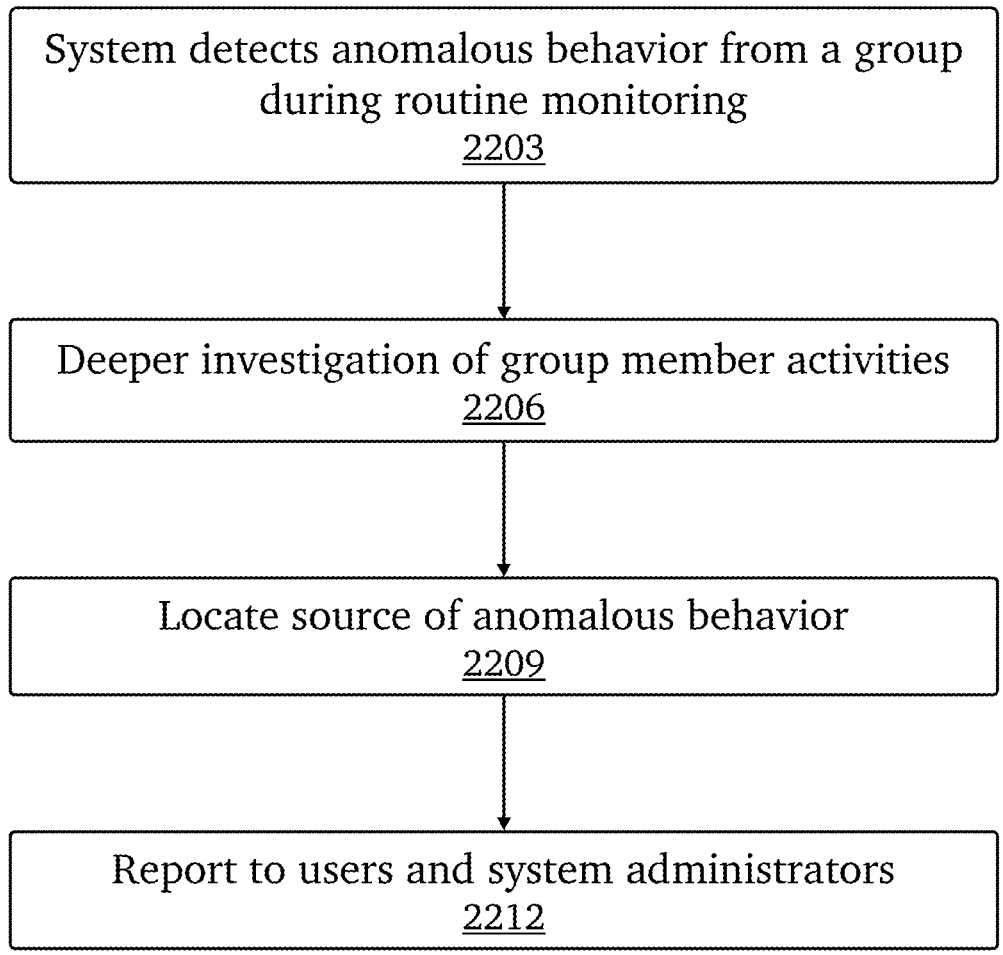
FIG. 22 is a flow diagram for an exemplary method for handing a detection of anomalous behavior, according to one aspect.

FIG. 22 is a flow diagram for an exemplary method 2200 for handing a detection of anomalous behavior, according to one aspect. At an initial step 2203, the system detects anomalous user behavior from a group. This may be based on comparison to established baselines, or a high priority incident caught during routine monitoring, for example a device accessing a blacklisted domain. At step 2206, the system investigates the group in which the anomalous behavior originated. This may include a more thorough analysis of usage and access logs. If applicable, users or devices with higher access privileges may be investigated before those with lower access privileges. At step 2209, the source or sources of the anomalous behavior is identified, and some corrective measures may be taken. For example, the offending device or user account may be automatically locked out of the network until a solution has been implemented. At step 2212, group members and system administrators may be notified. The system may utilize the various techniques discussed above to recommend a corrective action, or the system may take action automatically.

Figure 26:
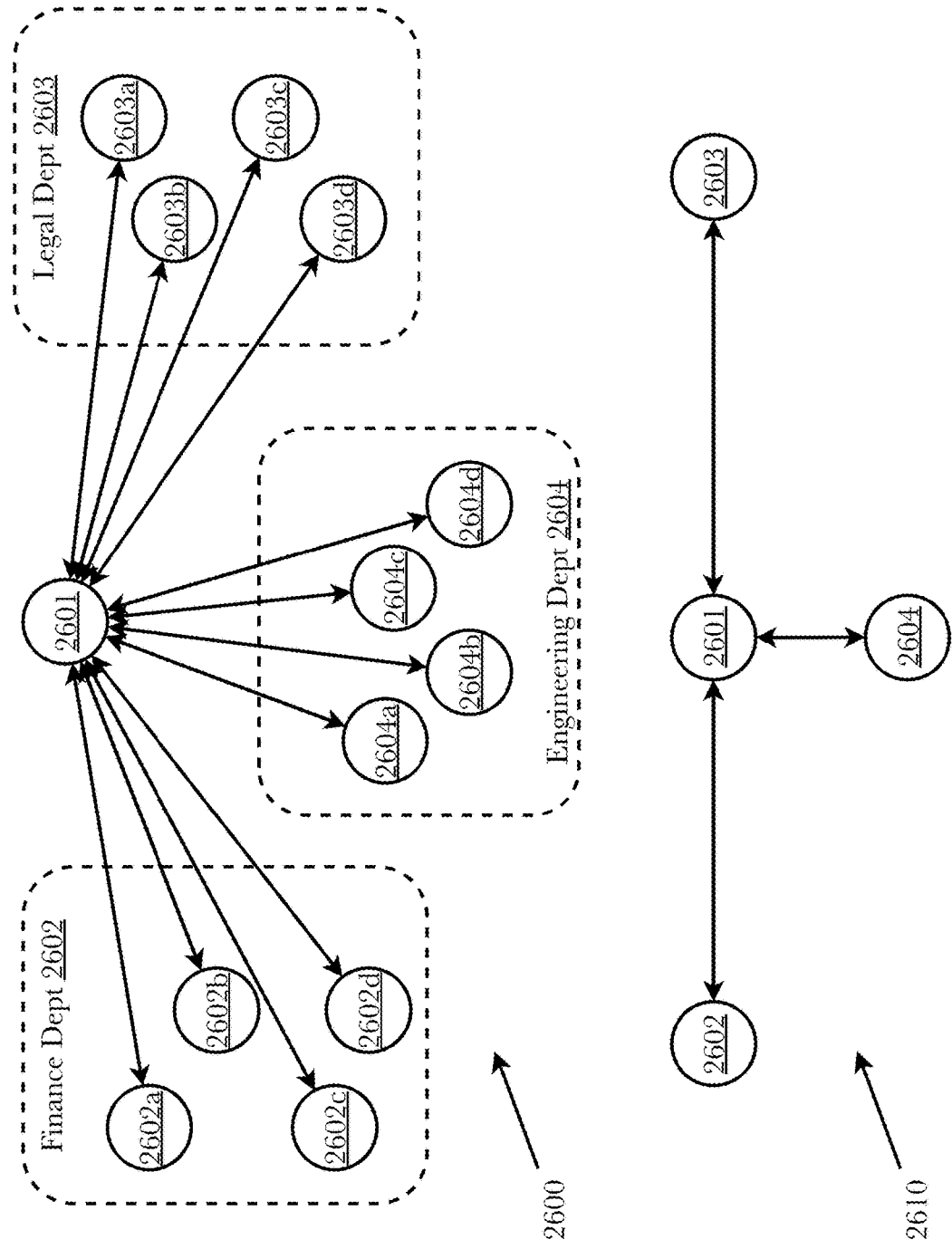
FIG. 26 is a diagram showing how network segmentation may be used to reduce the number of entities analyzed to make cybersecurity analyses more tractable.

FIG. 26 is a diagram showing how network segmentation may be used to reduce the number of entities analyzed to make cybersecurity analyses more tractable. Networks can involve many thousands of entities, and the exponential number of interconnections among those entities can make cybersecurity analyses of large networks intractable, even with powerful computing resources.

Thus, for example, combined UEBA/network topology analyses may exceed available computing resources, particularly where such analyses are attempted on a periodic or real-time basis. A solution for such complexity is segmentation of a network, wherein each device in a given network segment interacts with the network in a consistent, predictable manner. In such a case, all of the devices within a given segment can be reduced, for cybersecurity analysis purposes, to a single node of the network, greatly simplifying the network topology and reducing the computing resources necessary for cybersecurity analyses. Many different network segmentation technologies exist, such as virtual local area network (vLAN), in which a group of ports form a logical LAN segment and traffic from devices assigned to those ports remains within the vLAN, virtual routing and forwarding (VRF), in which traffic from devices assigned to the segment is routed only to other similarly assigned devices, and network access control (NAC), wherein endpoint security controls are established restricting access to a segment to authorized devices.

As an example of simplification of cybersecurity analyses through segmentation, a central network node 2601 may be connected to numerous devices 2602a-d, 2603a-d, and 2604a-d that make up different functional groups within a company, the finance department 2602, the legal department 2603, and the engineering department 2604. As shown in 2600, the central network node 2601 is represented by direct connections to each of these devices 2602a-d, 2603a-d, and 2604a-d. However, as shown in 2610, if the devices 2602a-d, 2603a-d, and 2604a-d are each assigned to their respective departments 2602-2604 using segmentation, the network can be simplified to a four-node network with 2601 as the central network node, and all of the computers in a given department represented by a single node 2602-2604. Reducing the network to segments in which all of the devices are connected to the network in a consistent, predictable manner greatly reduces the number of nodes that must be analyzed, as each device within a segment can only access the network in the same manner as all other such devices. Cybersecurity issues that affect a segment can thus be constrained to that segment.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the aspects disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific aspects, at least some of the features or functionalities of the various aspects disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some aspects, at least some of the features or functionalities of the various aspects disclosed herein may be implemented in one or more virtualized computing environments (e.g., network computing clouds, virtual machines hosted on one or more physical computing machines, or other appropriate virtual environments).

Figure 27:
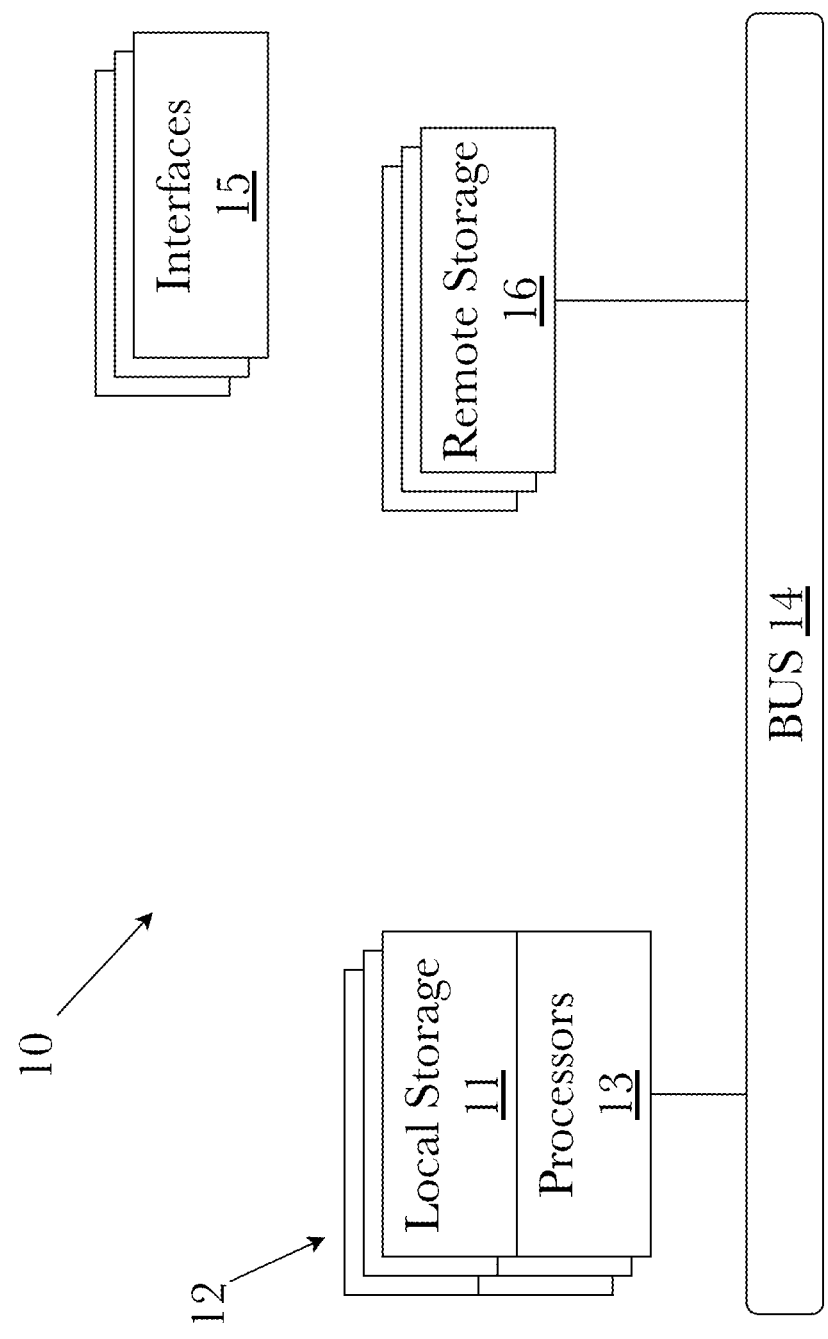
FIG. 27 is a block diagram illustrating an exemplary hardware architecture of a computing device used in various embodiments of the invention.

Referring now to FIG. 27, there is shown a block diagram depicting an exemplary computing device 10 suitable for implementing at least a portion of the features or functionalities disclosed herein. Computing device 10 may be, for example, any one of the computing machines listed in the previous paragraph, or indeed any other electronic device capable of executing software- or hardware-based instructions according to one or more programs stored in memory. Computing device 10 may be configured to communicate with a plurality of other computing devices, such as clients or servers, over communications networks such as a wide area network a metropolitan area network, a local area network, a wireless network, the Internet, or any other network, using known protocols for such communication, whether wireless or wired.

In one aspect, computing device 10 includes one or more central processing units (CPU) 12, one or more interfaces 15, and one or more busses 14 (such as a peripheral component interconnect (PCI) bus). When acting under the control of appropriate software or firmware, CPU 12 may be responsible for implementing specific functions associated with the functions of a specifically configured computing device or machine. For example, in at least one aspect, a computing device 10 may be configured or designed to function as a server system utilizing CPU 12, local memory 11 and/or remote memory 16, and interface(s) 15. In at least one aspect, CPU 12 may be caused to perform one or more of the different types of functions and/or operations under the control of software modules or components, which for example, may include an operating system and any appropriate applications software, drivers, and the like.

CPU 12 may include one or more processors 13 such as, for example, a processor from one of the Intel, ARM, Qualcomm, and AMD families of microprocessors. In some aspects, processors 13 may include specially designed hardware such as application-specific integrated circuits (ASICs), electrically erasable programmable read-only memories (EEPROMs), field-programmable gate arrays (FPGAs), and so forth, for controlling operations of computing device 10. In a particular aspect, a local memory 11 (such as non-volatile random access memory (RAM) and/or read-only memory (ROM), including for example one or more levels of cached memory) may also form part of CPU 12. However, there are many different ways in which memory may be coupled to system 10. Memory 11 may be used for a variety of purposes such as, for example, caching and/or storing data, programming instructions, and the like. It should be further appreciated that CPU 12 may be one of a variety of system-on-a-chip (SOC) type hardware that may include additional hardware such as memory or graphics processing chips, such as a QUALCOMM SNAPDRAGON™ or SAMSUNG EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one aspect, interfaces 15 are provided as network interface cards (NICs). Generally, NICs control the sending and receiving of data packets over a computer network; other types of interfaces 15 may for example support other peripherals used with computing device 10. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 802.11 (WiFi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 15 may include physical ports appropriate for communication with appropriate media. In some cases, they may also include an independent processor (such as a dedicated audio or video processor, as is common in the art for high-fidelity A/N hardware interfaces) and, in some instances, volatile and/or non-volatile memory (e.g., RAM).

Although the system shown in FIG. 27 illustrates one specific architecture for a computing device 10 for implementing one or more of the aspects described herein, it is by no means the only device architecture on which at least a portion of the features and techniques described herein may be implemented. For example, architectures having one or any number of processors 13 may be used, and such processors 13 may be present in a single device or distributed among any number of devices. In one aspect, a single processor 13 handles communications as well as routing computations, while in other aspects a separate dedicated communications processor may be provided. In various aspects, different types of features or functionalities may be implemented in a system according to the aspect that includes a client device (such as a tablet device or smartphone running client software) and server systems (such as a server system described in more detail below).

Regardless of network device configuration, the system of an aspect may employ one or more memories or memory modules (such as, for example, remote memory block 16 and local memory 11) configured to store data, program instructions for the general-purpose network operations, or other information relating to the functionality of the aspects described herein (or any combinations of the above). Program instructions may control execution of or comprise an operating system and/or one or more applications, for example. Memory 16 or memories 11, 16 may also be configured to store data structures, configuration data, encryption data, historical system operations information, or any other specific or generic non-program information described herein.

Because such information and program instructions may be employed to implement one or more systems or methods described herein, at least some network device aspects may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a JAVA™ compiler and may be executed using a Java virtual machine or equivalent, or files containing higher level code that may be executed by the computer using an interpreter (for example, scripts written in Python, Perl, Ruby, Groovy, or any other scripting language).

Figure 28:
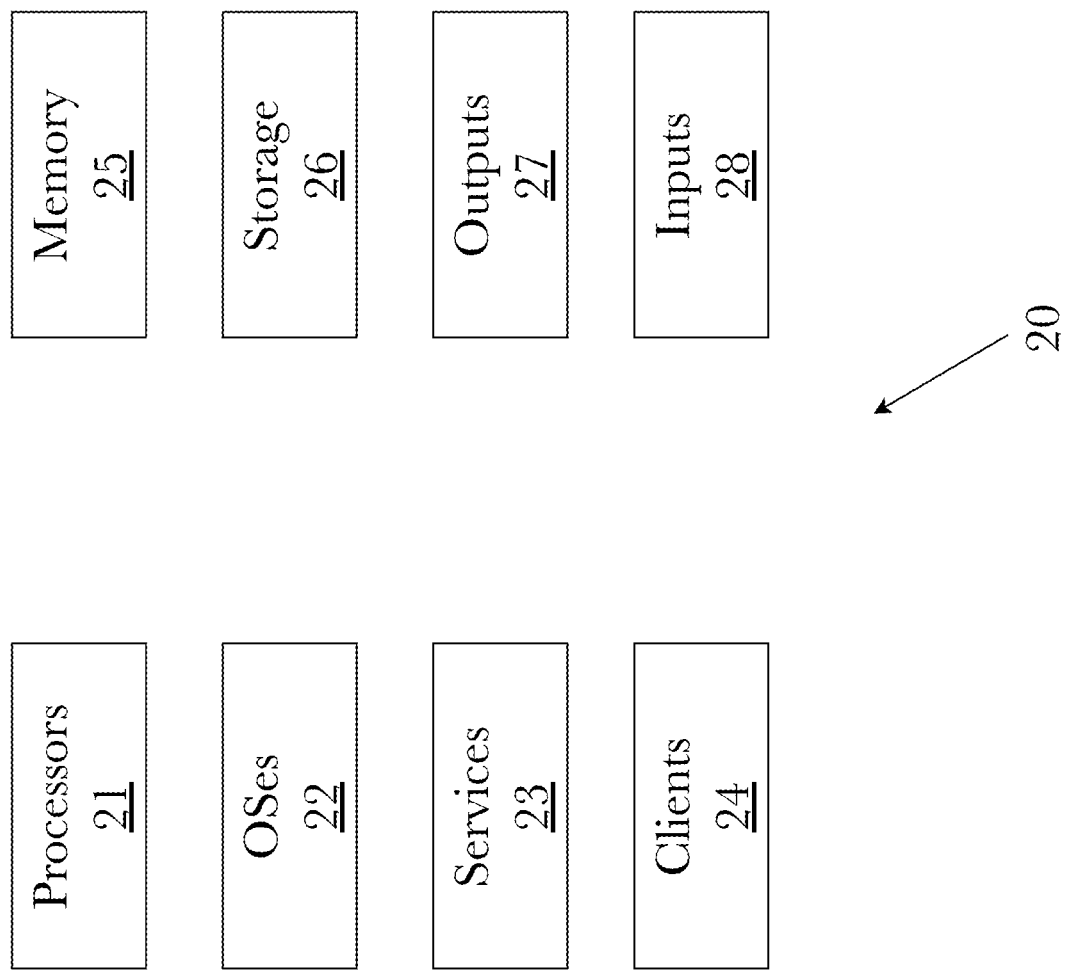
FIG. 28 is a block diagram illustrating an exemplary logical architecture for a client device, according to various embodiments of the invention.

In some aspects, systems may be implemented on a standalone computing system. Referring now to FIG. 28, there is shown a block diagram depicting a typical exemplary architecture of one or more aspects or components thereof on a standalone computing system. Computing device 20 includes processors 21 that may run software that carry out one or more functions or applications of aspects, such as for example a client application 24. Processors 21 may carry out computing instructions under control of an operating system 22 such as, for example, a version of MICROSOFT WINDOWS™ operating system, APPLE macOS™ or iOS™ operating systems, some variety of the Linux operating system, ANDROID™ operating system, or the like. In many cases, one or more shared services 23 may be operable in system 20, and may be useful for providing common services to client applications 24. Services 23 may for example be WINDOWS™ services, user-space common services in a Linux environment, or any other type of common service architecture used with operating system 21. Input devices 28 may be of any type suitable for receiving user input, including for example a keyboard, touchscreen, microphone (for example, for voice input), mouse, touchpad, trackball, or any combination thereof. Output devices 27 may be of any type suitable for providing output to one or more users, whether remote or local to system 20, and may include for example one or more screens for visual output, speakers, printers, or any combination thereof. Memory 25 may be random-access memory having any structure and architecture known in the art, for use by processors 21, for example to run software. Storage devices 26 may be any magnetic, optical, mechanical, memristor, or electrical storage device for storage of data in digital form (such as those described above, referring to FIG. 27). Examples of storage devices 26 include flash memory, magnetic hard drive, CD-ROM, and/or the like.

Figure 29:
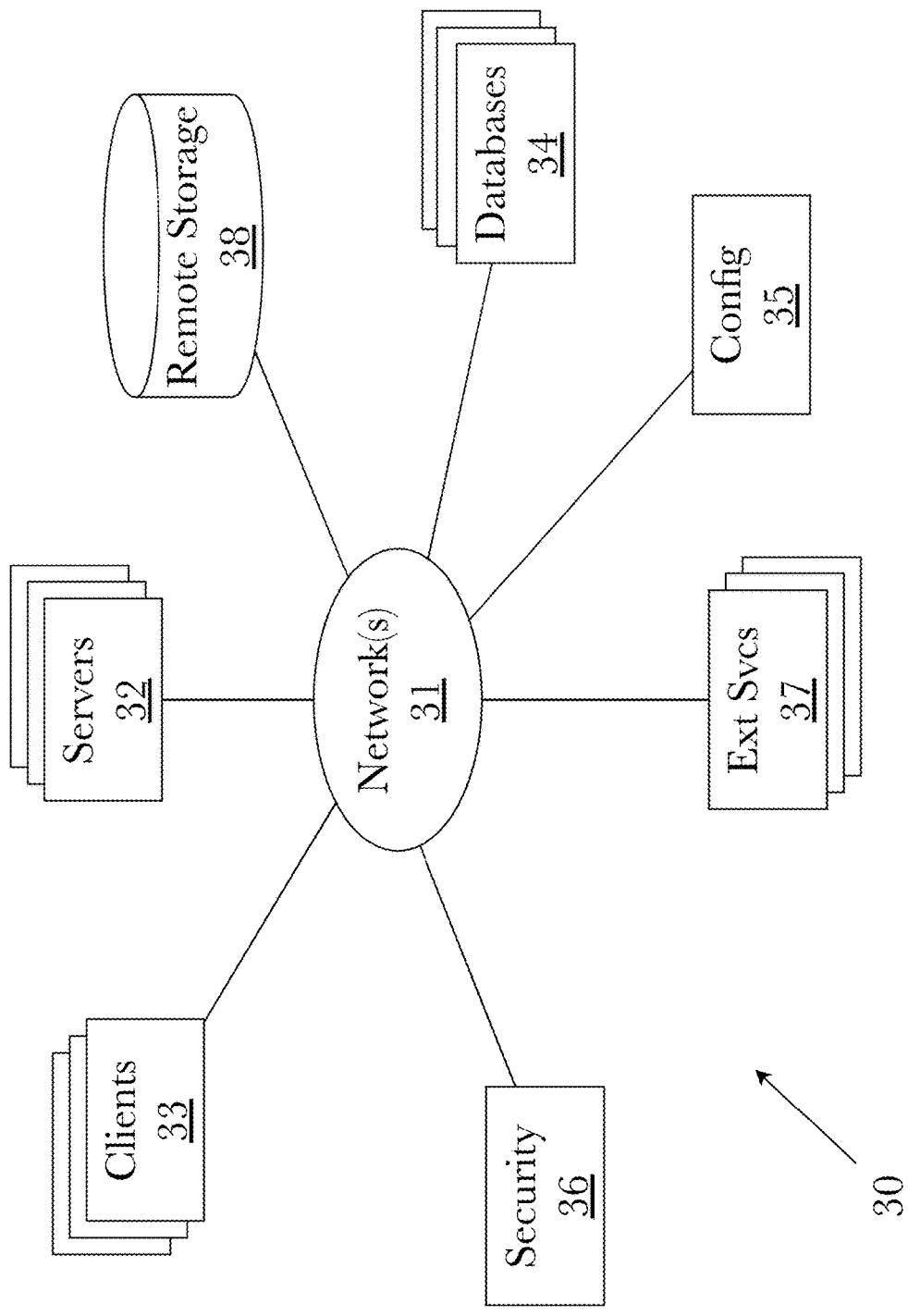
FIG. 29 is a block diagram illustrating an exemplary architectural arrangement of clients, servers, and external services, according to various embodiments of the invention.

In some aspects, systems may be implemented on a distributed computing network, such as one having any number of clients and/or servers. Referring now to FIG. 29, there is shown a block diagram depicting an exemplary architecture 30 for implementing at least a portion of a system according to one aspect on a distributed computing network. According to the aspect, any number of clients 33 may be provided. Each client 33 may run software for implementing client-side portions of a system; clients may comprise a system 20 such as that illustrated in FIG. 28. In addition, any number of servers 32 may be provided for handling requests received from one or more clients 33. Clients 33 and servers 32 may communicate with one another via one or more electronic networks 31, which may be in various aspects any of the Internet, a wide area network, a mobile telephony network (such as CDMA or GSM cellular networks), a wireless network (such as WiFi, WiMAX, LTE, and so forth), or a local area network (or indeed any network topology known in the art; the aspect does not prefer any one network topology over any other). Networks 31 may be implemented using any known network protocols, including for example wired and/or wireless protocols.

In addition, in some aspects, servers 32 may call external services 37 when needed to obtain additional information, or to refer to additional data concerning a particular call. Communications with external services 37 may take place, for example, via one or more networks 31. In various aspects, external services 37 may comprise web-enabled services or functionality related to or installed on the hardware device itself. For example, in one aspect where client applications 24 are implemented on a smartphone or other electronic device, client applications 24 may obtain information stored in a server system 32 in the cloud or on an external service 37 deployed on one or more of a particular enterprise's or user's premises.

In some aspects, clients 33 or servers 32 (or both) may make use of one or more specialized services or appliances that may be deployed locally or remotely across one or more networks 31. For example, one or more databases 34 may be used or referred to by one or more aspects. It should be understood by one having ordinary skill in the art that databases 34 may be arranged in a wide variety of architectures and using a wide variety of data access and manipulation means. For example, in various aspects one or more databases 34 may comprise a relational database system using a structured query language (SQL), while others may comprise an alternative data storage technology such as those referred to in the art as "NoSQL" (for example, HADOOP CASSANDRA™, GOOGLE BIGTABLE™, and so forth). In some aspects, variant database architectures such as column-oriented databases, in-memory databases, clustered databases, distributed databases, or even flat file data repositories may be used according to the aspect. It will be appreciated by one having ordinary skill in the art that any combination of known or future database technologies may be used as appropriate, unless a specific database technology or a specific arrangement of components is specified for a particular aspect described herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, some aspects may make use of one or more security systems 36 and configuration systems 35. Security and configuration management are common information technology (IT) and web functions, and some amount of each are generally associated with any IT or web systems. It should be understood by one having ordinary skill in the art that any configuration or security subsystems known in the art now or in the future may be used in conjunction with aspects without limitation, unless a specific security 36 or configuration system 35 or approach is specifically required by the description of any specific aspect.

Figure 30:
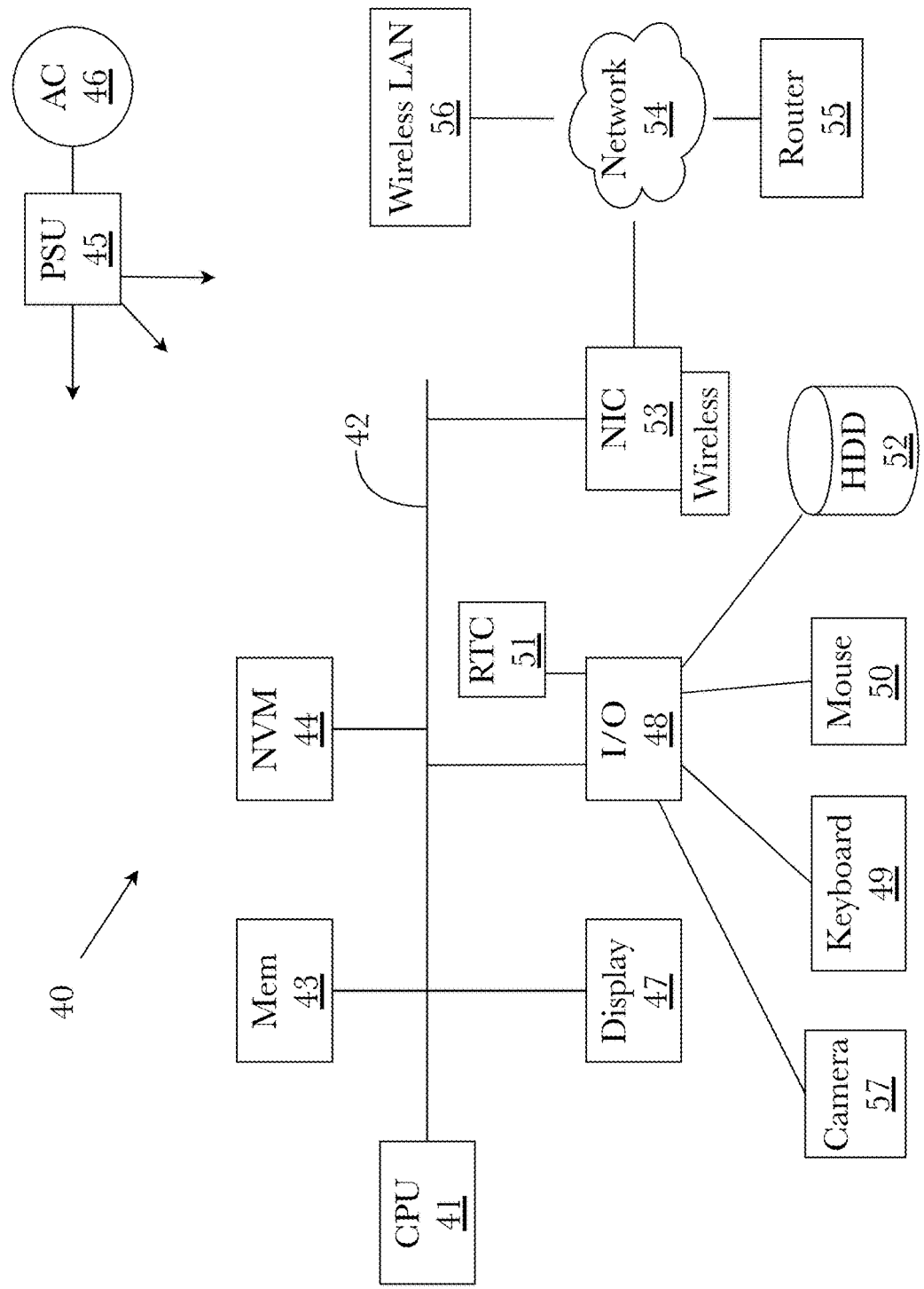
FIG. 30 is another block diagram illustrating an exemplary hardware architecture of a computing device used in various embodiments of the invention.

FIG. 30 shows an exemplary overview of a computer system 40 as may be used in any of the various locations throughout the system. It is exemplary of any computer that may execute code to process data. Various modifications and changes may be made to computer system 40 without departing from the broader scope of the system and method disclosed herein. Central processor unit (CPU) 41 is connected to bus 42, to which bus is also connected memory 43, nonvolatile memory 44, display 47, input/output (I/O) unit 48, and network interface card (NIC) 53. I/O unit 48 may, typically, be connected to peripherals such as a keyboard 49, pointing device 50, hard disk 52, real-time clock 51, a camera 57, and other peripheral devices. NIC 53 connects to network 54, which may be the Internet or a local network, which local network may or may not have connections to the Internet. The system may be connected to other computing devices through the network via a router 55, wireless local area network 56, or any other network connection. Also shown as part of system 40 is power supply unit 45 connected, in this example, to a main alternating current (AC) supply 46. Not shown are batteries that could be present, and many other devices and modifications that are well known but are not applicable to the specific novel functions of the current system and method disclosed herein. It should be appreciated that some or all components illustrated may be combined, such as in various integrated applications, for example Qualcomm or Samsung system-on-a-chip (SOC) devices, or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various aspects, functionality for implementing systems or methods of various aspects may be distributed among any number of client and/or server components. For example, various software modules may be implemented for performing various functions in connection with the system of any particular aspect, and such modules may be variously implemented to run on server and/or client components.

The skilled person will be aware of a range of possible modifications of the various aspects described above. Accordingly, the present invention is defined by the claims and their equivalents.

What is claimed is:

1. A system for cybersecurity analysis using user and entity behavioral analysis combined with network topology information, comprising: a computing device comprising a memory and a processor; a directed graph stored in the memory of the computing device, the directed graph comprising a representation of a computer network wherein: nodes of the directed graph represent entities comprising the computer network; and edges of the directed graph represent relationships between the entities of the computer network; and wherein network segmentation is used to reduce the number of nodes required to represent entities in the directed graph by: assigning computing devices in the computing network to logical segments by changing their configurations or by changing the computer network configurations, wherein the computing devices in a logical segment are treated analogously with respect to access of the computer network; and representing all computing devices in a logical segment as a single entity in the directed graph; and a behavioral analysis engine comprising a plurality of programming instructions stored in the memory of, and operating on the processor of, the computing device, wherein the plurality of programming instructions, when operating on the processor, cause the computing device to: monitor the activity of a plurality of entities comprising the computer network; establish behavioral baseline data for each of the plurality of entities from the monitored activity over a defined period of time; associate the behavioral baseline data for each entity with the directed graph node for that entity; identify anomalous behavior of one of the plurality of entities by comparing monitored activity for that entity to the associated behavioral baseline data for that entity; and calculate a risk of the anomalous behavior using the directed graph by determining a relationship between the entity for which anomalous behavior has been identified and a different entity of the plurality of entities.

2. The system of claim 1, wherein the relationship between entities used to calculate the risk is a vulnerability rating which indicates a difficulty of exploiting a vulnerability between entities.

3. The system of claim 2, wherein the vulnerability rating comprises information regarding the levels and types of authentication required to access an entity.

4. The system of claim 1, wherein each node further comprises a risk of attack rating which indicates a likelihood that the node will be subject to a cyberattack, and the calculation of risk is based in part on the risk rating.

5. The system of claim 1, wherein each node further comprises a criticality rating which indicates the criticality to the computer network, or the organization operating the network, if the node is compromised by a cyberattack, and the calculation of risk is based in part on the criticality rating.

6. A method for cybersecurity analysis using user and entity behavioral analysis combined with network topology information, comprising the steps of: storing a directed graph in the memory of a computing device, the directed graph comprising a representation of a computer network wherein: nodes of the directed graph represent entities comprising the computer network; and edges of the directed graph represent relationships between the entities of the computer network; and the number of nodes required to represent entities in the directed graph is reduced using network segmentation by: assigning computing devices in the computing network to logical segments by changing their configurations or by changing the computer network configurations wherein the computing devices in a logical segment are treated analogously with respect to access of the computer network; and representing all computing devices in a logical segment as a single entity in the directed graph monitoring the activity of a plurality of entities comprising the computer network; establishing behavioral baseline data for each of the plurality of entities from the monitored activity over a defined period of time; associating the behavioral baseline data for each entity with the directed graph node for that entity; identifying anomalous behavior of one of the plurality of entities by comparing monitored activity for that entity to the associated behavioral baseline data for that entity; and calculating a risk of the anomalous behavior using the directed graph by determining a relationship between the entity for which anomalous behavior has been identified and a different entity of the plurality of entities.

7. The method of claim 6, wherein the relationship between entities used to calculate the risk is a vulnerability rating which indicates a difficulty of exploiting a vulnerability between entities.

8. The method of claim 7, wherein the vulnerability rating comprises information regarding the levels and types of authentication required to access an entity.

9. The method of claim 6, wherein each node further comprises a risk rating which indicates a likelihood that the node will be subject to a cyberattack, and the calculation of risk is based in part on the risk rating.

10. The method of claim 6, wherein each node further comprises a criticality rating which indicates the criticality to the computer network, or the organization operating the network, if the node is compromised by a cyberattack, and the calculation of risk is based in part on the criticality rating.

* * * * *